(12) United States Patent
Wang et al.

(10) Patent No.: US 9,598,840 B2
(45) Date of Patent: Mar. 21, 2017

(54) CONTROL SYSTEM FOR HYDRAULIC SYSTEM AND METHOD FOR RECOVERING ENERGY AND LEVELING HYDRAULIC SYSTEM LOADS

(71) Applicant: Eaton Corporation, Cleveland, OH (US)

(72) Inventors: Meng (Rachel) Wang, Eden Prairie, MN (US); Aaron Hertzel Jagoda, St. Louis Park, MN (US); Chad Anthony Larish, Minnetonka, MN (US); Damrongrit Piyabongkarn, Medina, MN (US); Per William Danzl, Edina, MN (US); Vishal Vijay Mahulkar, Eden Prairie, MN (US)

(73) Assignee: Eaton Corporation, Cleveland, OH (US)

( * ) Notice: Subject to any disclaimer, the term of this patent is extended or adjusted under 35 U.S.C. 154(b) by 481 days.

(21) Appl. No.: 14/134,545

(22) Filed: Dec. 19, 2013

(65) Prior Publication Data
US 2014/0166114 A1   Jun. 19, 2014

Related U.S. Application Data

(60) Provisional application No. 61/739,508, filed on Dec. 19, 2012.

(51) Int. Cl.
*F16D 31/02* (2006.01)
*E02F 9/22* (2006.01)
(Continued)

(52) U.S. Cl.
CPC .......... *E02F 9/2217* (2013.01); *E02F 9/2075* (2013.01); *E02F 9/2232* (2013.01);
(Continued)

(58) Field of Classification Search
CPC ............................ F15B 2211/14; F15B 21/14
(Continued)

(56) References Cited

U.S. PATENT DOCUMENTS 3,113,581 A   12/1963   Presnell
3,892,283 A    7/1975   Johnson
(Continued)

FOREIGN PATENT DOCUMENTS

DE   10 2006 046 127 A1   4/2008
DE   10 2009 053 702 A1   5/2011
(Continued)

OTHER PUBLICATIONS

International Search Report and Written Opinion for PCT/US2013/075691 mailed Jun. 3, 2014.
(Continued)

*Primary Examiner* — Thomas E Lazo
*Assistant Examiner* — Daniel Collins
(74) *Attorney, Agent, or Firm* — Merchant & Gould P.C.

(57) ABSTRACT

A control system for a hydraulic system including an accumulator and a hydraulic transformer coordinates flow sharing within the hydraulic system. The hydraulic transformer includes first and second variable displacement pump/motor units mounted on a rotatable shaft. The rotatable shaft has an end adapted for connection to a first external load. The first variable displacement pump/motor unit includes a first side that fluidly connects to a pump and a second side that fluidly connects to a tank. The second variable displacement pump/motor unit includes a first side that fluidly connects to the accumulator and a second side that fluidly connects with the tank. A second external load may be hydraulically connected to the hydraulic system. Energy may be transferred to/from the pump, the accumulator, the first external load, and/or the second external load, as directed by the control system.

27 Claims, 42 Drawing Sheets

(51) Int. Cl.
*F15B 21/14* (2006.01)
*E02F 9/20* (2006.01)

(52) U.S. Cl.
CPC ............ *E02F 9/2296* (2013.01); *F15B 21/14* (2013.01); *F15B 2211/20546* (2013.01); *F15B 2211/20569* (2013.01); *F15B 2211/212* (2013.01); *F15B 2211/214* (2013.01); *F15B 2211/2654* (2013.01); *F15B 2211/3059* (2013.01); *F15B 2211/633* (2013.01); *F15B 2211/6306* (2013.01); *F15B 2211/6336* (2013.01); *F15B 2211/6346* (2013.01); *F15B 2211/6652* (2013.01); *F15B 2211/7058* (2013.01); *F15B 2211/7135* (2013.01); *F15B 2211/761* (2013.01); *F15B 2211/88* (2013.01); *Y10T 137/0379* (2015.04)

(58) Field of Classification Search
USPC .................................................. 60/458–460
See application file for complete search history.

(56) References Cited

U.S. PATENT DOCUMENTS

| | | | |
|---|---|---|---|
| 4,026,107 A | 5/1977 | Kosek et al. | |
| 4,068,728 A | 1/1978 | Subrick | |
| 4,108,198 A | 8/1978 | England | |
| 4,261,431 A | 4/1981 | Hawbaker | |
| 4,528,892 A | 7/1985 | Okabe et al. | |
| 4,553,391 A | 11/1985 | Reinhardt | |
| 4,586,332 A | 5/1986 | Schexnayder | |
| 4,693,080 A | 9/1987 | Van Hooff | |
| 4,707,993 A | 11/1987 | Kime | |
| 5,285,641 A | 2/1994 | Goto et al. | |
| 5,381,661 A | 1/1995 | Malina | |
| 5,794,437 A | 8/1998 | Lisniansky | |
| 5,794,438 A | 8/1998 | Lisniansky | |
| 5,794,441 A | 8/1998 | Lisniansky | |
| 5,852,933 A | 12/1998 | Schmidt | |
| 5,916,139 A | 6/1999 | Tieben | |
| 6,005,360 A | 12/1999 | Pace | |
| 6,009,708 A | 1/2000 | Miki et al. | |
| 6,125,828 A | 10/2000 | Hu | |
| 6,223,529 B1 | 5/2001 | Achten | |
| 6,370,873 B1 | 4/2002 | Schaich et al. | |
| 6,378,301 B2 | 4/2002 | Endo et al. | |
| 6,438,951 B2 | 8/2002 | Morgan | |
| 6,460,332 B1 | 10/2002 | Maruta et al. | |
| 6,497,558 B1 | 12/2002 | Hale | |
| 6,575,076 B1 | 6/2003 | Achten | |
| 6,725,581 B2 | 4/2004 | Naruse et al. | |
| 6,854,268 B2 | 2/2005 | Fales et al. | |
| 6,857,441 B2 | 2/2005 | Flavelle | |
| 6,887,045 B2 | 5/2005 | Schaeffer | |
| 7,086,226 B2 | 8/2006 | Oguri | |
| 7,201,095 B2 | 4/2007 | Hughey | |
| 7,234,298 B2 | 6/2007 | Brinkman et al. | |
| 7,775,040 B2 | 8/2010 | Khalil | |
| 7,908,852 B2 | 3/2011 | Zhang et al. | |
| 2001/0035011 A1 | 11/2001 | Endo et al. | |
| 2002/0104313 A1 | 8/2002 | Clarke | |
| 2003/0110766 A1 | 6/2003 | Berlinger et al. | |
| 2003/0221339 A1 | 12/2003 | Naruse et al. | |
| 2004/0060430 A1 | 4/2004 | Brinkman | |
| 2004/0107699 A1 | 6/2004 | Fales et al. | |
| 2005/0279088 A1 | 12/2005 | Kim | |
| 2006/0051223 A1 | 3/2006 | Mark et al. | |
| 2007/0049429 A1 | 3/2007 | Garnett | |
| 2008/0104955 A1 | 5/2008 | Khalil | |
| 2009/0100830 A1 | 4/2009 | Schneider et al. | |
| 2009/0178399 A1 | 7/2009 | Bishop | |
| 2009/0241534 A1 | 10/2009 | Tikkanen et al. | |
| 2010/0236232 A1 | 9/2010 | Boehm et al. | |
| 2011/0197576 A1* | 8/2011 | Wada | E02F 9/2217 60/413 |
| 2013/0061587 A1* | 3/2013 | Jagoda | E02F 9/123 60/414 |
| 2013/0061588 A1 | 3/2013 | Jagoda | |

FOREIGN PATENT DOCUMENTS

| | | |
|---|---|---|
| EP | 1 433 648 A2 | 6/2004 |
| JP | 2004-28212 | 1/2004 |
| WO | WO 03/058034 A1 | 7/2003 |
| WO | WO 2006/083163 A1 | 8/2006 |
| WO | WO 2006/094990 A1 | 9/2006 |
| WO | WO 2013/025459 A1 | 2/2013 |

OTHER PUBLICATIONS

Partial Search Report for PCT/US2013/075691 mailed Mar. 21, 2014.
Series 90 Axial Piston Motors, Technical Information, Sauer Danfoss, 44 pages (Sep. 2008).
The Hydrid: A Hydraulic Series Hybrid, Innas, 8 pages (Publicly known at least as early as Jul. 28, 2011).

* cited by examiner

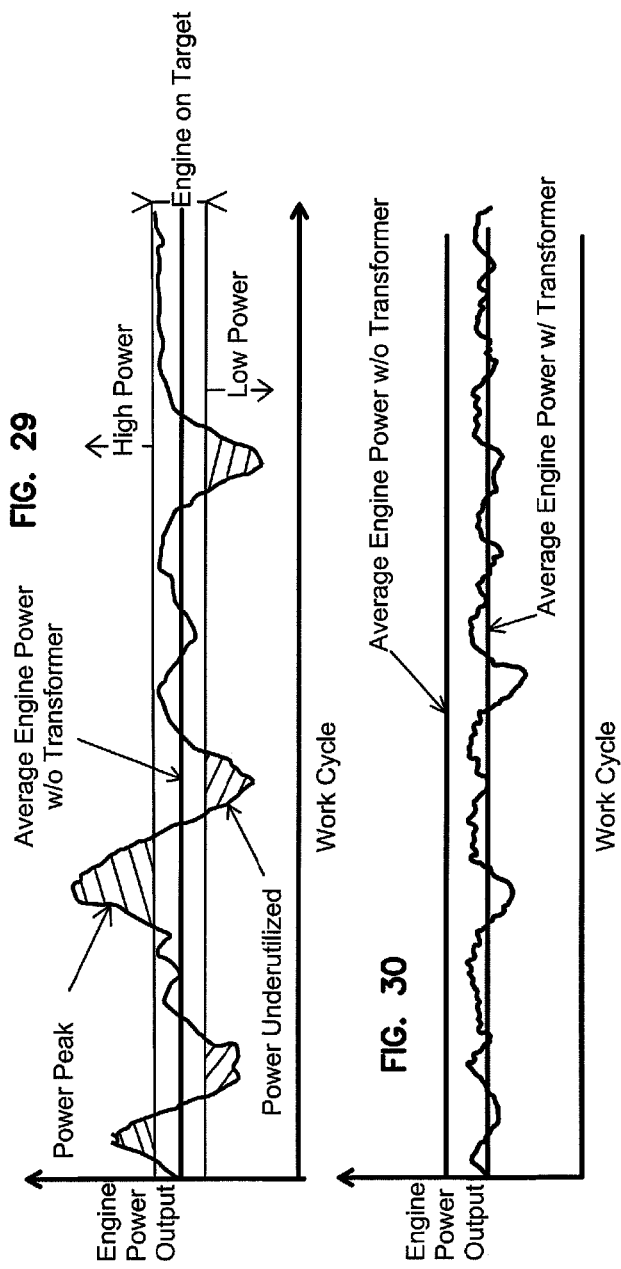

CONTROL SYSTEM FOR HYDRAULIC SYSTEM AND METHOD FOR RECOVERING ENERGY AND LEVELING HYDRAULIC SYSTEM LOADS

CROSS REFERENCE TO RELATED APPLICATION

The present application claims the benefit of U.S. Provisional Patent Application Ser. No. 61/739,508, filed Dec. 19, 2012, entitled CONTROL SYSTEM FOR HYDRAULIC SYSTEM AND METHOD FOR RECOVERING ENERGY AND LEVELING HYDRAULIC SYSTEM LOADS, which application is hereby incorporated by reference in its entirety.

BACKGROUND

Mobile pieces of machinery (e.g., excavators) often include hydraulic systems having hydraulically powered linear and rotary actuators used to power various active machine components (e.g., linkages, tracks, rotating joints, etc.). Typically, the linear actuators include hydraulic cylinders and the rotary actuators include hydraulic motors. By accessing a user interface of a machine control system, a machine operator can control movement of the various machine components.

A typical piece of mobile machinery includes a prime mover (e.g., a diesel engine, spark ignition engine, electric motor, etc.) that functions as an overall source of power for the piece of mobile machinery. Commonly, the prime mover powers one or more hydraulic pumps that provide pressurized hydraulic fluid for driving the active machine components of the piece of machinery. The prime mover is typically required to be sized to satisfy a peak power requirement of the system. Because the prime mover is designed to satisfy peak power requirements, the prime mover often does not operate at peak efficiency under average working loads.

The operation of the active hydraulic components of the type described above can be characterized by frequent accelerations and decelerations (e.g., overrunning hydraulic loads). Due to throttling, there is often substantial energy loss associated with decelerations. There is a need for improved systems for recovering energy losses associated with such decelerations.

SUMMARY

One aspect of the present disclosure relates to systems and methods for effectively recovering and utilizing energy from overrunning hydraulic loads.

Another aspect of the present disclosure relates to systems and methods for leveling the load on a hydraulic systems prime mover by efficiently storing energy during periods of low loading and efficiently releasing stored energy during periods of high loading, thus allowing the prime mover to be sized for average power requirement rather than for a peak power requirement. Such systems and methods also permit the prime mover to be run at a more consistent operating condition which allows an operating efficiency of the prime mover to be optimized.

A further aspect of the present disclosure relates to a hydraulic system including a hydraulic transformer capable of providing shaft work against an external load. In certain embodiments, a clutch can be used to engage and disengage the output shaft from the external load such that the unit can also function as a stand-alone hydraulic transformer.

A further aspect of the present disclosure relates to a control system for the above hydraulic systems and the like.

A further aspect of the present disclosure relates to control logic for the above hydraulic systems and the like.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

FIG. 29 is a graph of power output of a prime mover of a conventional example piece of excavation equipment over an example work cycle;

FIG. 30 is a graph of power output of a prime mover of an example piece of excavation equipment over an example work cycle in accordance with the principles of the present disclosure;

Figure 31:
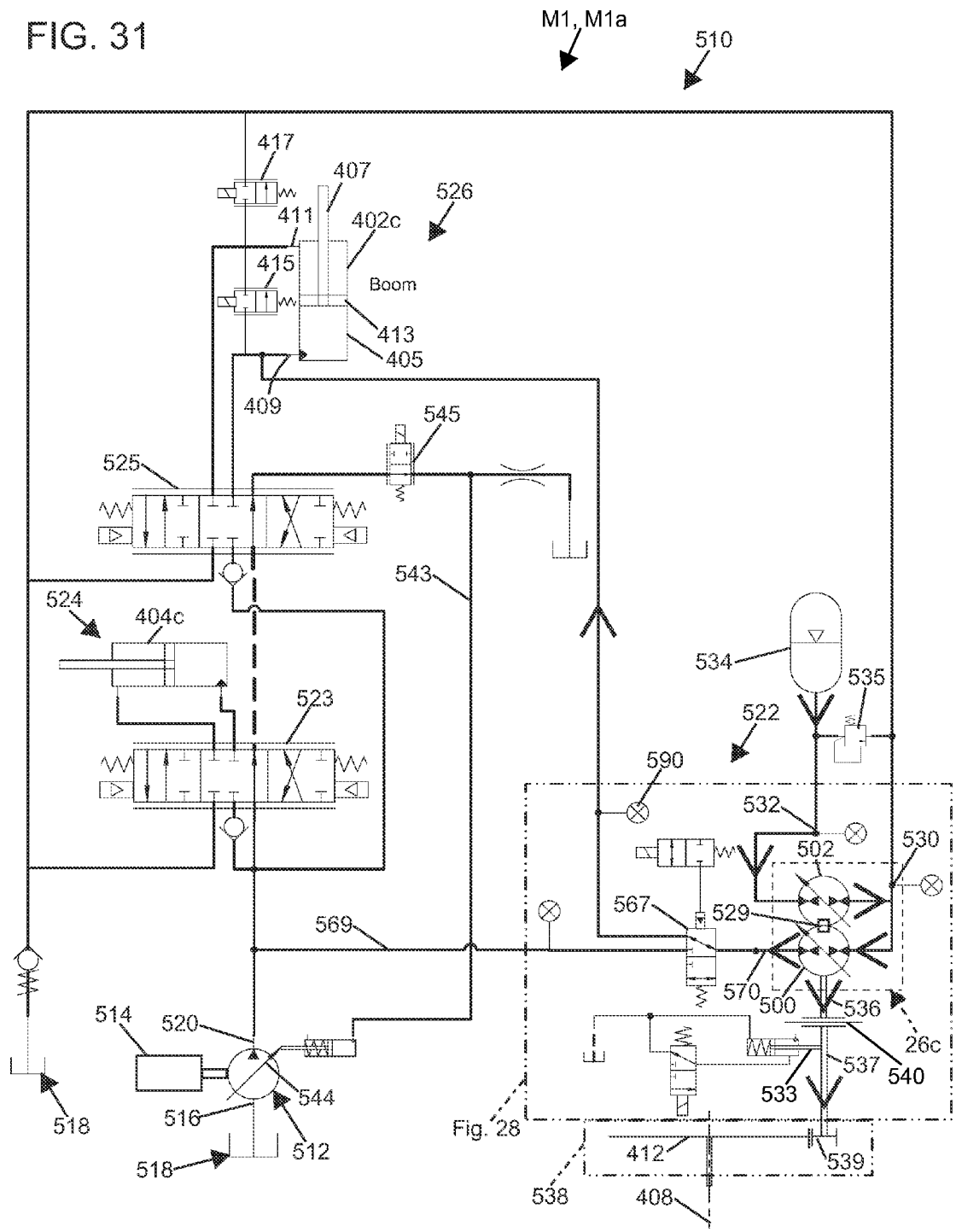
FIG. 31 is a schematic diagram showing a fourth hydraulic system, related to the third hydraulic system of FIG. 26, in accordance with the principles of the present disclosure, the fourth hydraulic system configured in a mode to raise a boom and accelerate a swing drive with an operational accumulator and under high system load of the mobile piece of excavation equipment of FIGS. 24 and 25.
Figure 42:
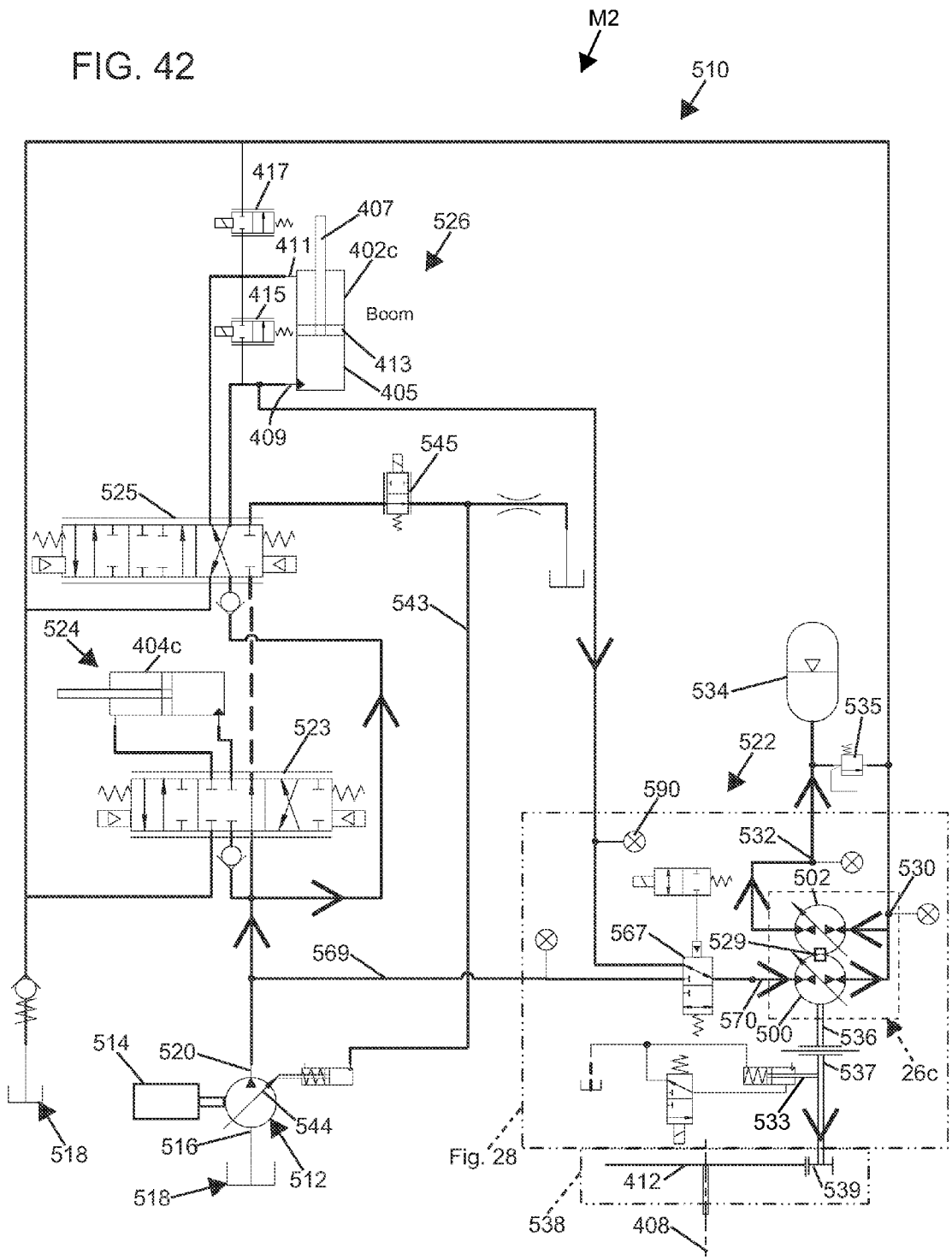
Figure 43:
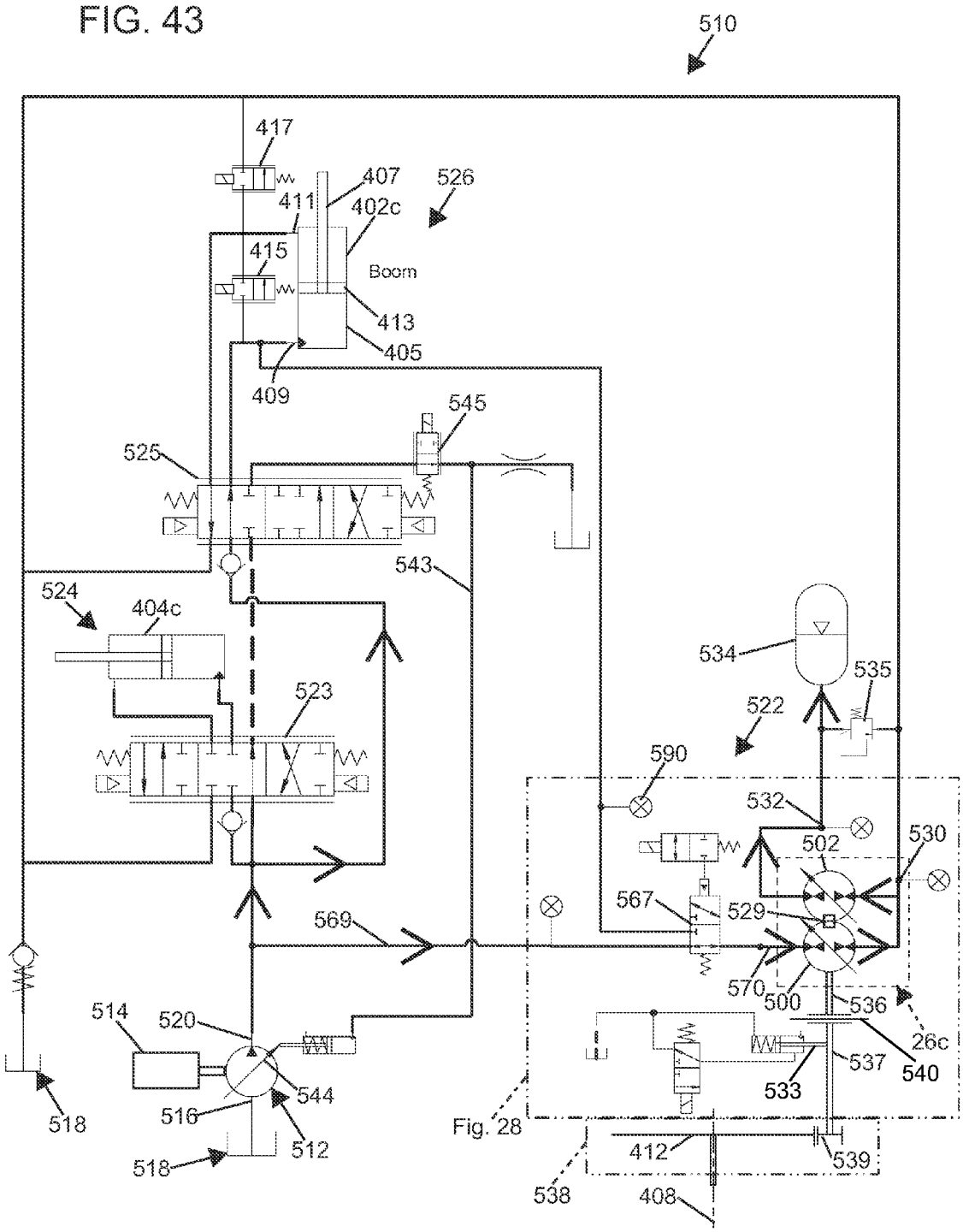

FIG. 42 is the schematic diagram of FIG. 31 with the fourth hydraulic system configured in a mode to lower the boom and accelerate the swing drive with flow from the main pump lowering the boom and with the accumulator being charged by the lowering of the boom and with the acceleration of the swing drive being powered by the lowering of the boom; and FIG. 43 is the schematic diagram of FIG. 31 with the fourth hydraulic system configured in a mode to raise the boom and charge the accumulator with flow from the main pump raising the boom and with the accumulator being charged by the main pump.

DETAILED DESCRIPTION

Reference will now be made in detail to aspects of the present disclosure that are illustrated in the accompanying drawings. Wherever possible, the same reference numbers will be used throughout the drawings to refer to the same or like structure.

Figure 1:
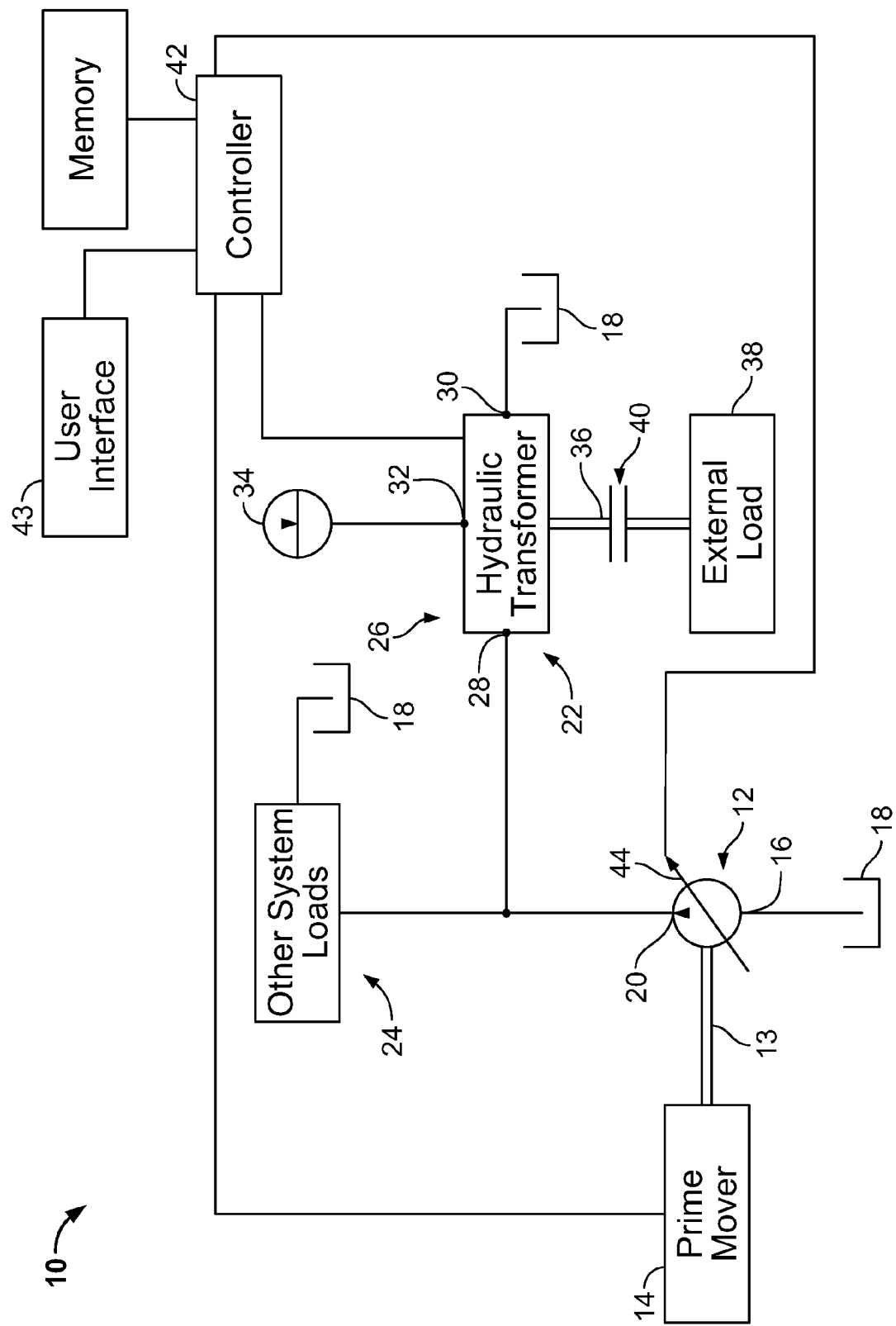
FIG. 1 is a schematic diagram of a first hydraulic system in accordance with the principles of the present disclosure.

FIG. 1 shows a system 10 in accordance with the principles of the present disclosure. The system 10 includes a variable displacement pump 12 driven by a prime mover 14 (e.g., a diesel engine, a spark ignition engine, an electric motor or other power source). The variable displacement pump 12 includes an inlet 16 that draws low pressure hydraulic fluid from a tank 18 (i.e., a low pressure reservoir). The variable displacement pump 12 also includes an outlet 20 through which high pressure hydraulic fluid is output. The outlet 20 is preferably fluidly coupled to a plurality of different working load circuits. For example, the outlet 20 is shown coupled to a first load circuit 22 and a second load circuit 24. The first load circuit 22 includes a hydraulic transformer 26 including a first port 28, a second port 30 and a third port 32. The first port 28 of the hydraulic transformer 26 is fluidly connected to the outlet 20 of the variable displacement pump 12 and is also fluidly connected to the second load circuit 24. The second port 30 is fluidly connected to the tank 18. The third port 32 is fluidly connected to a hydraulic pressure accumulator 34. The hydraulic transformer 26 further includes an output/input shaft 36 that couples to an external load 38. A clutch 40 can be used to selectively engage the output/input shaft 36 with the external load 38 and disengage the output/input shaft 36 from the external load 38. When the clutch 40 engages the output/input shaft 36 with the external load 38, torque is transferred between the output/input shaft 36 and the external load 38. In contrast, when the clutch 40 disengages the output/input shaft 36 from the external load 38, no torque is transferred between the output/input shaft 36 and the external load 38. Gear reductions can be provided between the clutch 40 and the external load 38.

The system 10 further includes an electronic controller 42 that interfaces with the prime mover 14, the variable displacement pump 12, and the hydraulic transformer 26. It will be appreciated that the electronic controller 42 can also interface with various other sensors and other data sources provided throughout the system 10. For example, the electronic controller 42 can interface with pressure sensors incorporated into the system 10 for measuring the hydraulic pressure in the accumulator 34, the hydraulic pressure provided by the variable displacement pump 12 to the first and second load circuits 22, 24, the pressures at the pump and tank sides of the hydraulic transformer 26 and other pressures. Moreover, the controller 42 can interface with a rotational speed sensor that senses a speed of rotation of the output/input shaft 36. Additionally, the electronic controller 42 can be used to monitor a load on the prime mover 14 and can control the hydraulic fluid flow rate across the variable displacement pump 12 at a given rotational speed of a drive shaft 13 powered by the prime mover 14. In one embodiment, the hydraulic fluid displacement across the variable displacement pump 12 per shaft rotation can be altered by changing the position of a swashplate 44 of the variable displacement pump 12. The controller 42 can also interface with the clutch 40 for allowing an operator to selectively engage and disengage the output/input shaft 36 of the transformer 26 with respect to the external load 38.

The electronic controller 42 can control operation of the hydraulic transformer 26 so as to provide a load leveling function that permits the prime mover 14 to be run at a consistent operating condition (i.e., a steady operating condition) thereby assisting in enhancing an overall efficiency of the prime mover 14. The load leveling function can be provided by efficiently storing energy in the accumulator 34 during periods of low loading on the prime mover 14, and efficiently releasing the stored energy during periods of high loading of the prime mover 14. This allows the prime mover 14 to be sized for an average power requirement rather than a peak power requirement.

Figure 2:
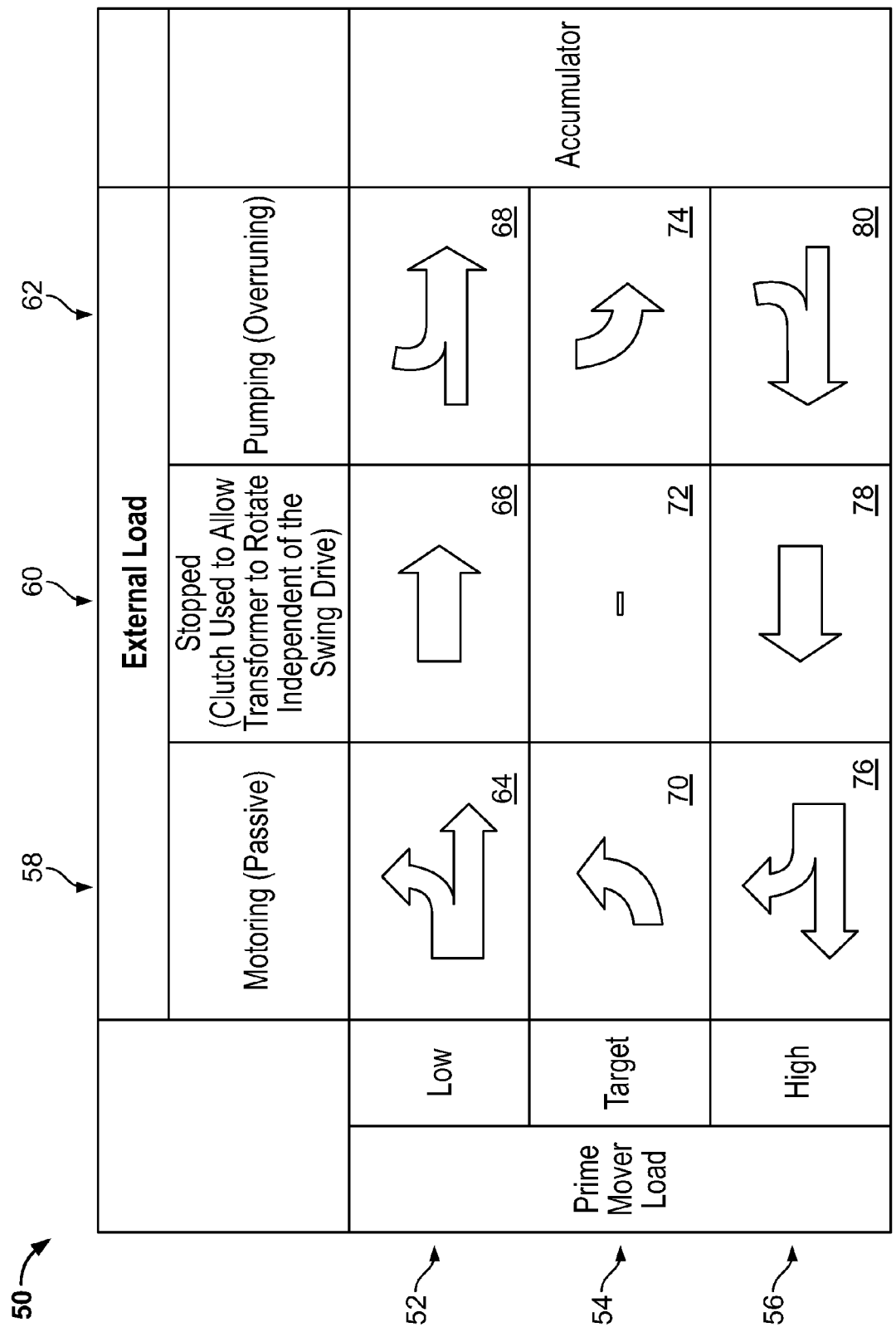
FIG. 2 is a matrix table that schematically depicts various operating modes in which the first hydraulic system of FIG. 1 can operate.

FIG. 2 illustrates a matrix table 50 that schematically depicts an overview of control logic that can be utilized by the electronic controller 42 in controlling the operation of the system 10. It will be appreciated that the matrix table 50 is a simplification and does not take into consideration certain factors such as the state of charge of the accumulator 34. A primary goal of the control logic/architecture is to maintain a generally level loading on the prime mover 14, thus allowing for more efficient operation of the prime mover 14. The control logic/architecture also can reduce the system peak power requirement thereby allowing a smaller prime mover to be used. This is accomplished by using the accumulator 34 and transformer 26 to recover energy from a first working circuit powered by the prime mover 14, and to use the recovered energy as a power supplement for powering a second working circuit powered by the prime mover 14. The accumulator 34 and the transformer 26 can also be used to buffer the energy produced by the prime mover 14. The accumulator 34 and the transformer 26 can further be used to recover energy associated with load decelerations in a way that can eliminate hydraulic throttling.

Referring to FIG. 2, the matrix table 50 includes a plurality of horizontal rows and a plurality of vertical columns. For example, the horizontal rows include a first row 52 corresponding to a low loading condition of the prime mover 14, a second row 54 corresponding to a target loading condition of the prime mover 14, and a third row 56 corresponding to a high loading condition of the prime mover 14. The vertical columns include a first column 58, a second column 60, and a third column 62. The first column 58 represents a condition where the transformer 26 is providing a motoring function where torque is being transferred from the output/input shaft 36 to the external load 38 through the clutch 40. The second column 60 represents a condition where the output/input shaft 36 is decoupled from the external load 38 by the clutch 40. The third column 62 represents a condition where the transformer 26 is providing a pumping function where torque is being transferred from the external load 38 back through the output/input shaft 36.

Figure 3:
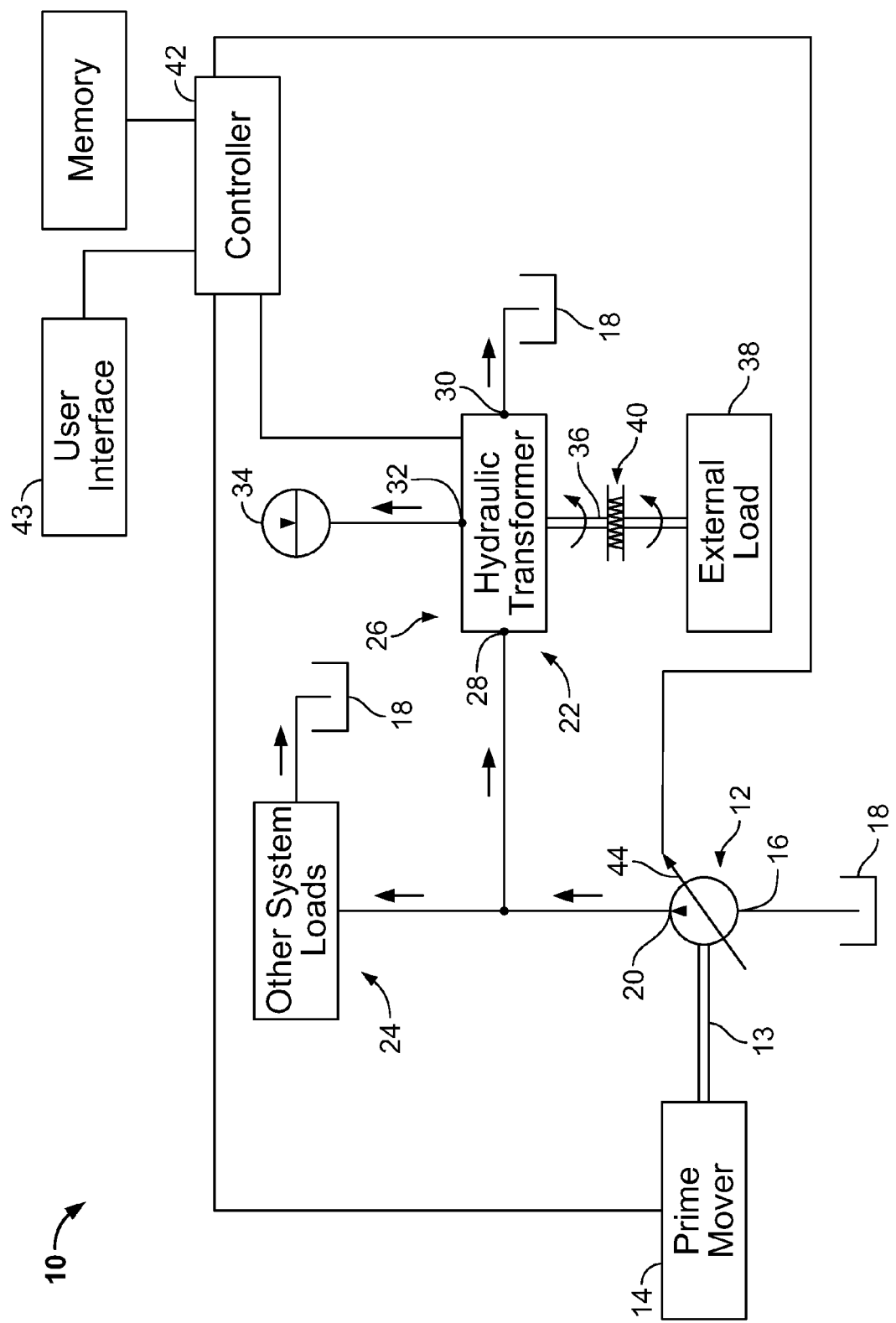
FIGS. 3-11 show the first hydraulic system of FIG. 1 operating in the various operating modes outlined in the matrix table of FIG. 2.

Box 64 of the matrix table 50 represents an operating state/mode where the prime mover 14 is under a low load and the hydraulic transformer 26 is providing a motoring function in which torque is being transferred to the external load 38 through the output/input shaft 36. The system 10 operates in this mode when the electronic controller 42 receives a command from an operator interface 43 (e.g., a control panel, joy stick, toggle, switch, control lever, etc.) instructing the electronic controller 42 to accelerate or otherwise drive the external load 38 through rotation of the output/input shaft 36. In this mode/state, the controller 42 controls operation of the hydraulic transformer 26 such that some hydraulic fluid pressure from the variable displacement pump 12 is used to drive the output/input shaft 36 and the remainder of the hydraulic fluid pressure from the variable displacement pump 12 is used to charge the accumulator 34 (see FIG. 3).

Figure 4:
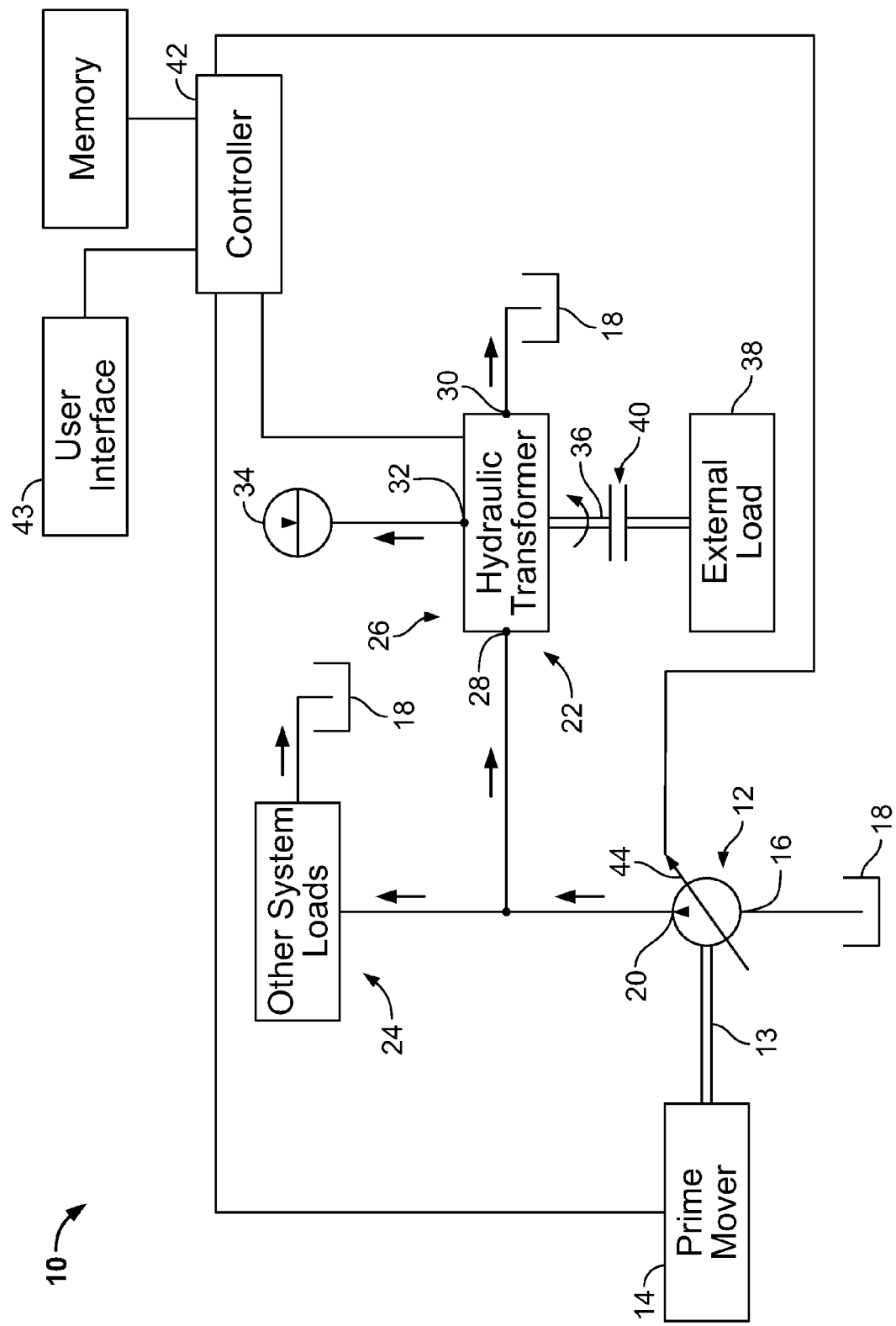

Box 66 of the matrix table 50 represents an operating mode/state where the prime mover 14 is operating under a low load and the output/input shaft 36 is disengaged from the external load 38. In this mode/state, the controller 42 controls operation of the hydraulic transformer 26 such that the transformer 26 functions as a stand-alone transformer in which all excess hydraulic fluid pressure from the variable displacement pump 12 (e.g., excess power not needed by the second working circuit 24) is used to charge the accumulator 34 (see FIG. 4). In this way, the transformer 26 and the accumulator 34 provide an energy buffering function in which otherwise unused energy from the prime mover 14 is stored for later use.

Figure 5:
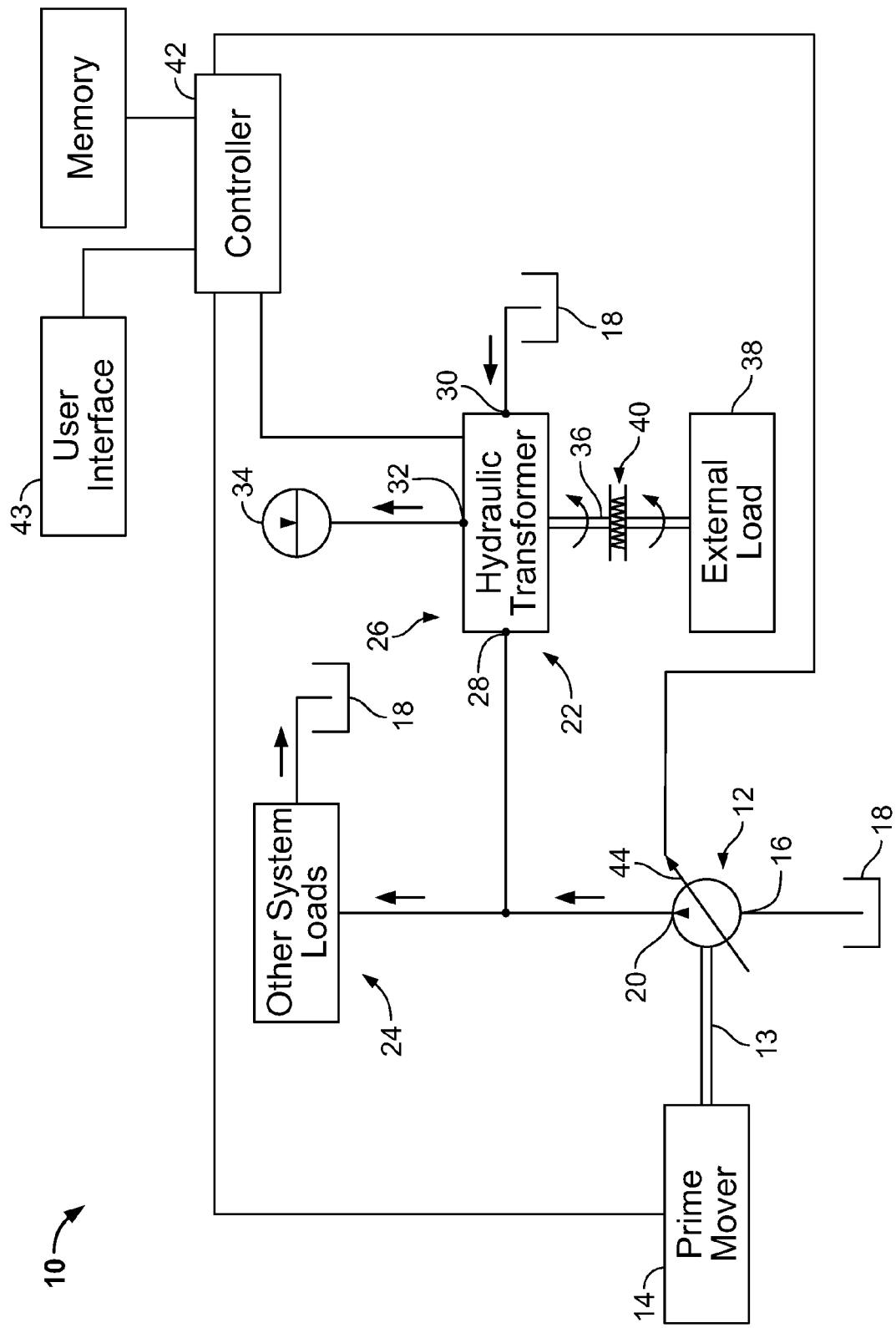

Box 68 of the matrix table 50 represents an operating mode/state where the prime mover 14 is under a low load and the transformer 26 is functioning as a pump in which torque is being transferred into the transformer 26 through the output/input shaft 36. The system 10 operates in this mode/state when the electronic controller 42 receives a command from the operator interface 43 instructing the electronic controller 42 to decelerate rotation of the external load 38. This creates an overrunning condition in which energy corresponding to the movement of the external load 38 (e.g., inertial energy) is converted into torque and transferred into the transformer 26 through the output/input shaft 36. In this condition, the electronic controller 42 controls the transformer 26 such that the transformer 26 provides a pumping function that converts the torque derived from the inertial energy of the external load 38 into hydraulic energy which is used to charge the accumulator 34 (see FIG. 5). As energy is transferred to the accumulator 34, the transformer 26 functions to brake rotation of the output/input shaft 36 to achieve the desired deceleration. In this mode/state, the electronic controller 42 can also control the transformer 26 such that excess energy from the variable displacement pump 12 is concurrently used to charge the accumulator 34.

Figure 6:
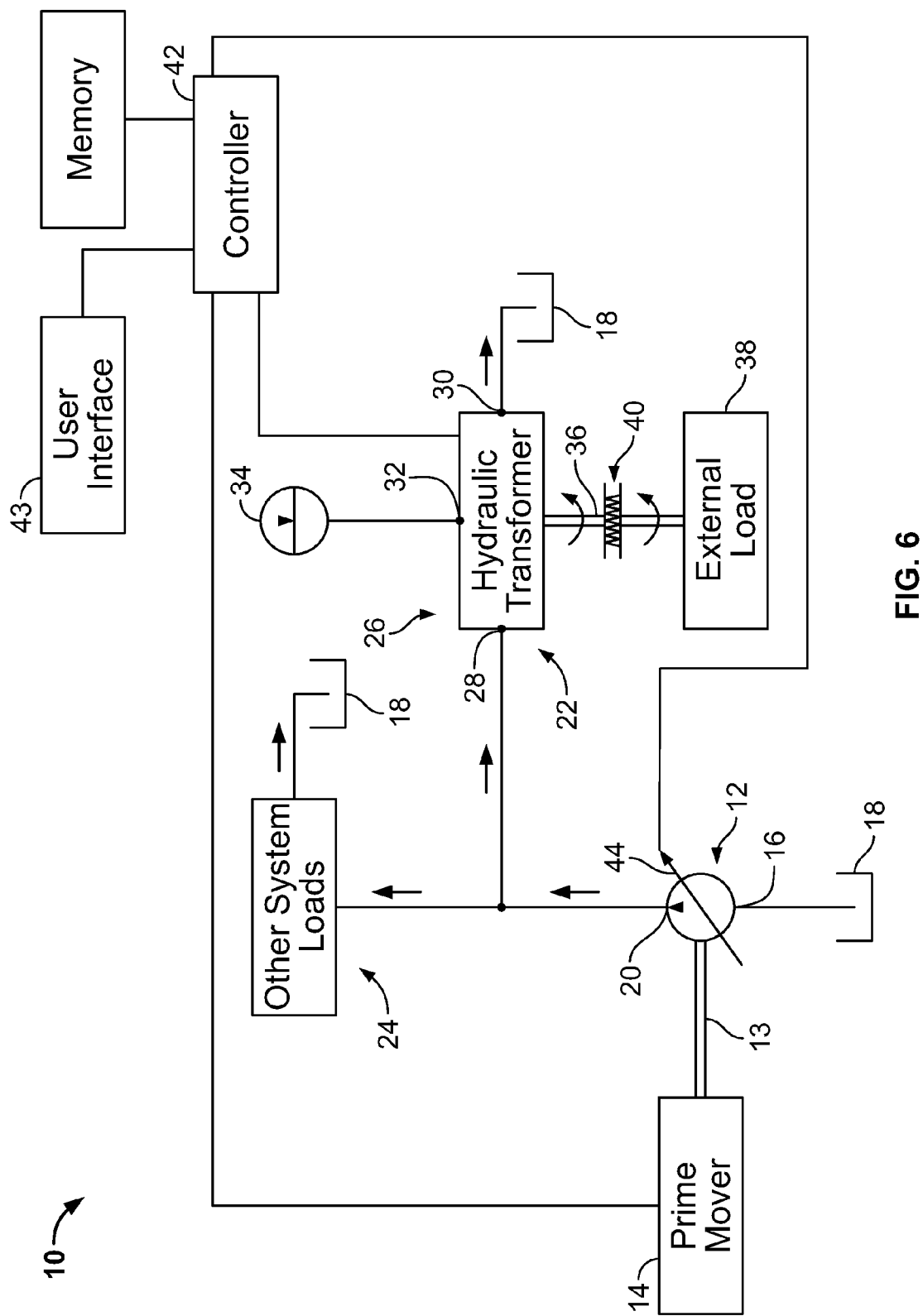

Box 70 of the matrix table 50 represents a mode/state where the prime mover 14 is operating at a target load and the hydraulic transformer 26 is providing a motoring function in which the output/input shaft 36 drives the external load 38. In this mode/state, the electronic controller 42 controls the transformer 26 such that energy from the variable displacement pump 12 is used to drive the output/input shaft 36 and no energy is transferred to the accumulator 34 (see FIG. 6).

Figure 7:
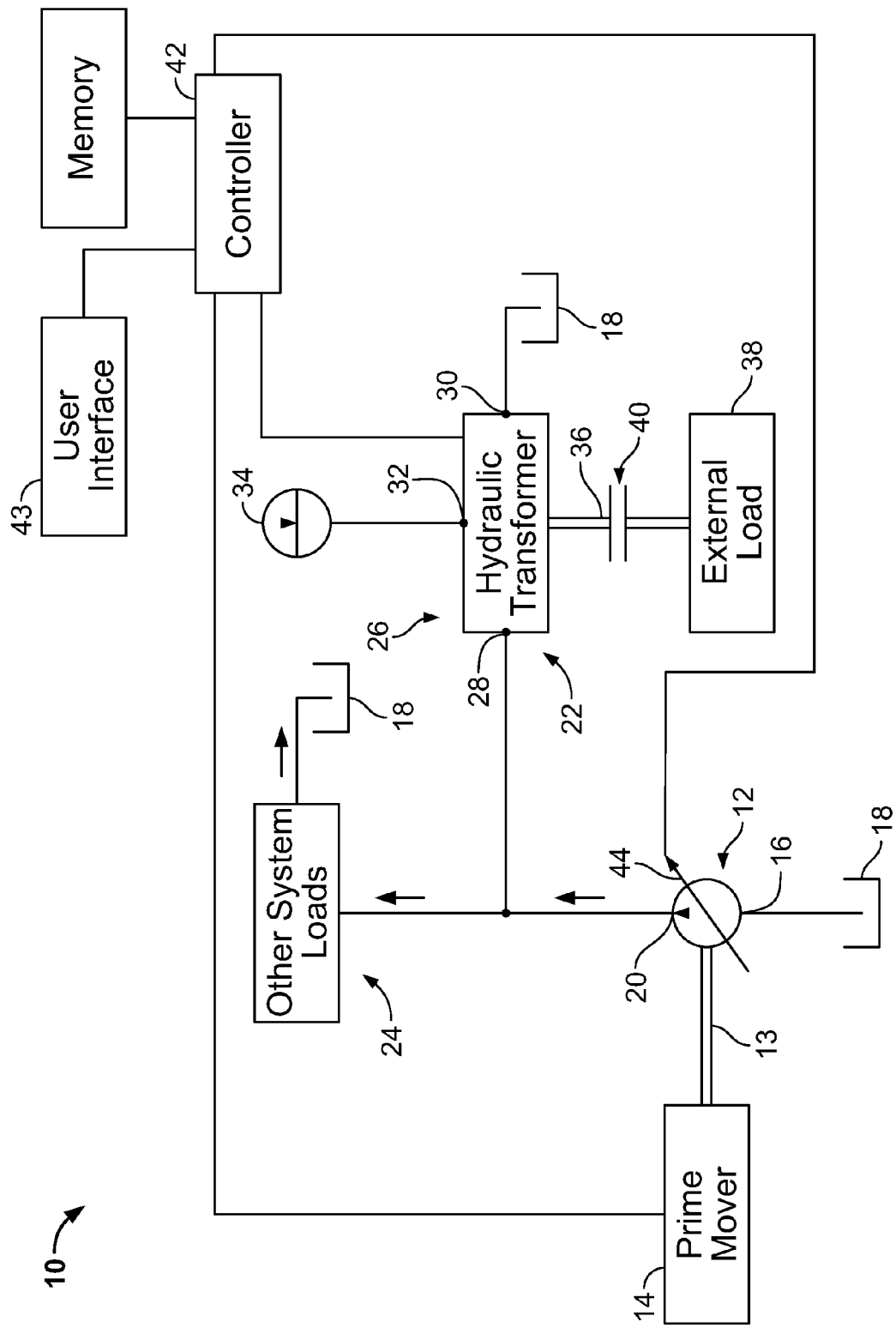

Box 72 represents a mode/state where the prime mover 14 is at a target load and the output/input shaft 36 is disengaged from the external load 38. In this mode/state, the electronic controller 42 controls the transformer 26 such that no energy is transferred through the hydraulic transformer 26 (see FIG. 7).

Figure 8:
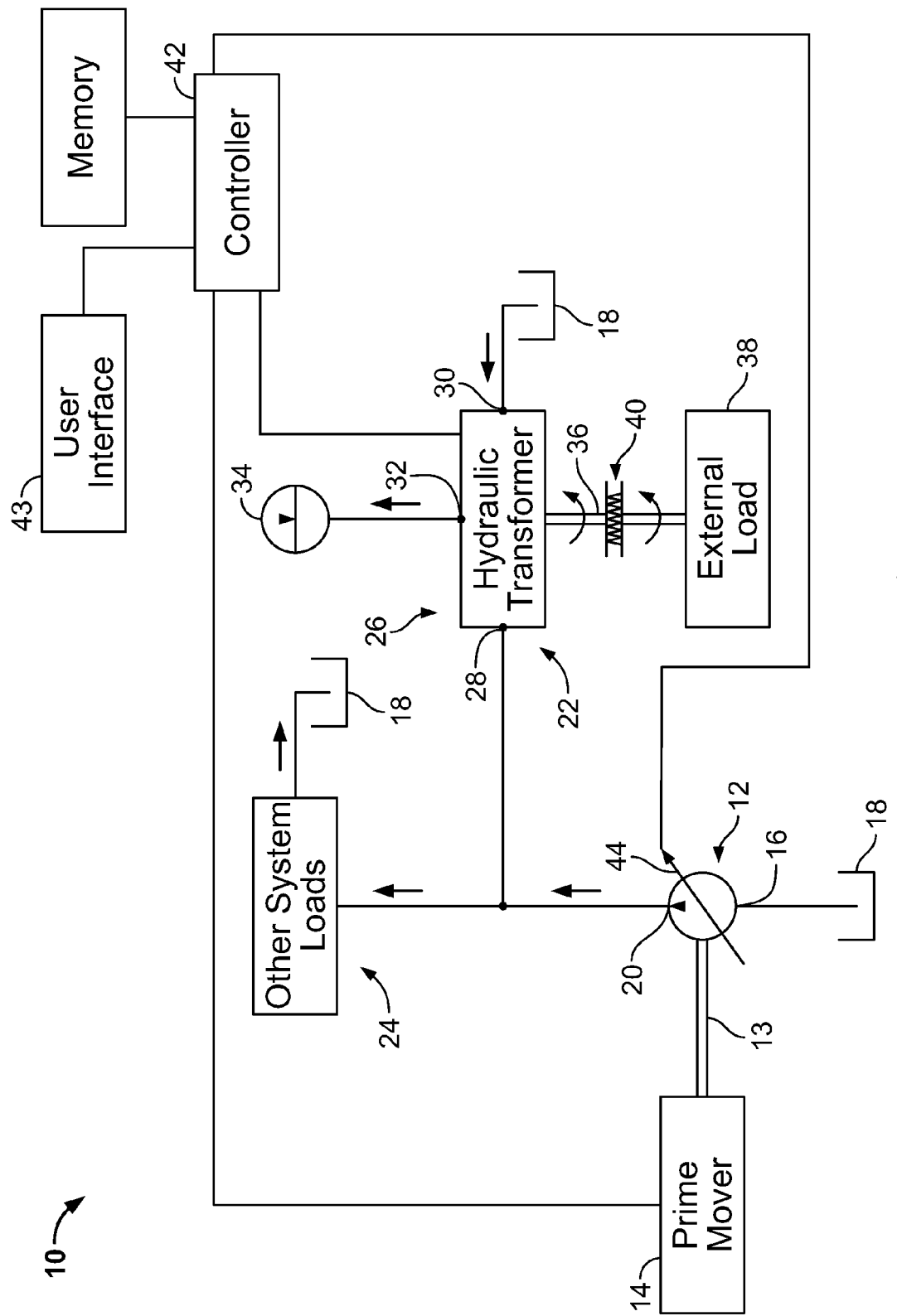

Box 74 of the matrix table 50 is representative of a mode/state where the prime mover 14 is at a target load and the transformer 26 is functioning as a pump in which torque is being transferred into the transformer 26 through the output/input shaft 36. The system 10 operates in this mode/state when the electronic controller 42 receives a command from the operator interface 43 instructing the electronic controller 42 to decelerate rotation of the external load 38. This creates an overrunning condition in which energy corresponding to the movement of the external load 38 (e.g., inertial energy) is converted into torque and transferred into the transformer 26 through the output/input shaft 36. In this mode/state, the electronic controller 42 controls the transformer 26 such that the transformer 26 provides a pumping function that converts the torque derived from the inertial energy of the external load 38 into hydraulic energy which is used to charge the accumulator 34 (see FIG. 8). As energy is transferred to the accumulator 34, the transformer 26 functions to brake rotation of the output/input shaft 36 to achieve the desired deceleration.

Figure 9:
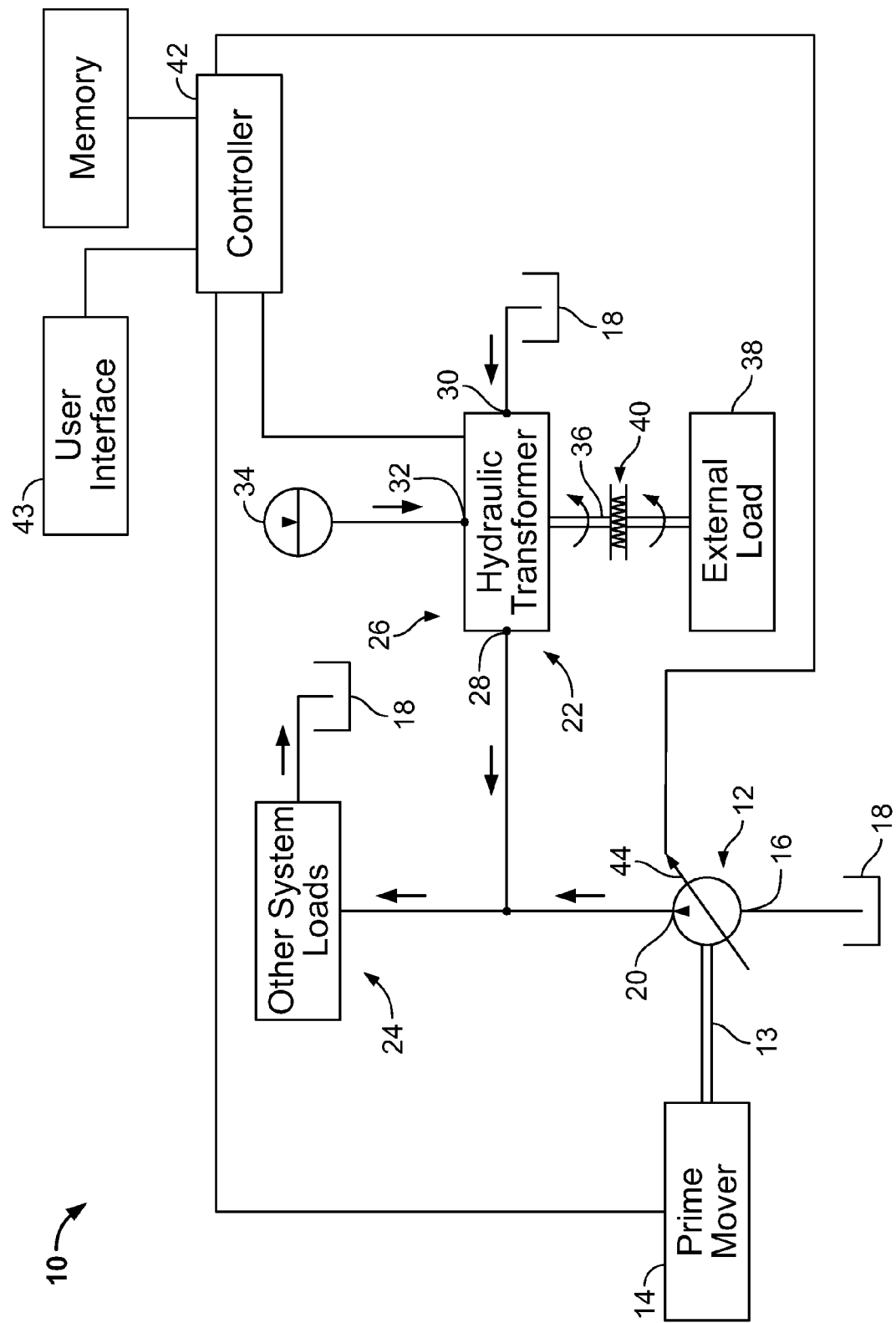

Box 76 of the matrix table 50 is representative of an operating mode/state where the prime mover 14 is operating under a high load and the transformer 26 provides motoring function in which the output/input shaft 36 drives the external load 38. In this mode/state, the controller 42 controls the transformer 26 such that energy from the accumulator 34 is used to rotate the output/input shaft 36 for driving the external load 38. Also, the transformer 26 is controlled by the controller 42 such that excess energy from the accumulator 34 can be concurrently transferred back toward the variable displacement pump 12 and the second load circuit 24 (see FIG. 9) to assist in leveling/reducing the load on the prime mover 14.

Figure 10:
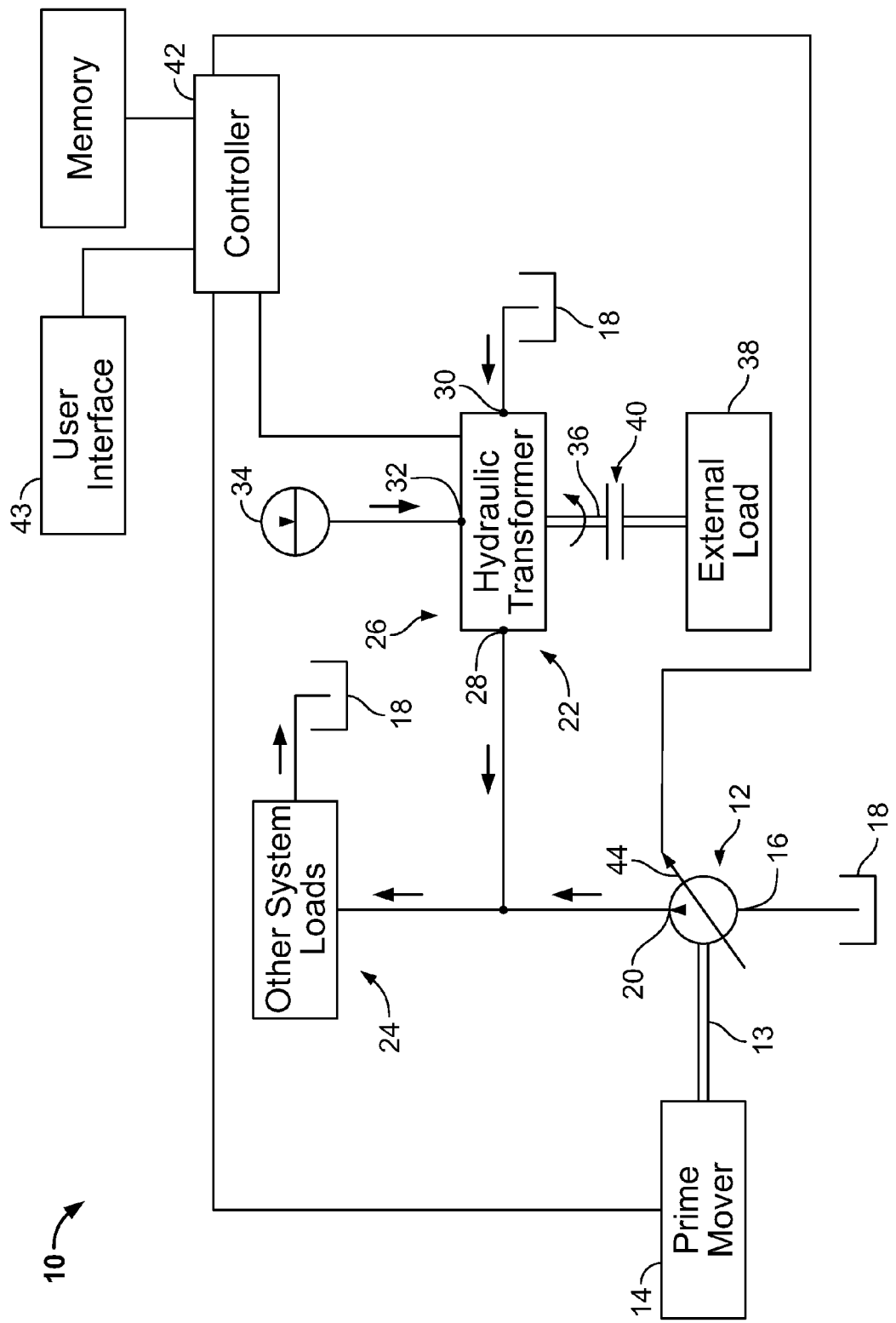

Box 78 of the matrix table 50 is representative of an operating mode/state where the prime mover 14 is operating under a high load condition and the output/input shaft 36 is disconnected from the external load 38. In this condition, the electronic controller 42 controls the transformer 26 such that energy from the accumulator 34 is directed through the hydraulic transformer 26 back toward the pump 12 and the second load circuit 24 for use at the second load circuit 24 (see FIG. 10) to assist in leveling/reducing the load on the prime mover 14. It will be appreciated that the pump 12 and the second load circuit 24 can be referred to as the "system side" of the overall hydraulic system 10.

Figure 11:
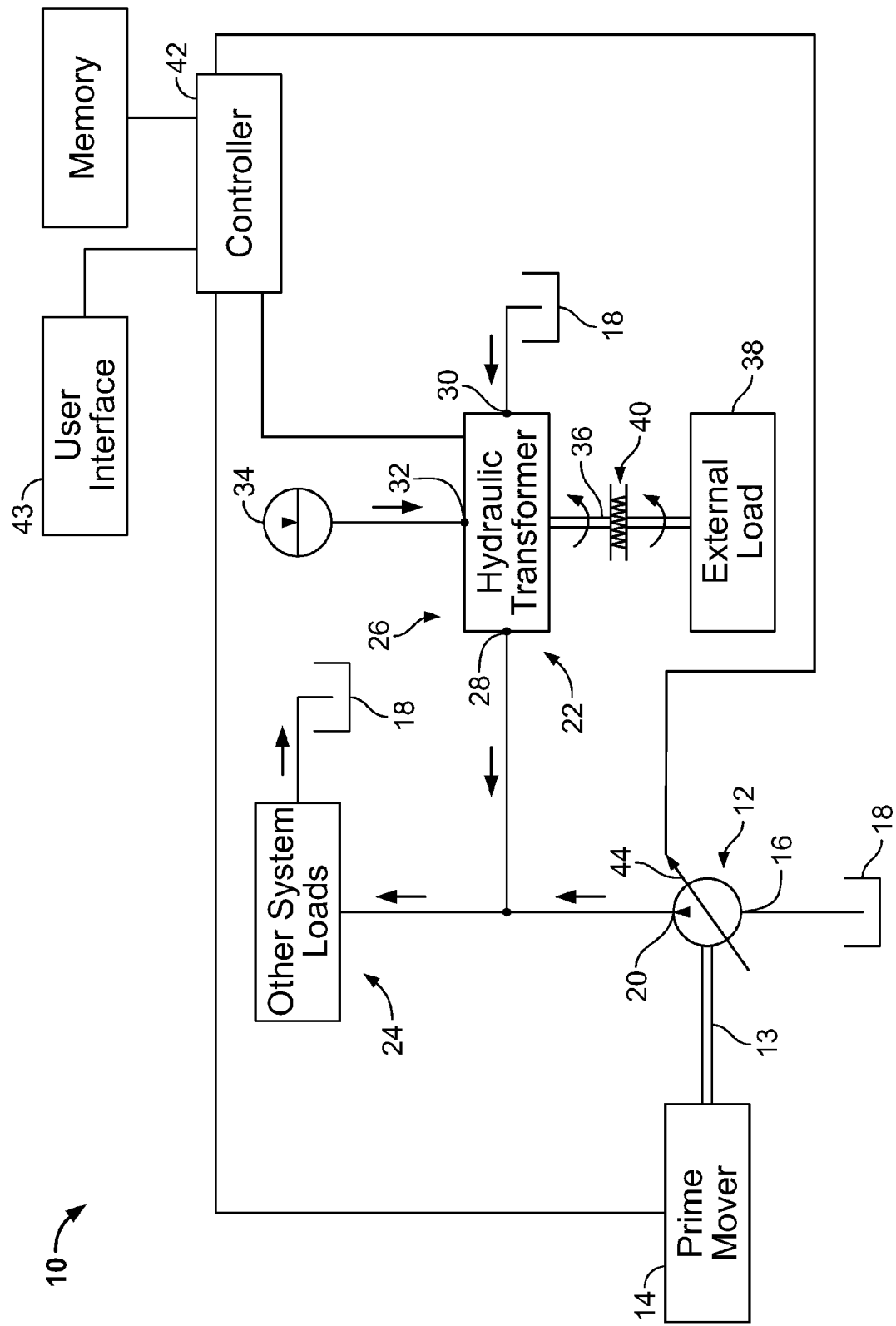

Box 80 of the matrix table 50 is representative of an operating mode/state where the prime mover 14 operating under a high load and the transformer 26 is functioning as a pump in which torque is being transferred into the transformer 26 through the output/input shaft 36. The system 10 operates in this mode/state when the electronic controller 42 receives a command from the operator interface 43 instructing the electronic controller 42 to decelerate rotation of the external load 38. This creates an overrunning condition in which energy corresponding to the movement of the external load 38 (e.g., inertial energy) is converted into torque and transferred into the transformer 26 through the output/input shaft 36. In this mode/state, the electronic controller 42 controls the transformer 26 such that the transformer 26 provides a pumping function that converts the torque derived from the inertial energy of the external load 38 into hydraulic energy which is directed toward the system side of the hydraulic system 10 and used to assist in leveling/reducing the load on the prime mover 14. As energy is transferred to the system side, the transformer 26 functions to brake rotation of the output/input shaft 36 to achieve the desired deceleration. In this condition, the electronic controller 42 can also control the transformer 26 such that energy from the accumulator 34 is concurrently directed back toward the system side of the overall hydraulic system 10 and the second load circuit 24 for use at the second load circuit 24 (see FIG. 11).

Figure 12:
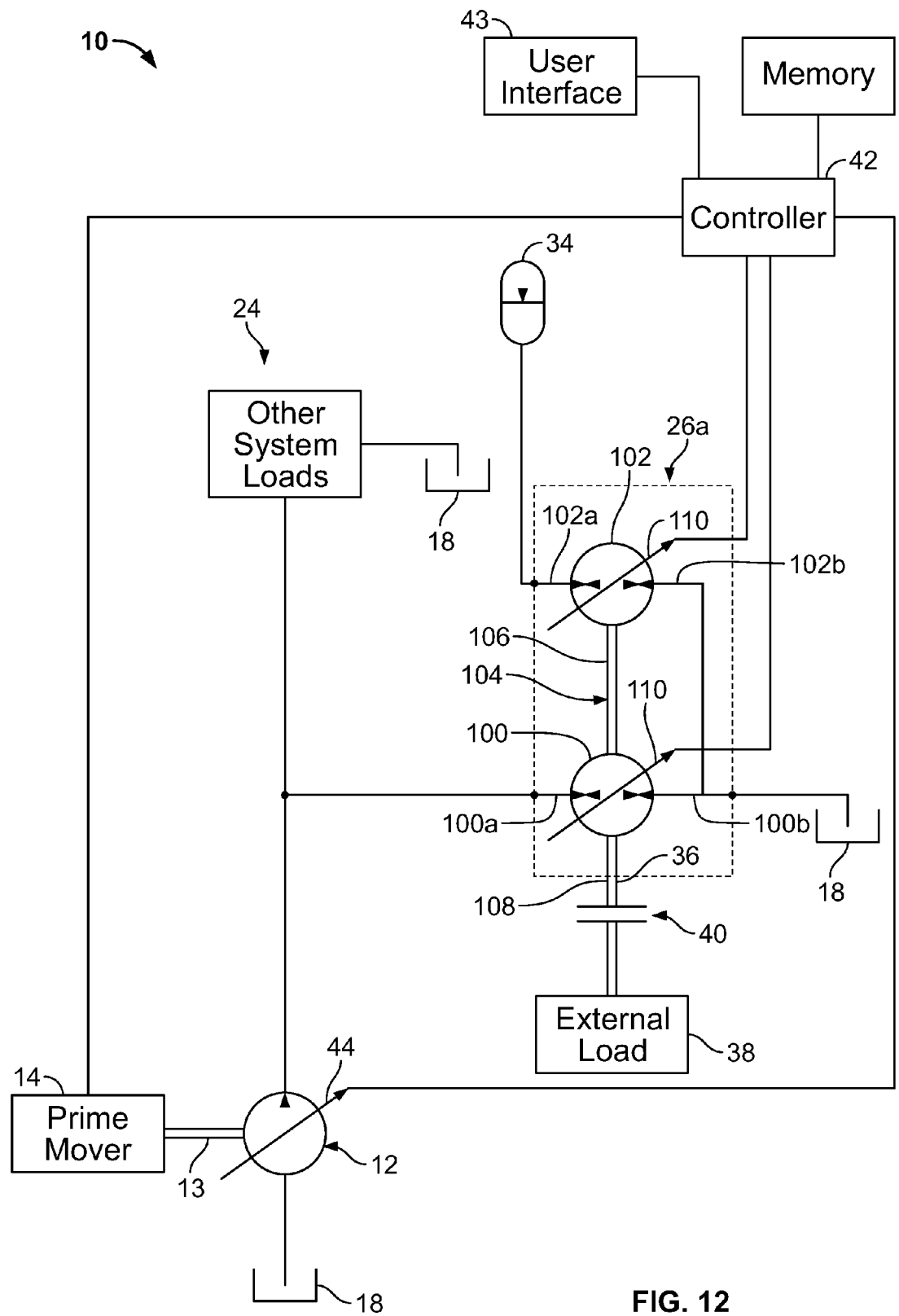
FIG. 12 is a schematic diagram of a second hydraulic system in accordance with the principles of the present disclosure.

FIG. 12 shows the system 10 of FIGS. 1-11 equipped with a hydraulic transformer 26a having a plurality of pump/motor units connected by a common shaft. For example, the hydraulic transformer 26a includes first and second variable volume positive displacement pump/motor units 100, 102 connected by a shaft 104. The shaft 104 includes a first portion 106 that connects the first pump/motor unit 100 to the second pump/motor unit 102, and a second portion 108 that forms the output/input shaft 36. The first pump/motor unit 100 includes a first side 100a fluidly connected to the variable displacement pump 12 and a second side 100b fluidly connected to the tank 18. The second pump/motor unit 102 includes a first side 102a fluidly connected to the accumulator 34 and a second side 102b fluidly connected to the tank 18.

In one embodiment, each of the first and second pump/motor units 100, 102 includes a rotating group (e.g., cylinder block and pistons) that rotates with the shaft 104, and a swash plate 110 that can be positioned at different angles relative to the shaft 104 to change the amount of pump displacement per each shaft rotation. The volume of hydraulic fluid displaced across a given one of the pump/motor units 100, 102 per rotation of the shaft 104 can be varied by varying the angle of the swash plate 110 corresponding to the given pump/motor unit. Varying the angle of the swash plate 110 also changes the torque transferred between the shaft 104 and the rotating group of a given pump/motor unit. When the swash plates 110 are aligned perpendicular to the shaft 104, no hydraulic fluid flow is directed through the pump/motor units 100, 102. The swash plates 110 can be over-the-center swash plates that allow for bi-directional rotation of the shaft 104. The angular positions of the swash plates 110 are individually controlled by the electronic controller 42 based on the operating condition of the system 10.

Figure 13:
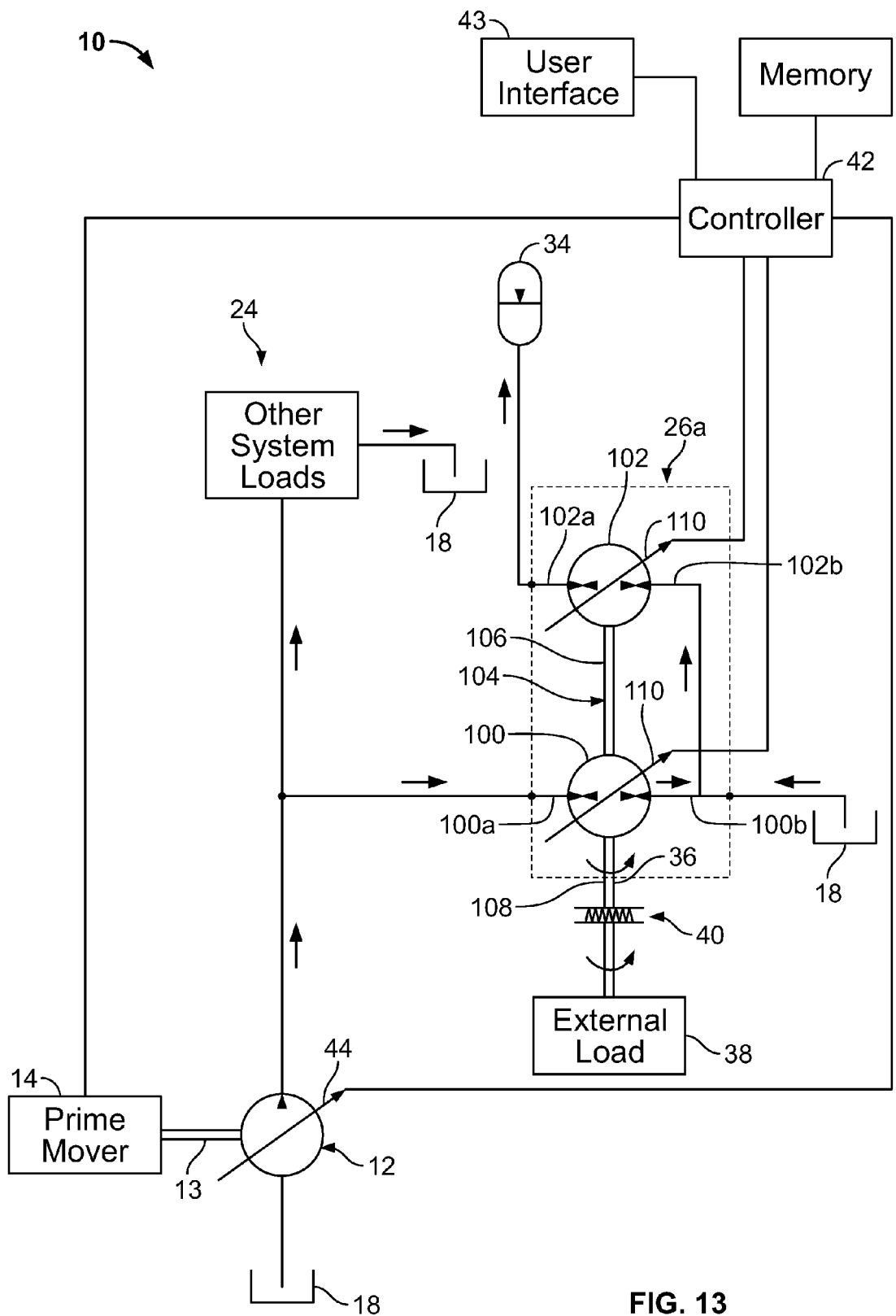
FIGS. 13-21 show the second hydraulic system operating in the various operating modes outlined in the matrix table of FIG. 2.
Figure 14:
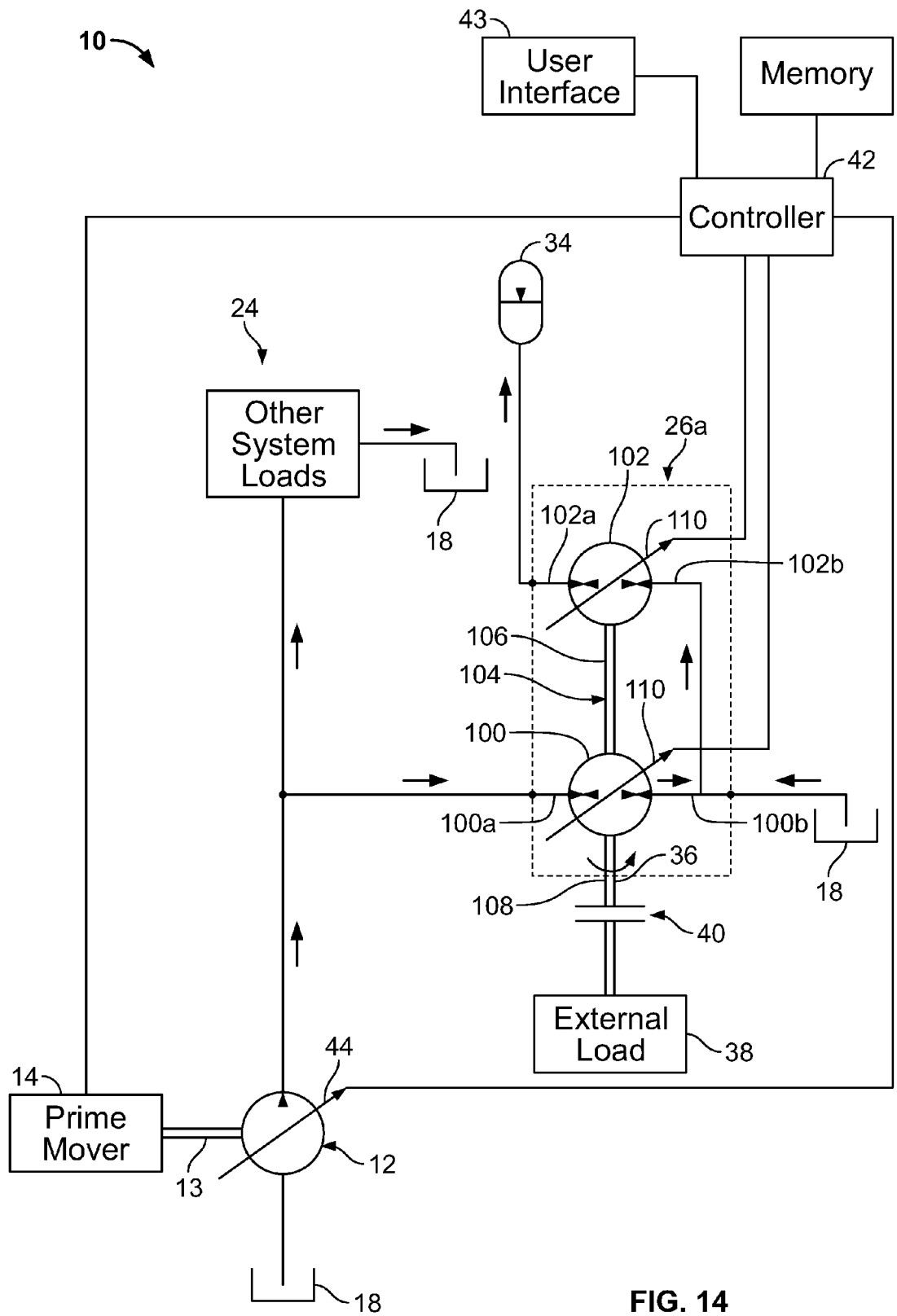
Figure 15:
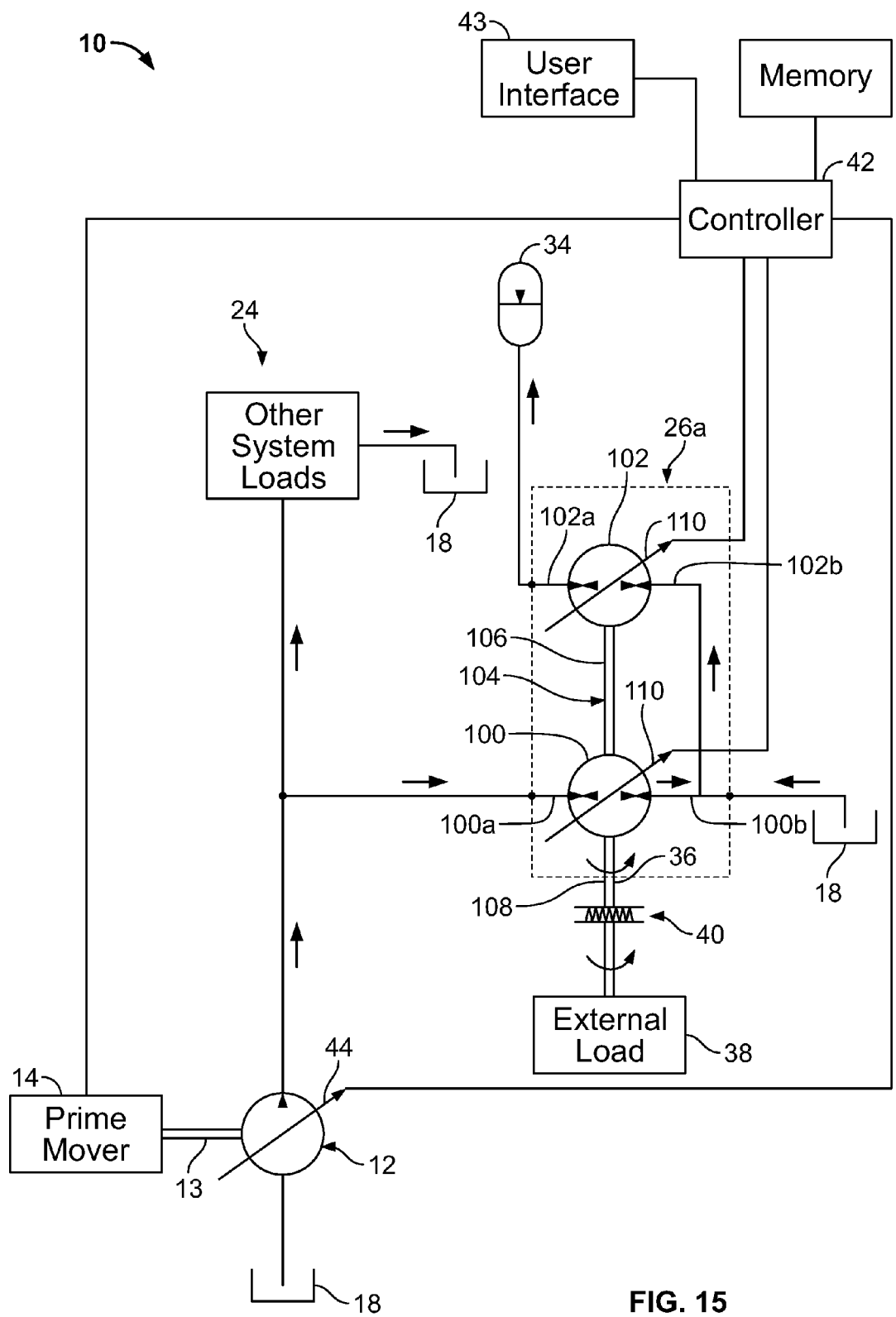
Figure 16:
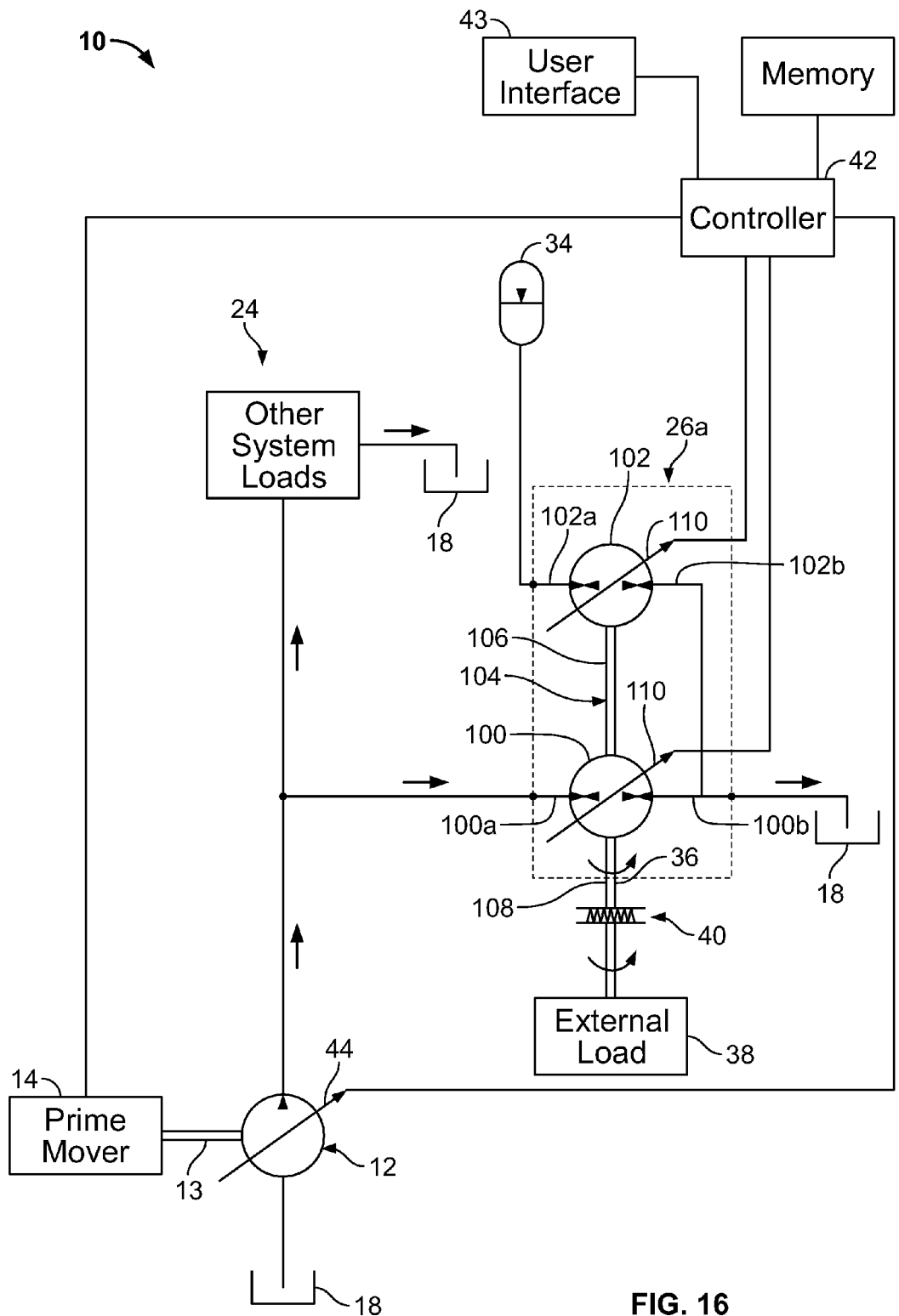
Figure 17:
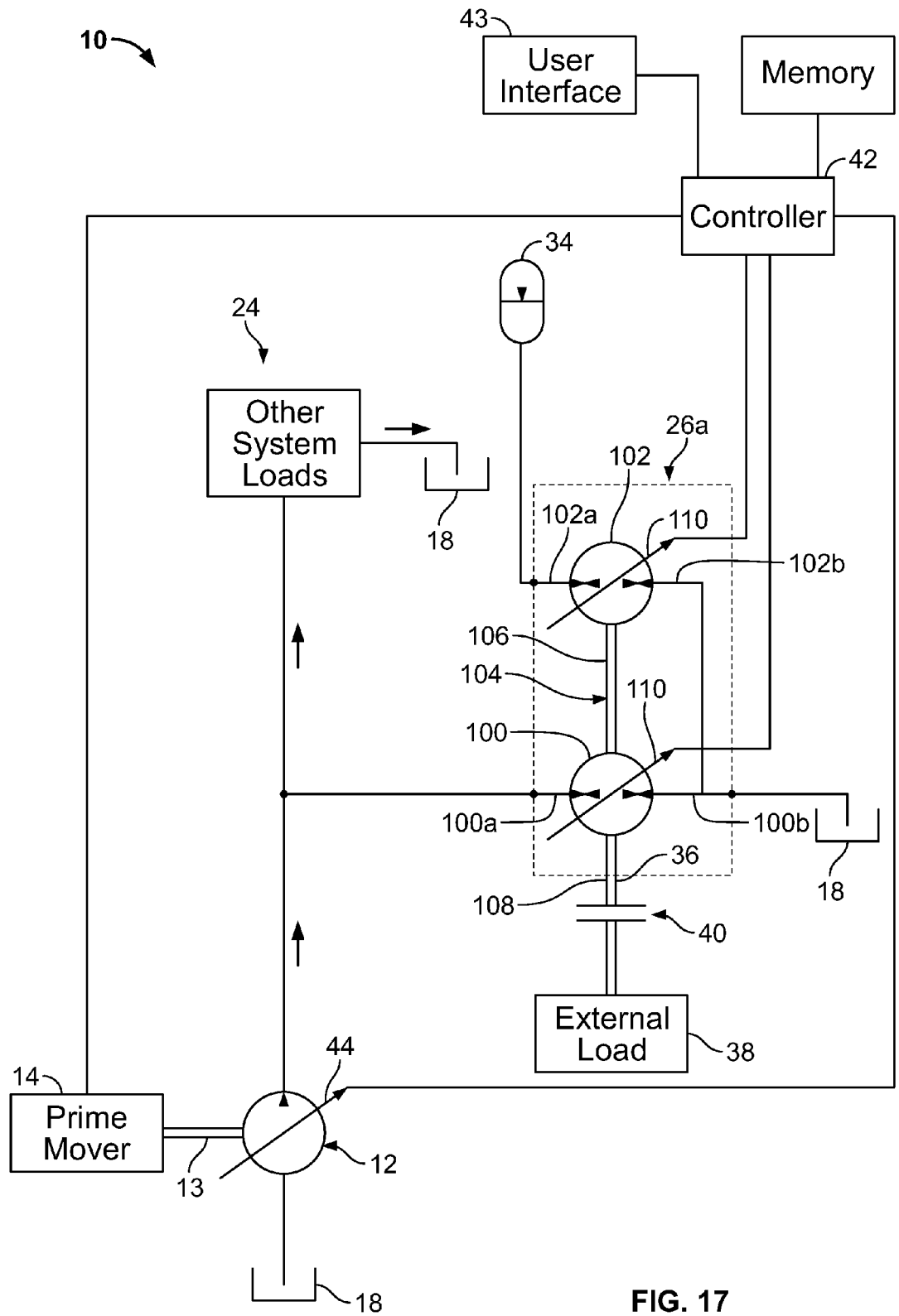
Figure 18:
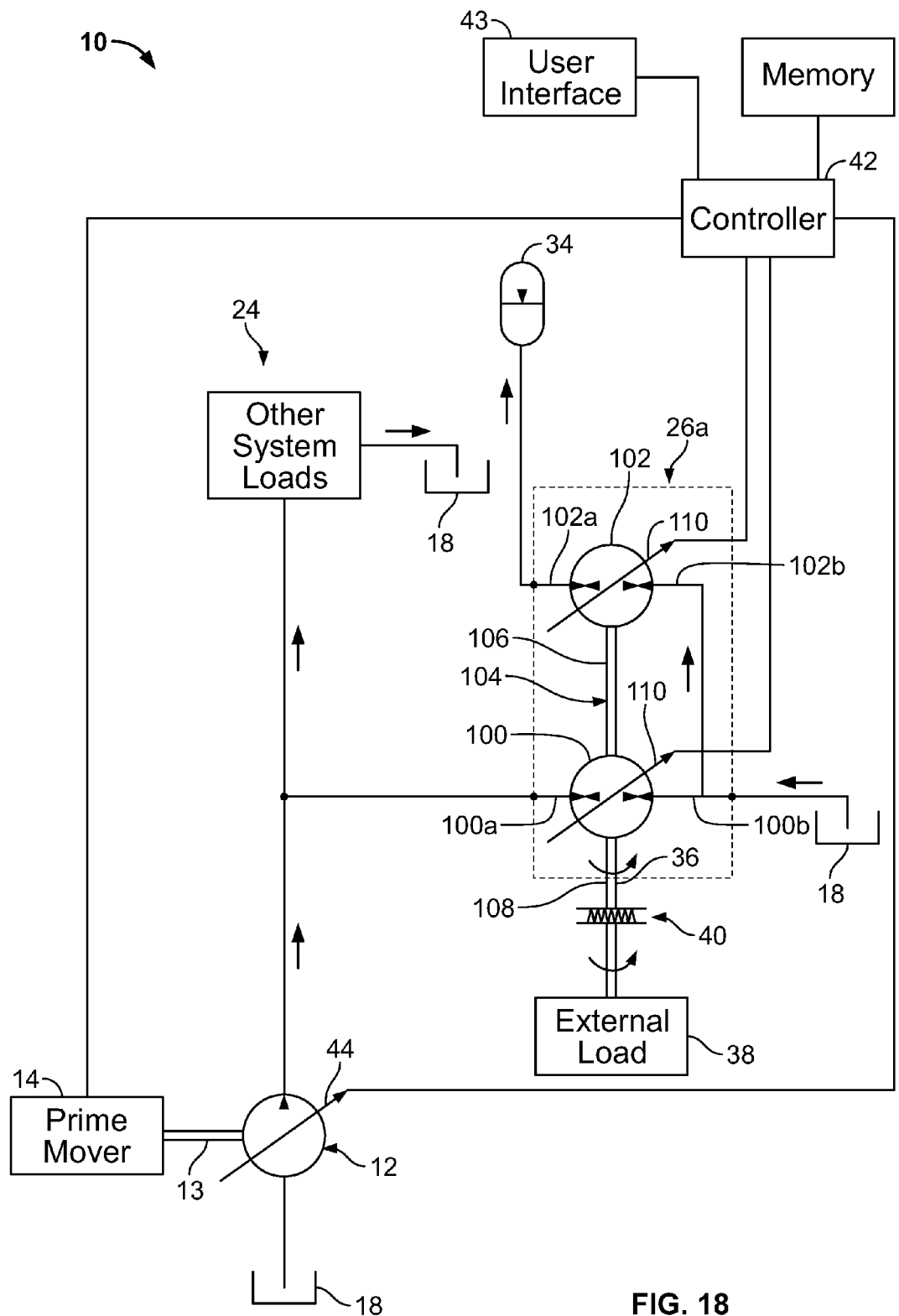
Figure 19:
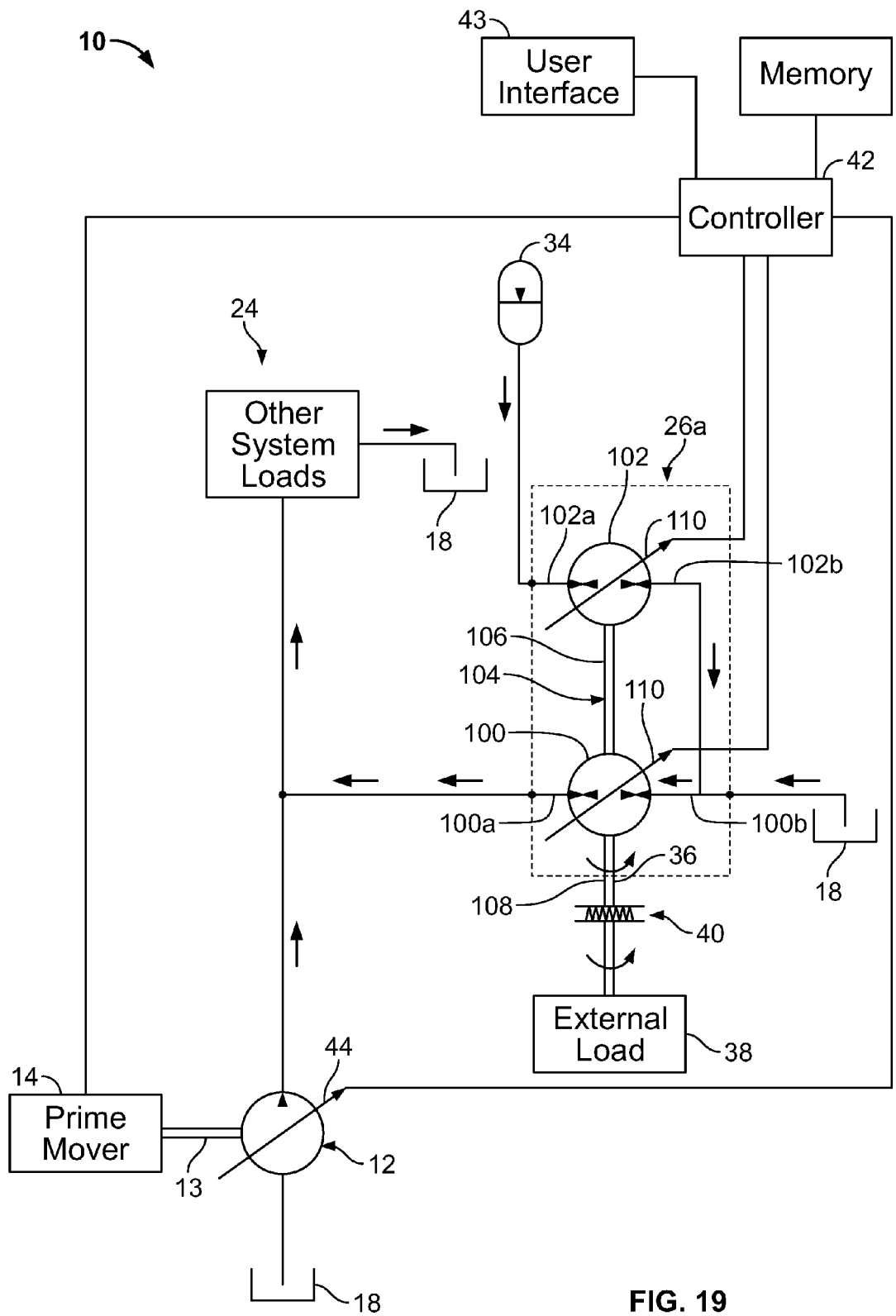
Figure 20:
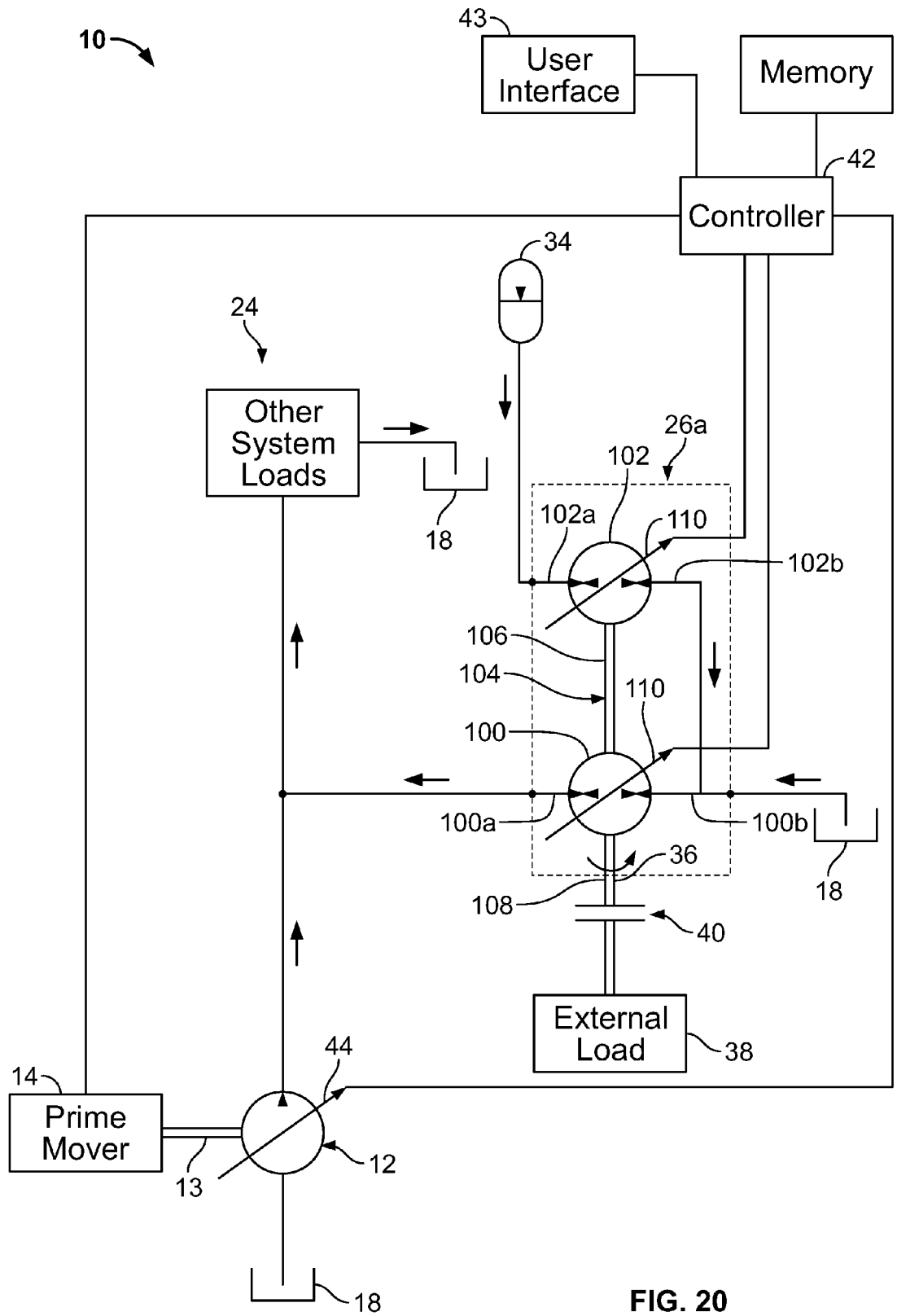
Figure 21:
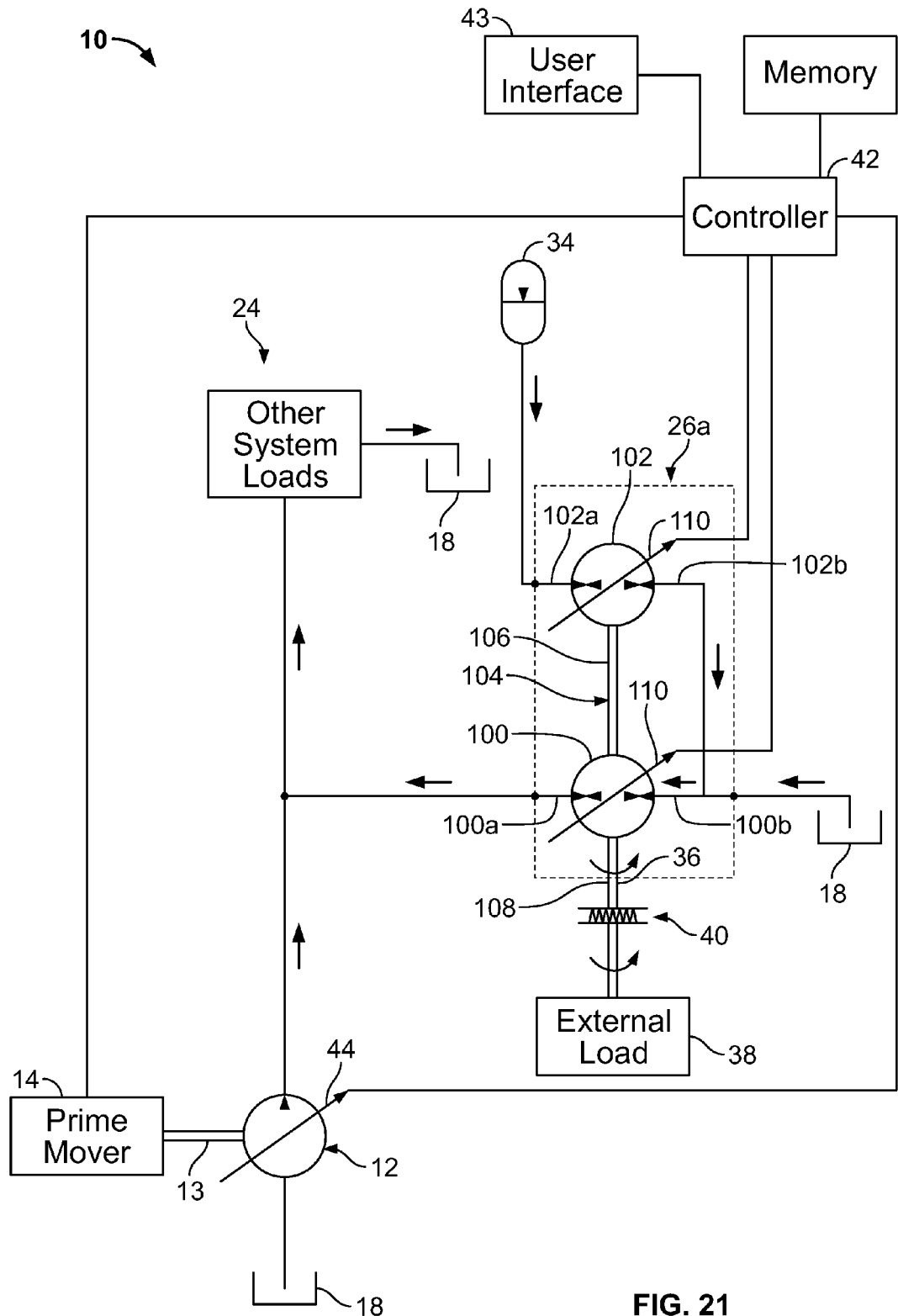

By controlling the positions of the swash plates 110, the controller 42 can operate the system 10 in any one of the operating modes set forth in the matrix table 50 of FIG. 2. When the system 10 is operated in the mode of box 64, the first pump/motor unit 100 uses power from the pump 12 to turn the shaft 104 and drive the external load 38, and the second pump/motor unit 102 takes power off the shaft 104 and uses the power to pump hydraulic fluid into the accumulator 34 (see FIG. 13). When the system 10 is operated in the mode of box 66, the first pump/motor unit 100 uses power from the pump 12 to turn the shaft 104, and the second pump/motor unit 102 takes power off the shaft 104 and uses the power to pump hydraulic fluid into the accumulator 34 to charge the accumulator 34 (see FIG. 14). When the system 10 is operated in the mode of box 68, inertial energy from the moving external load 38 turns the shaft 104, and the second pump/motor unit 102 takes power off the shaft 104 and uses the power to pump hydraulic fluid into the accumulator 34 to charge the accumulator 34 (see FIG. 15). Energy from the pump 12 can also be concurrently used to charge the accumulator 34. When the system 10 is operated in the mode of box 70, the first pump/motor unit 100 uses power from the pump 12 to turn the shaft 104 and drive the external load 38, and the second pump/motor unit 102 is set to zero displacement (see FIG. 16). When the system 10 is operated in the mode of box 72, both of the pump/motor units 100, 102 are set to zero displacement (see FIG. 17). When the system 10 is operated in the mode of box 74, inertial energy from the moving external load 38 turns the shaft 104, and the second pump/motor unit 102 takes power off the shaft 104 and uses the power to pump hydraulic fluid into the accumulator 34 to charge the accumulator 34, and the first pump/motor 100 is set to zero displacement (see FIG. 18). When the system 10 is operated in the mode of box 76, the second pump/motor unit 102 uses power from the charged accumulator 34 to turn the shaft 104 and drive the external load 38, and the first pump/motor unit 101 pumps hydraulic fluid back toward the pump 12 and the second load circuit 24 (see FIG. 19). When the system 10 is operated in the mode of box 78, the second pump/motor unit 102 uses power from the charged accumulator 34 to turn the shaft 104, and the first pump/motor unit 101 pumps hydraulic fluid back toward the pump 12 and the second load circuit 24 (see FIG. 20). When the system 10 is operated in the mode of box 80, the second pump/motor unit 102 uses power from the charged accumulator 34 to turn the shaft 104, inertial energy from the moving external load 38 also turns the shaft 104, and the first pump/motor unit 101 pumps hydraulic fluid back toward the pump 12 and the second load circuit 24 (see FIG. 21).

By controlling the displacement rates and displacement directions of the pump/motor units 100, 102, fluid power (pressure times flow) at a particular level can be converted to an alternate level, or supplied as shaft power used to drive the external load 38. When a deceleration of the external load 38 is desired, the hydraulic transformer 26a can act as a pump taking low pressure fluid from the tank 18 and directing it either to the accumulator 34 for storage, to the second load circuit 24 connected to the variable displacement pump 12, or a combination of the two. By using the clutch 40 to disengage the output/input shaft 36 from the external load 38, the hydraulic transformer 26a can function as a stand-alone hydraulic transformer (e.g., a conventional hydraulic transformer) when no shaft work is required to be applied to the external load 38. This is achieved by taking energy from the system 10 at whatever pressure is dictated by the other associated system loads (e.g., the load corresponding to the second load circuit 24) and storing the energy, without throttling, at the current accumulator pressure. In the same way, unthrottled energy can also be taken from the accumulator 34 at its current pressure and supplied to the system 10 at the desired operating pressure. Proportioning of power flow by the hydraulic transformer 26a can be controlled by controlling the positions of the swash plates 110 on the pump/motor units 100, 102. In certain embodiments, aspects of the present disclosure can be used in systems without a clutch for disengaging a connection between the output/input shaft 36 and the external load 38.

Figure 22:
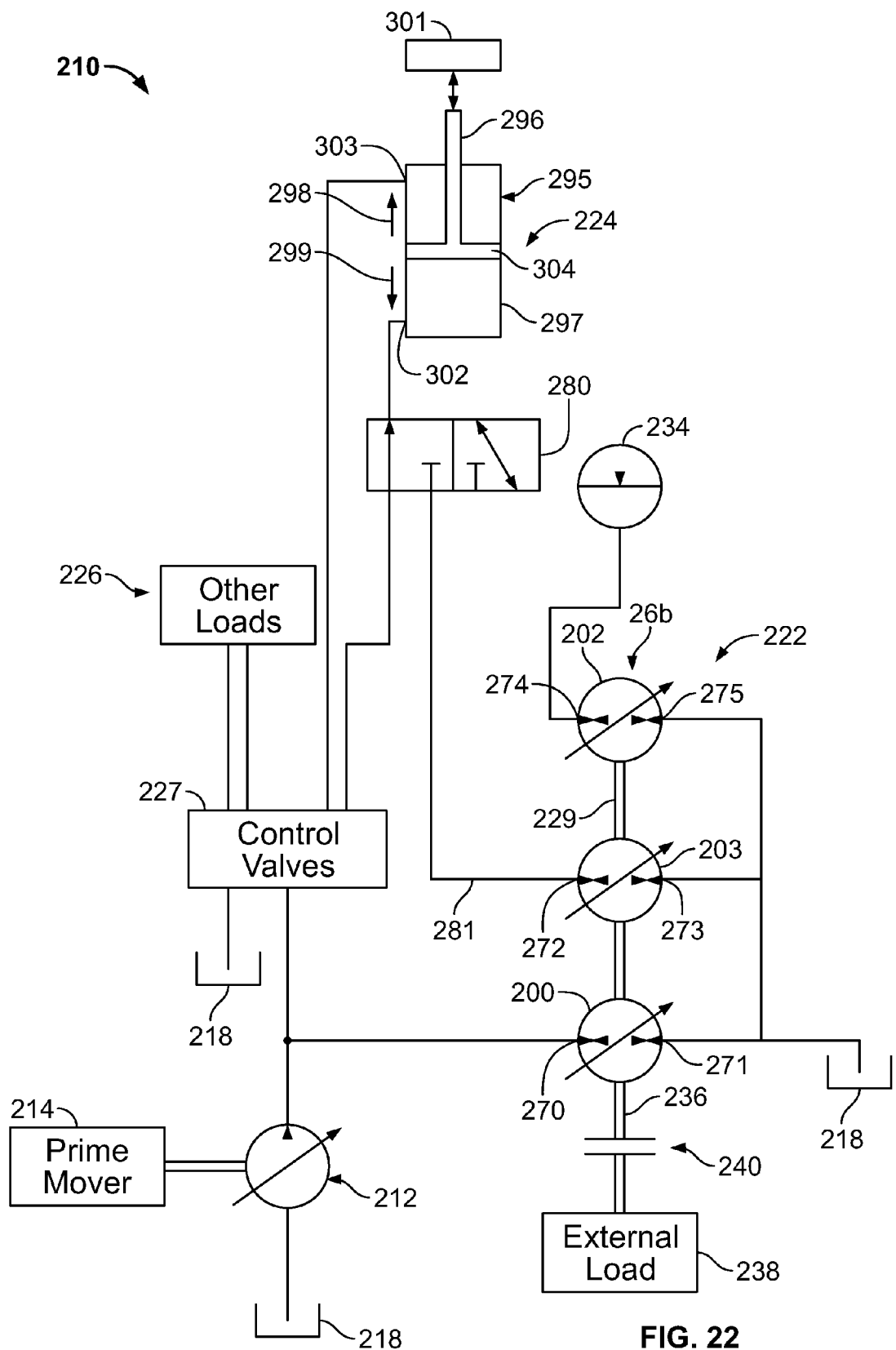
FIGS. 22 and 23 are schematic diagrams showing two operating configurations of a third hydraulic system in accordance with the principles of the present disclosure.

FIG. 22 shows another system 210 in accordance with the principles of the present disclosure. This system 210 includes a variable displacement pump 212 powered by a prime mover 214. The variable displacement pump 212 draws hydraulic fluid from a tank 218 and outputs pressurized hydraulic fluid for powering a first load circuit 222, a second load circuit 224, and a third load circuit 226. A control valve arrangement 227 controls fluid communication between the variable displacement pump 212 and the second and third load circuits 224, 226. The first load circuit 222 includes a hydraulic transformer 26b including three rotating groups connected by a common shaft 229. The common shaft 229 includes an end portion forming an output/input shaft 236. A clutch 240 is used to selectively couple the output/input shaft 236 to an external load 238 and to selectively decouple the output/input shaft 236 from the external load 238.

The rotating groups of the hydraulic transformer 26b include a first variable displacement pump/motor unit 200, a second variable displacement pump/motor unit 202, and a third variable displacement pump/motor unit 203. A first side 270 of the first pump/motor unit 200 is fluidly connected to an output side of the variable displacement pump 212 and a second side 271 of the first pump/motor unit 200 is fluidly connected to the tank 218. A first side 272 of the third pump/motor unit 203 is fluidly connected to a flow line 281 that connects to the second load circuit 224. A flow control valve 280 is positioned along the flow line 281. A second side 273 of the third pump/motor unit 203 is fluidly connected to the tank 218. A first side 274 of the second pump/motor unit 202 is fluidly connected to a hydraulic pressure accumulator 234, and a second side 275 of the third pump/motor unit 203 is fluidly connected to the tank 218. The pump/motors 200, 202, and 203 can have the same type of configuration as the pump/motors previously described herein.

The second load circuit 224 includes a hydraulic cylinder 295 having a piston 296 mounted within a cylinder body 297. The piston 296 is movable in a lift stroke direction 298 and a return stroke direction 299. When the piston 296 is moved in the lift stroke direction 298, the hydraulic cylinder 295 is used to lift or move a work element 301 (e.g., a boom) against a force of gravity. The work element 301 moves with the force of gravity when the piston 296 moves in the return stroke direction 299. The cylinder body 297 defines first and second ports 302, 303 positioned on opposite sides of a piston head 304 of the piston 296.

To drive the piston 296 in the lift stroke direction 298, hydraulic fluid is pumped from the pump 212 through the control valve arrangement 227 and the flow control valve 280 into the cylinder body 297 through the first port 302. Concurrently, movement of the piston head 304 in the lift stroke direction 298 forces hydraulic fluid out of the cylinder body 297 through the second port 303. The hydraulic fluid exiting the cylinder body 297 through the second port 303 flows through the control valve arrangement 227 which directs the hydraulic fluid to the tank 218.

Figure 23:
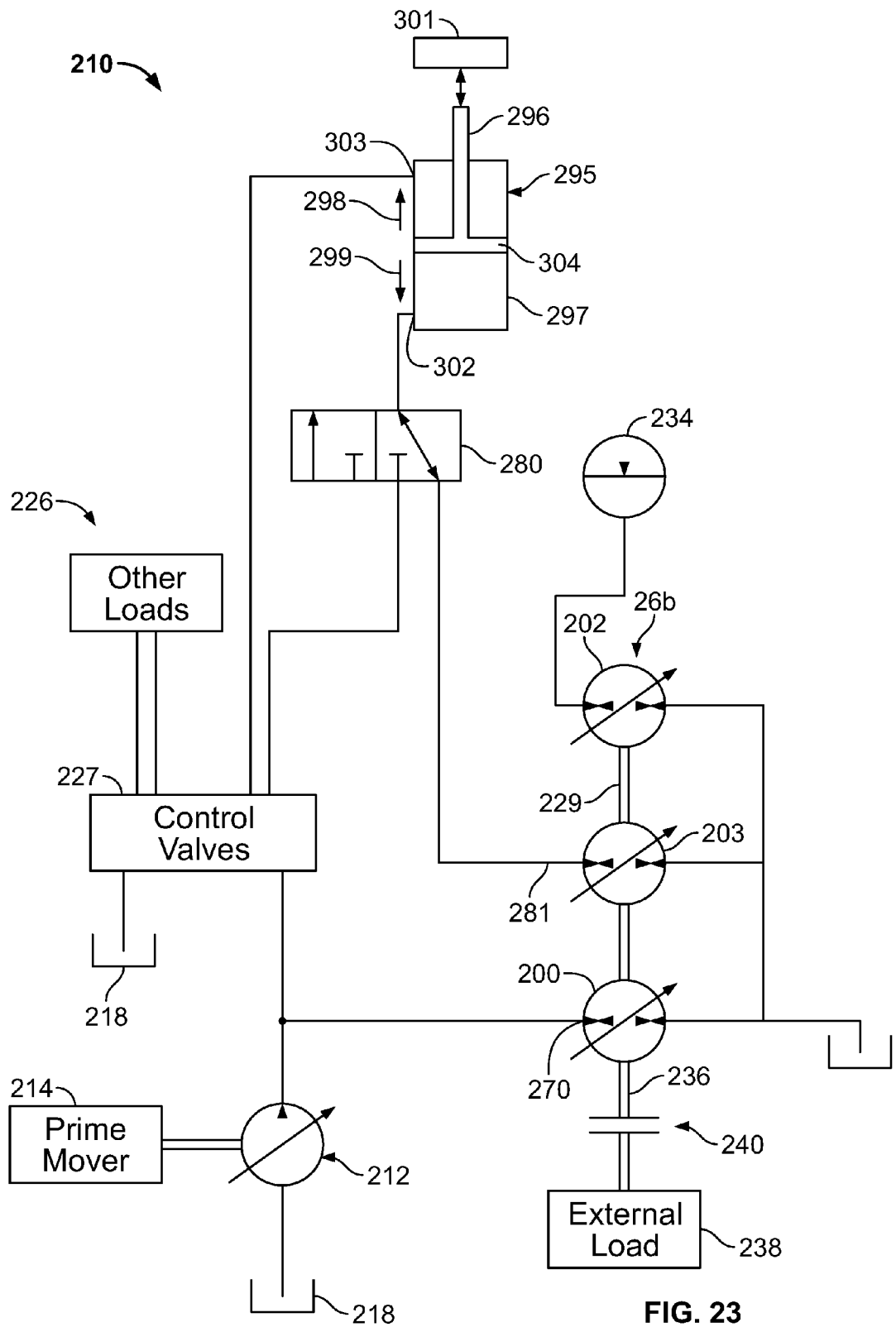

To move the piston 296 in the return stroke direction 299, hydraulic fluid is pumped from the pump 212 through the control valve arrangement 227 into the cylinder body 297 through the second port 303. Concurrently, movement of the piston head 304 in the return stroke direction 299 forces hydraulic fluid out of the cylinder body 297 through the first port 302. Movement of the piston head 304 in the return stroke direction 299 is gravity assisted/powered (e.g., by the weight of the lifted work element 301) causing the hydraulic fluid exiting the first port 302 to be pressurized. By shifting the flow control valve 280 as shown at FIG. 23, the hydraulic fluid output from the first port 302 during the return stroke of the piston 296 can be routed through the flow line 281 to the third pump/motor unit 203 such that energy from the pressurized fluid exiting the cylinder body 297 can be used to drive the common shaft 229. As the common shaft 229 is driven by pressure released from the hydraulic cylinder 295, energy corresponding to the return stroke of the piston 296 can be transferred to the accumulator 234 through the second pump/motor unit 202 and/or can be transferred to the external load 238 through the output/input shaft 236. Additionally, the energy can also be transferred back toward the variable displacement pump 212 in the form of pressurized hydraulic fluid pumped out the first side 270 of the first pump/motor unit 200. In this way, the hydraulic transformer 26b allows for the recovery and use of potential energy corresponding to the lifted weight of the work element 301 which was elevated during the lift stroke of the hydraulic cylinder 295.

Similar to the previously described embodiments, the transformer 26b and accumulator 234 also allow excess energy from the pump 212 to be stored in the accumulator 234 to provide an energy buffering function. Also, similar to the previously described embodiments, energy corresponding to a deceleration of the working load 238 can be stored in the accumulator 234 for later use and/or directed back toward the pump 212 for use at the second or third load circuits 224, 226 to provide a load leveling function. Additionally, the valve 280 and third pump/motor unit 203 also allow energy from the accumulator 34 or corresponding to a deceleration of the working load 238 to be used to drive the piston 296 in the lift direction 298. As compared to the modes set forth at FIG. 2, the addition of the third pump/motor unit 203 linked to another circuit that can both draw power and supply power provides additional sets of operating modes/options.

Figure 24:
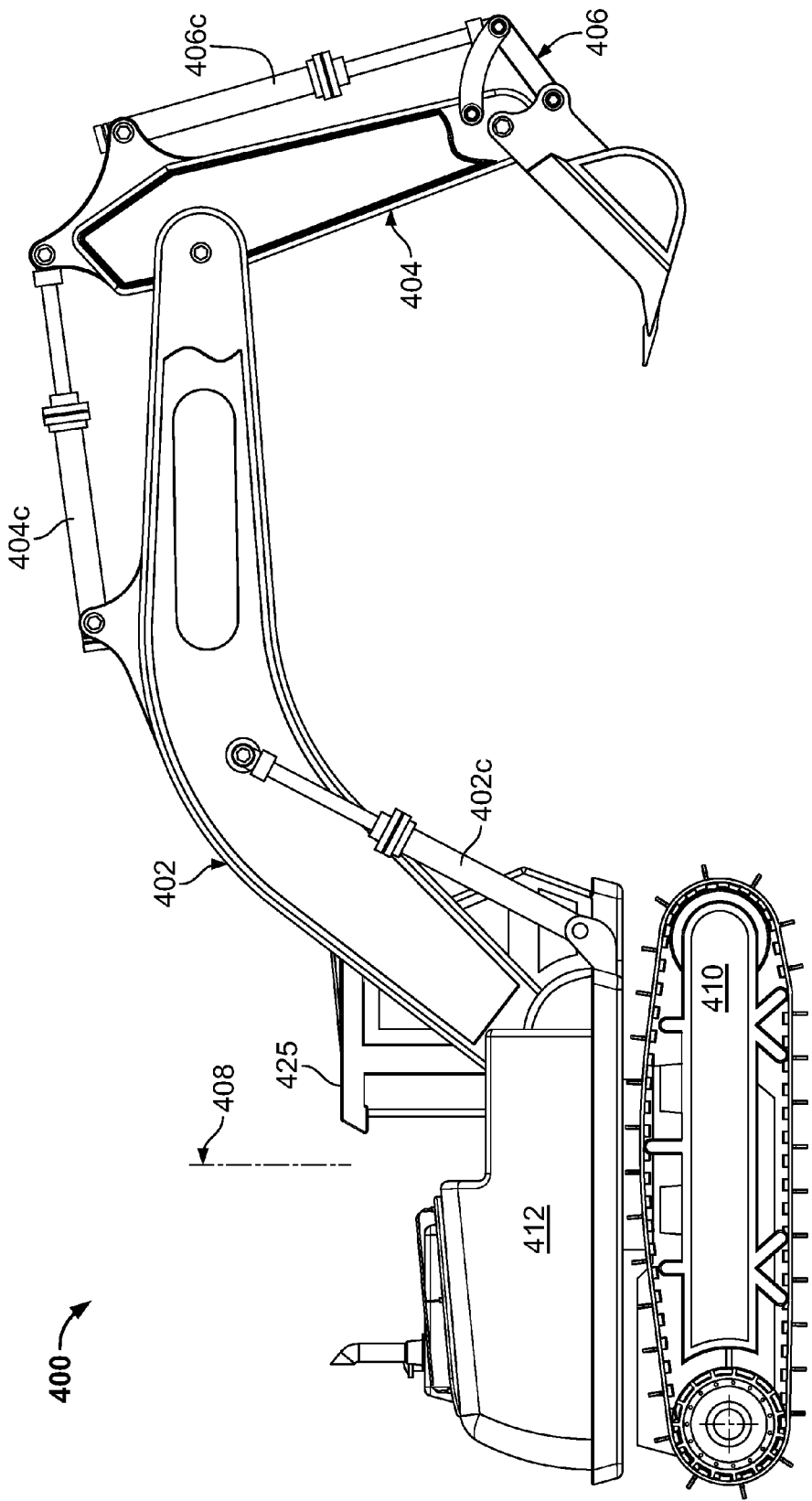
FIGS. 24 and 25 show a mobile piece of excavation equipment that is an example of one type of machine on which hydraulic systems in accordance with the principles of the present disclosure can be used.
Figure 25:
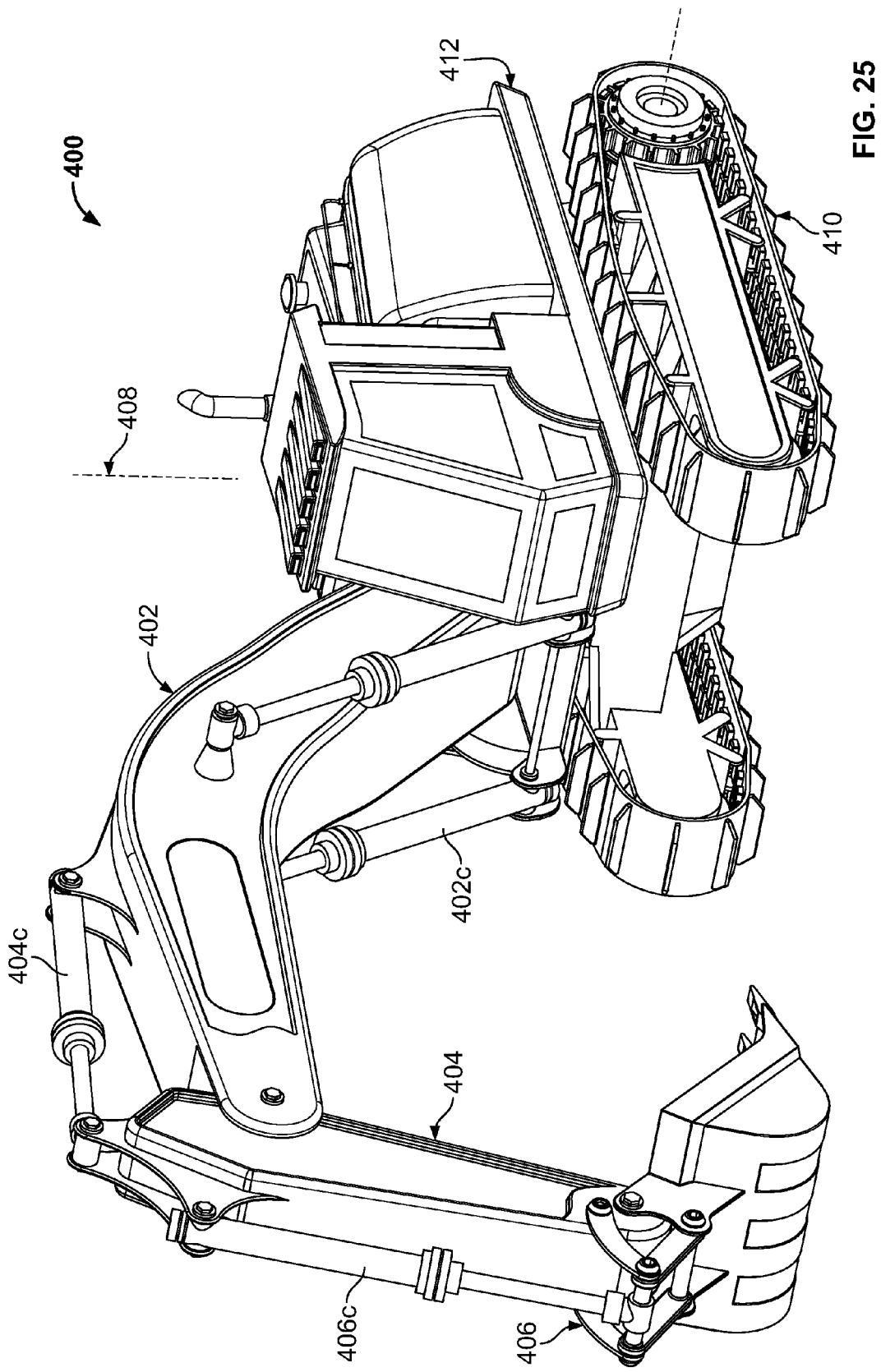

In one example embodiment, hydraulic circuit configurations of the type described above can be incorporated into a piece of mobile excavation equipment such as an excavator. For example, FIGS. 24 and 25 depict an example excavator 400 including an upper structure 412 supported on an undercarriage 410. The undercarriage 410 includes a propulsion structure for carrying the excavator 400 across the ground. For example, the undercarriage 410 can include left and right tracks. The upper structure 412 is pivotally movable relative to the undercarriage 410 about a pivot axis 408 (i.e., a swing axis). In certain embodiments, transformer input/output shafts of the type described above can be used for pivoting the upper structure 412 about the swing axis 408 relative to the undercarriage 410.

The upper structure 412 can support and carry the prime mover 14 of the machine and can also include a cab 425 in which an operator interface is provided. A boom 402 is carried by the upper structure 412 and is pivotally moved between raised and lowered positions by a boom cylinder 402c. An arm 404 is pivotally connected to a distal end of the boom 402. An arm cylinder 404c is used to pivot the arm 404 relative to the boom 402. The excavator 400 also includes a bucket 406 pivotally connected to a distal end of the arm 404. A bucket cylinder 406c is used to pivot the bucket 406 relative to the arm 404. In certain embodiments, the boom cylinder 402c, the arm cylinder 404c, and the bucket cylinder 406c can be part of system load circuits of the type described above. For example, the hydraulic cylinder 295 of the embodiment of FIGS. 22 and 23 can function as the boom cylinder 402c.

Figure 26:
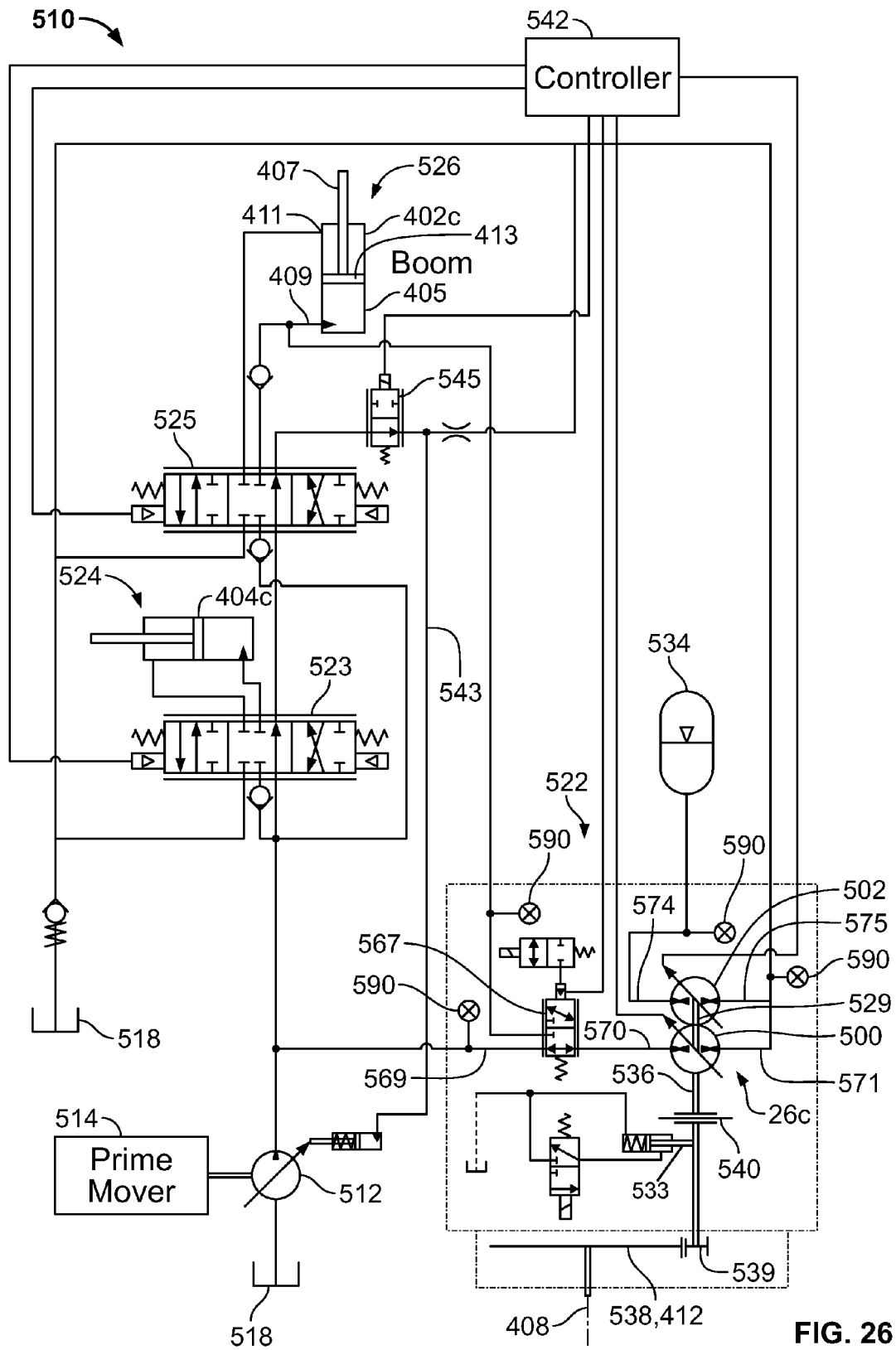
FIGS. 26 and 27 are schematic diagrams showing two operating configurations of a third hydraulic system in accordance with the principles of the present disclosure.
Figure 27:
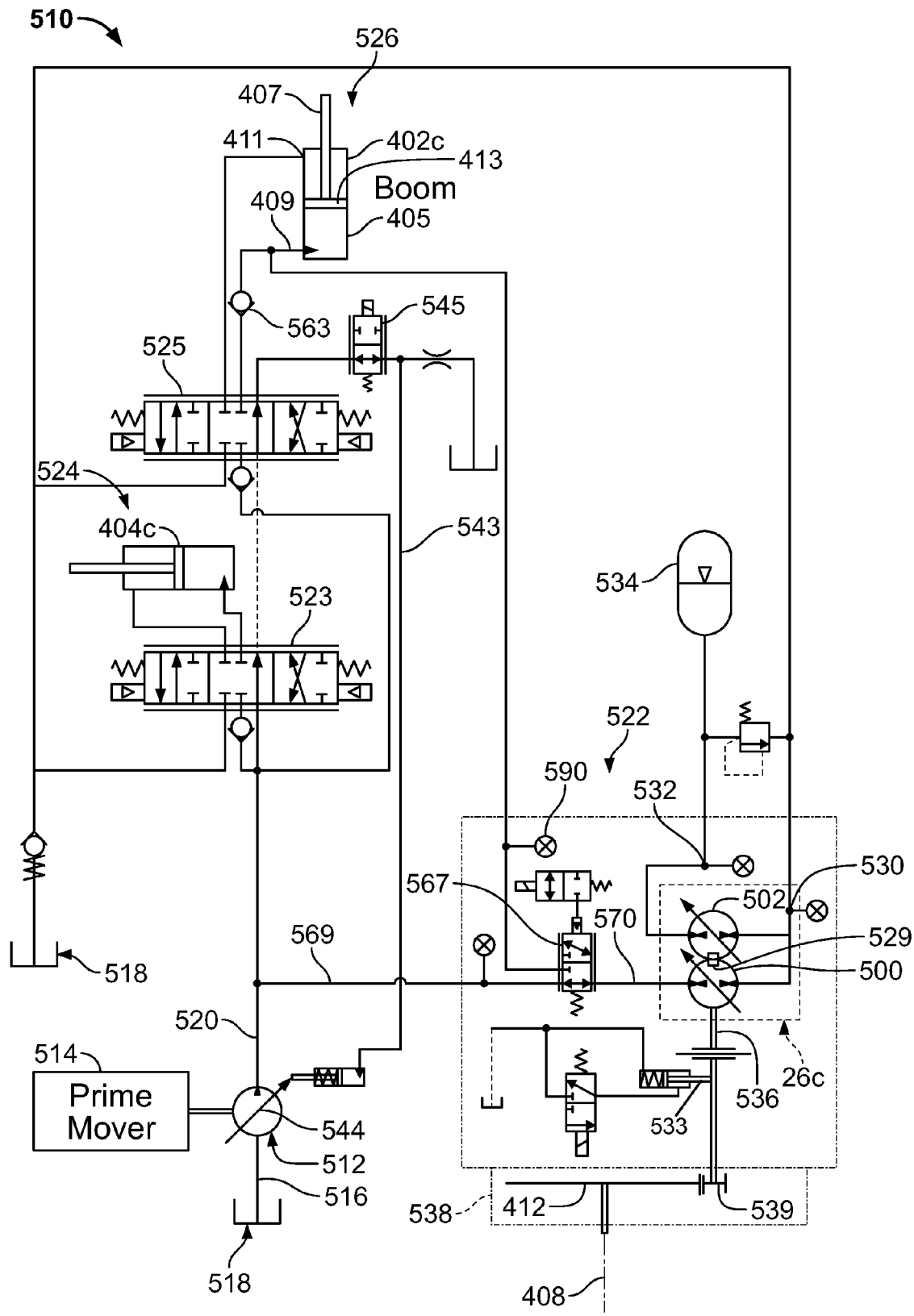
Figure 28:
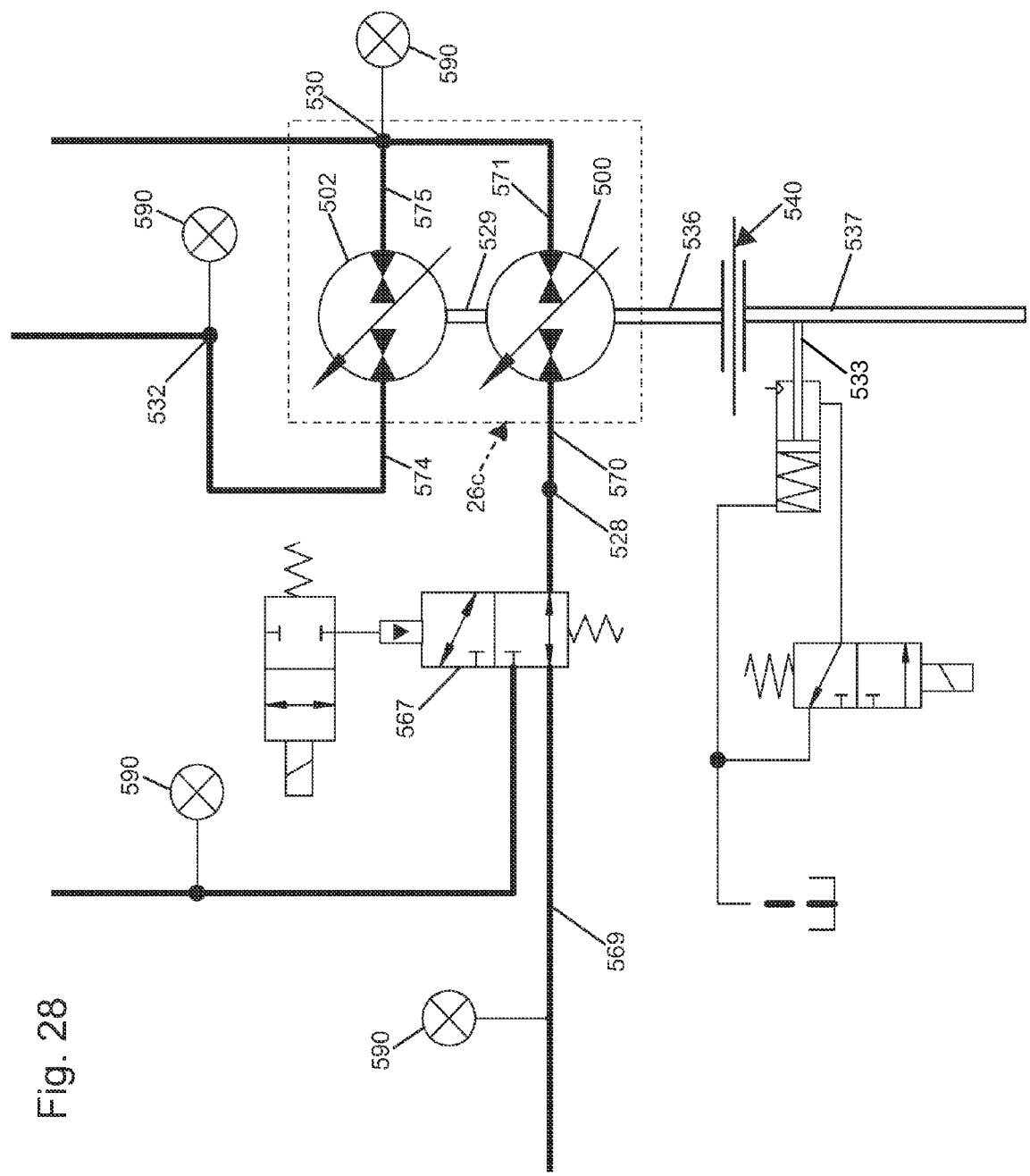
FIG. 28 is an enlarged portion of FIG. 27.

FIGS. 26-28 illustrate another system 510 in accordance with the principles of the present disclosure that is adapted for use with the excavator 400. This system 510 includes a variable displacement pump 512 powered by a prime mover 514. The variable displacement pump 512 can include a swash plate 544 for controlling the pump displacement volume per shaft rotation. A system controller 542 can interface with a negative flow control circuit 543 having a negative flow control orifice valve 545 (e.g., a proportional flow control valve). The negative flow control circuit 543 allows a negative flow control (NFC) pump control strategy to be used to control operation of the pump 512. The variable displacement pump 512 draws hydraulic fluid from a tank 518 and outputs pressurized hydraulic fluid for powering a first load circuit 522, a second load circuit 524, and a third load circuit 526. The second load circuit 524 includes the arm cylinder 404c and the third load circuit 526 includes the boom cylinder 402c. A direction flow control valve 523 (e.g., a proportional direction flow control valve) controls fluid flow between the arm cylinder 404c and the pump 512 and the tank 518. A direction flow control valve 525 (e.g., a proportional direction flow control valve) controls fluid flow between the boom cylinder 402c and the pump 512 and the tank 518. The first load circuit 522 includes a hydraulic transformer 26c including two rotating groups connected by a common shaft 529. The common shaft or shafts 529 include an end portion forming an output/input shaft 536. A clutch 540 is used to selectively couple the output/input shaft 536 to an external load 538 and to selectively decouple the output/input shaft 536 from the external load 538. The output/input shaft 536 is preferably used to pivot (i.e., swing) the upper structure 412 of the excavator 400 about the pivot axis 408 relative to the undercarriage 410. Thus, the external load 538 represents the load used to accelerate and decelerate pivotal movement of the upper structure 412 about the pivot axis 408. A gear reduction 539 is shown between the clutch 540 and the upper structure 412.

The rotating groups of the hydraulic transformer 26c include a first variable displacement pump/motor unit 500 and a second variable displacement pump/motor unit 502. A first side 570 of the first pump/motor unit 500 is fluidly connected to an output side of the variable displacement pump 512 and a second side 571 of the first pump/motor unit 500 is fluidly connected to the tank 518. A flow line 569 connects the second side 571 of the first pump/motor unit 500 to the output side of the pump 512. A first side 574 of the second pump/motor unit 502 is fluidly connected to a hydraulic pressure accumulator 534, and a second side 575 of the second pump/motor unit 502 is fluidly connected to the tank 518. The pump/motors 500, 502 can have the same type of configuration as the pump/motors previously described herein.

The boom cylinder 402c includes a cylinder 405 and a piston 407. The cylinder 405 defines first and second ports 409, 411 on opposite sides of a piston head 413 of the piston 407.

A flow control valve 567 (i.e., a mode valve) is positioned along the flow line 569. In certain embodiments, the flow control valve 567 is a proportional flow control valve. The flow control valve 567 is movable between first and second positions. In the first position, the flow control valve 567 fluidly connects the output side of the pump 512 to the first side 570 of the first pump/motor unit 500. In the second position (shown at FIG. 27), the flow control valve 567 fluidly connects the first port 409 of the cylinder 405 to the first side 570 of the first pump/motor unit 500. To move the piston 407 in a lift/extension stroke to lift the boom 402, the first port 409 may be placed in fluid communication with the output side of the pump 512 and the second port 411 may be placed in fluid communication with the tank 518, and/or the first port 409 may be placed in fluid communication with the first side 570 of the first pump/motor unit 500 and the second port 411 may be placed in fluid communication with the tank 518. To move the piston 407 in a return direction to lower the boom 402, the first port 409 may be placed in fluid communication with the first side 570 of the first pump/motor unit 500 through the flow control valve 567. In certain embodiments, a one-way check valve 563 prevents the first port 409 from being placed in fluid communication with the tank 518 as the boom 402 is lowered in this configuration. It will be appreciated that the weight of the boom 402 pressurizes the hydraulic fluid exiting the first port 409 as the boom 402 is lowered. By directing such pressurized hydraulic fluid to the transformer 26c, potential energy corresponding to the weight of the elevated boom 402 can be recovered and stored in the accumulator 534 and/or can be transferred to the external load 538 through the output/input shaft 536. Additionally, in certain embodiments, the energy can also be transferred back toward the variable displacement pump 512 in the form of pressurized hydraulic fluid pumped out of the first side 570 of the first pump/motor unit 500. In this way, the hydraulic transformer 26c allows for the recovery and use of potential energy corresponding to the lifted weight of the boom 402 which was elevated during the lift stroke of the hydraulic cylinder 402c.

Similar to the previously described embodiments, the transformer 26c and accumulator 534 also allow excess energy from the pump 512 to be stored in the accumulator 534 to provide an energy buffering function. Also, similar to the previously described embodiments, energy corresponding to a deceleration of the working load 538 can be stored in the accumulator 534 for later use, directed to the boom cylinder 402c, and/or directed back toward the pump 512 for use at the second or third load circuits 524, 526 to provide a load leveling function. Hydraulic fluid pressure sensors 590 interfacing with the controller 542 are provided throughout the system 510.

FIG. 29 illustrates (i.e., graphs) a power output of a prime mover (e.g., a diesel engine) of a conventional work machine (e.g., an excavator) over a typical work cycle (e.g., a digging cycle). A power peak may occur when high demand is required and/or requested to perform a portion of the typical work cycle. Such power peaks are especially likely to occur when the high demand is required and/or requested of several services simultaneously (e.g., boom raising and upper structure swinging). Conversely, a power trough (i.e., power underutilization) may occur when low demand is required during another portion of the typical work cycle. The prime mover and/or one or more hydraulic supply pumps of the conventional work machine may be sized to accommodate the power peaks. Over the work cycle, an average engine power can be determined by dividing engine energy produced by cycle time. The average engine power may be substantially less than the peak power. Efficiency of the prime mover may be reduced when operating at low load levels and/or when transitioning between significant differences in load levels. The systems of the present disclosure may substantially improve efficiency of the prime mover by leveling the power output of the prime mover.

FIG. 30 illustrates (i.e., graphs) a power output of a prime mover (e.g., a diesel engine) of a work machine (e.g., an excavator), similar to the conventional work machine of FIG. 29, over a typical work cycle (e.g., a digging cycle), similar to the typical work cycle of FIG. 29. In contrast, the work machine of FIG. 30 includes a hydraulic system in accordance with the principles of the present disclosure such as the hydraulic system 10, 210, 510. The hydraulic system 10, 210, 510 lowers the required engine power output over the typical work cycle by load leveling and energy recycling. This provides benefits including allowing a smaller prime mover to be used in the work machine (i.e., reducing engine size), increased efficiency from energy recycling (i.e., energy regeneration), increased efficiency from more closely matching engine peak efficiency over longer durations of the typical work cycle (i.e., engine efficiency optimization), increased efficiency from a lower weight of a smaller engine (e.g., lower swing inertia), lower cost for the smaller engine, longer engine life from running the engine at steadier output loads, etc.

In accordance with the principles of the present disclosure, a control system, such as the system controller 542, is adapted for controlling the hydraulic system, such as the hydraulic system 510. Described hereinafter are example methods of operation of the control system. A primary goal of the control logic/architecture is to maintain a generally level loading on the prime mover (e.g., the prime mover 514), thus allowing for more efficient operation of the prime mover. The control logic/architecture also can reduce the system peak power requirement thereby allowing a smaller prime mover to be used.

A goal of the hydraulic system 510 is to emulate a conventional hydraulic system and thereby have operating characteristics that are the same as or similar to the conventional hydraulic system. In particular, the operator of the work machine (e.g., the excavator 400) may operate the work machine with the hydraulic system 510 in the same way or in a similar way as the work machine with a conventional hydraulic system. The system controller 542 receives commands generated by an operator interface manipulated by the operator. The system controller 542 monitors the hydraulic system 510 and interprets the commands with consideration of various states and conditions of the excavator 400. These include the state of the boom 402, the state of the swing of the upper structure 412, the state of the accumulator 534, and the state of engine load. By processing these various inputs, the system controller 542 generates appropriate control signals to effect the input of the operator.

In preferred embodiments, the hydraulic system 510 includes multiple actuators and may include both linear and rotary actuators. The hydraulic system 510 may include energy recovery and reuse from the actuators and may level the load of the actuators on the engine. The hydraulic system 510 does not require independent meter-in and meter-out control of the actuators. The hydraulic system 510 may exchange energy among multiple components including the swing of the upper structure 412, movement of the boom 402, the primary pump 512, and the accumulator 534. Energy recovery and engine load leveling may occur with respect to multiple actuators simultaneously.

Turning now to FIGS. 31-33 and 40-43, the system 510 further includes valves 415 and 417 and discards, bypasses, and/or disables the one-way check valve 563 in comparison with the system 510 as illustrated at FIGS. 26-28. The valve 415 is connected between the ports 409 and 411 of the cylinder 402c. The valve 417 is connected between the port 411 of the cylinder 402c and the tank 518. The valves 415, 417 as illustrated, are proportional valves. The valves 415, 417 may provide the cylinder 402c with alternative flow paths depending on the positioning of the valves 523, 525, 567.

Figure 32:
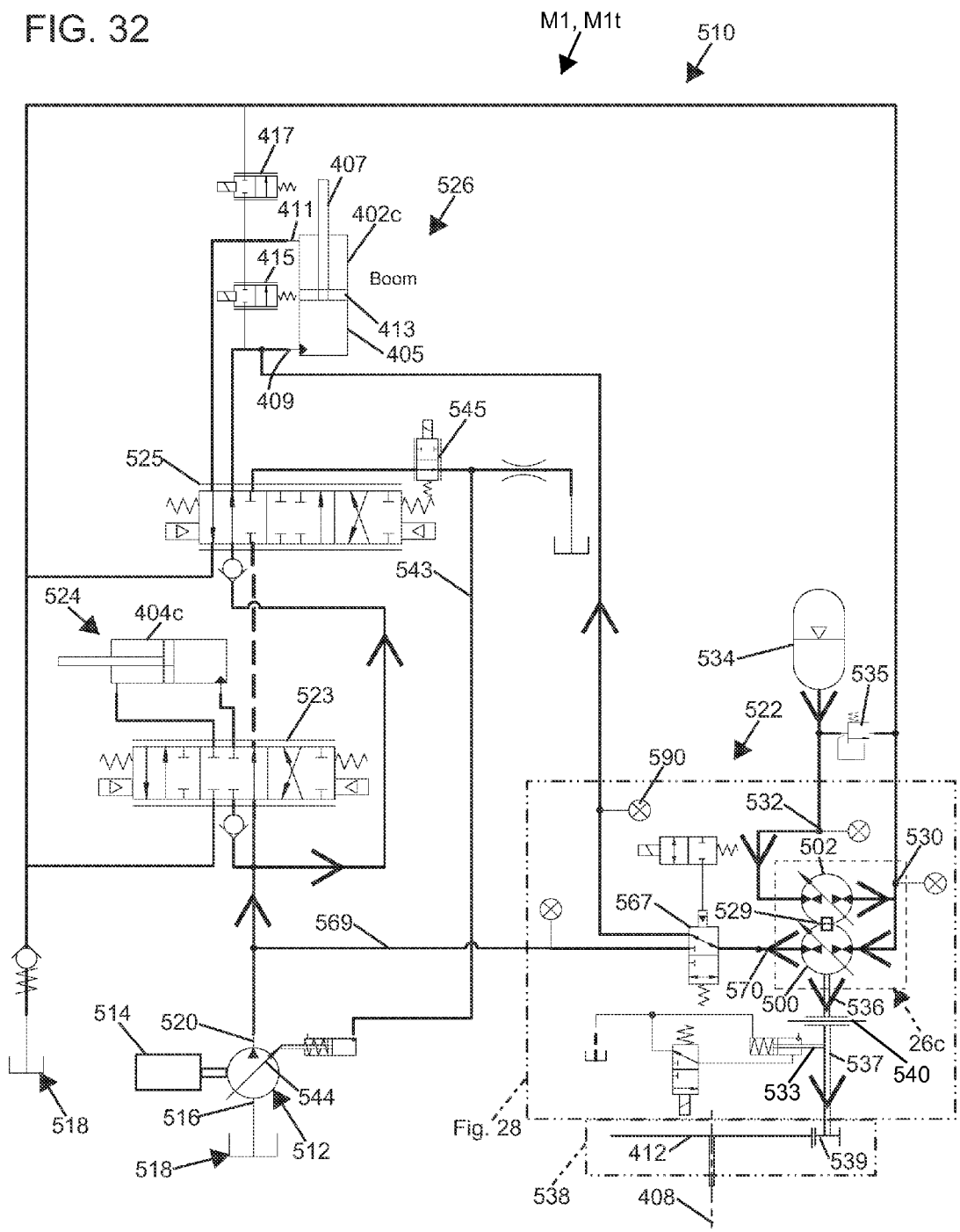
FIG. 32 is the schematic diagram of FIG. 31 with the fourth hydraulic system configured in a mode to raise the boom and accelerate the swing drive with a transitioning accumulator and under high system load of the mobile piece of excavation equipment of FIGS. 24 and 25.
Figure 33:
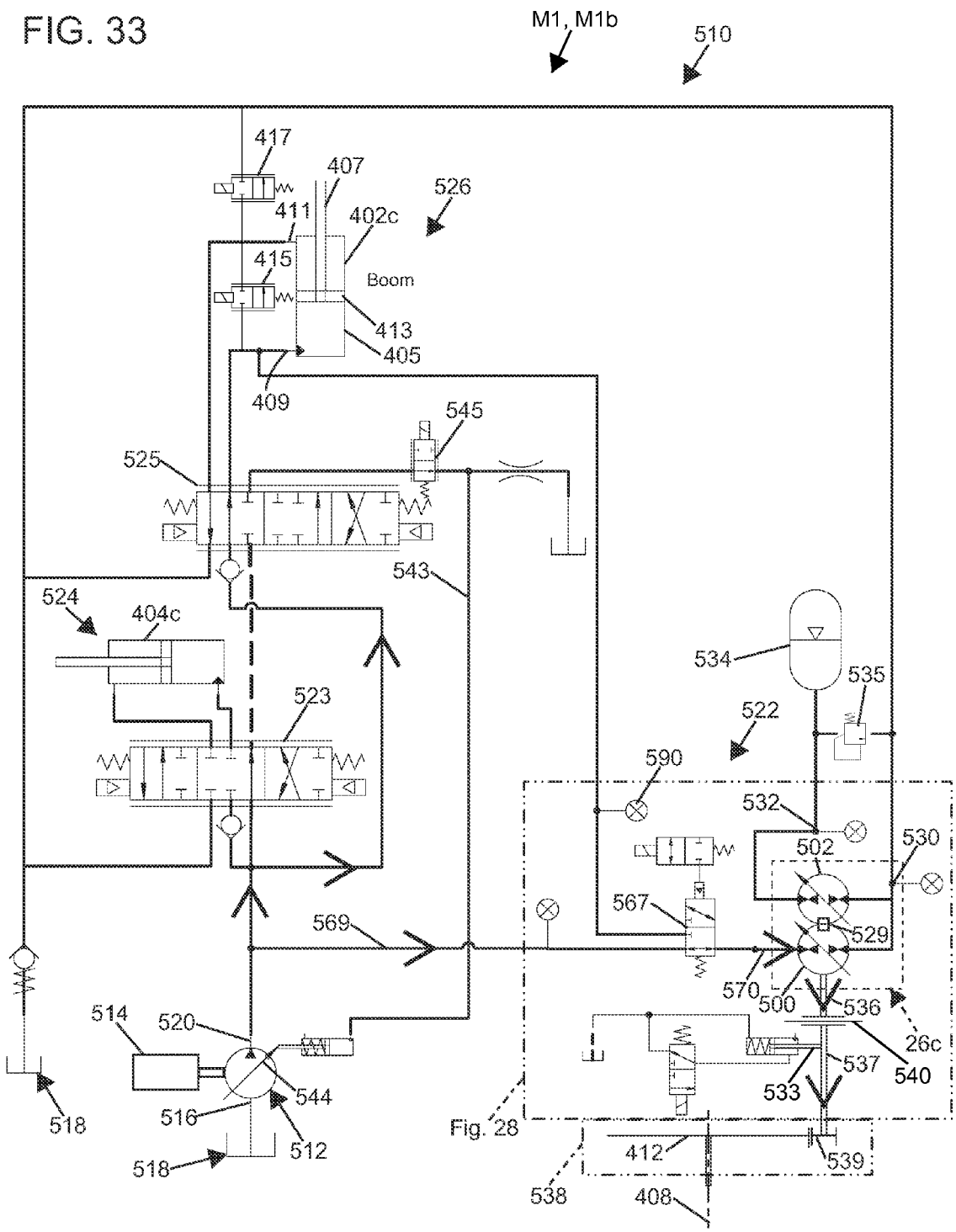
FIG. 33 is the schematic diagram of FIG. 31 with the fourth hydraulic system configured in a mode to raise the boom and accelerate the swing drive with a non-operational accumulator and under high system load of the mobile piece of excavation equipment of FIGS. 24 and 25.

In FIGS. 31-33, the system 510 is illustrated in a Mode 1 (i.e., M1). In particular, FIG. 31 illustrates a Sub-mode M1a, FIG. 32 illustrates a Sub-mode M1t, and FIG. 33 illustrates a Sub-mode M1b. Mode 1 includes the boom 402 being raised and the upper structure 412 being rotationally accelerated while the system load is high.

The accumulator 534 in the Sub-mode M1a is sufficiently charged to supply energy to the system 510 (e.g., an actual accumulator pressure, Pacc, >a low set-point accumulator pressure, Plow). As indicated at FIG. 31, the Sub-mode M1a configures the pump/motor 502 as a motor, configures the pump/motor 500 as a pump, sets the mode valve 567 to fluidly connect with the boom cylinder 402c, opens the NFC valve 545, engages the clutch 540, disengages the brake 533, and positions the direction flow control valve 525 to neutral. The system 510 may remain in the Sub-mode M1a until the operator inputs a command that no longer raises the boom 402 or rotationally accelerates the upper structure 412, the system load is reduced from "high", and/or the accumulator 534 sufficiently discharges such that it can no longer meet the power demanded by the boom 402 and the upper structure 412 simultaneously.

Upon the accumulator 534 sufficiently discharging such that it no longer can meet the power demanded by the boom 402 and the upper structure 412, the system controller 542 automatically configures the system 510 to the Sub-mode M1t. As indicated at FIG. 32, the Sub-mode M1t configures the pump/motor 502 as a motor initially, configures the pump/motor 500 as a pump initially, sets the mode valve 567 to fluidly connect with the boom cylinder 402c initially, opens the NFC valve 545 initially, engages the clutch 540, and positions the direction flow control valve 525 to neutral initially. The system 510 may remain in the Sub-mode M1t until the operator inputs a command that no longer raises the boom 402 or rotationally accelerates the upper structure 412, the system load is reduced from "high", and/or the accumulator 534 sufficiently discharges such that it can no longer provide power to the boom 402 and the upper structure 412. The Sub-mode M1t smoothly transitions the system 510 from the Sub-mode M1a to the Sub-mode M1b and thus changes (e.g., continuously changes) a displacement of the pump/motor 502, a displacement of the pump/motor 500, the mode valve 567, the NFC valve 545, and the direction flow control valve 525. The displacement of the pump/motor 502 may initially increase to generate torque while the accumulator 534 is depleted, and, when the accumulator 534 is depleted, the displacement of the pump/motor 502 is set to 0. The displacement of the pump/motor 500 may continuously be adjusted to supply the required torque and speed to the output/input shaft 536 while the accumulator 534 is depleted and the mode valve 567 and the NFC valve 545 are reconfigured. The mode valve 567 is reconfigured from supplying hydraulic power to the boom 402 to receiving hydraulic power from the primary pump 512 in conjunction with the pump/motor 500 switching from a pump to a motor. The NFC valve 545 transitions from open to restricted to set the appropriate displacement of the primary pump 512. The direction flow control valve 525 changes from neutral to a position appropriate for the operation of the boom cylinder 402c.

Upon the accumulator 534 discharging such that it no longer can supply power to the boom 402 and the upper structure 412, the system controller 542 automatically configures the system 510 to the Sub-mode M1b. As indicated at FIG. 33, the Sub-mode M1b keeps the pump/motor 502 configured at 0 displacement, keeps the pump/motor 500 configured as a motor, keeps the mode valve 567 fluidly connected with the engine (i.e., the primary pump 512), keeps the NFC valve 545 restricted, keeps the clutch 540 engaged, and positions the direction flow control valve 525 to a position appropriate for the operation of the boom cylinder 402c. The system 510 may remain in the Sub-mode M1b until the operator inputs a command that no longer raises the boom 402 or rotationally accelerates the upper structure 412 or the system load is reduced from "high".

The system 510 is illustrated in a Mode 2 (i.e., M2) at FIG. 42. The Mode 2 includes the boom 402 being lowered-overrunning and the upper structure 412 being rotationally accelerated while the system load is on target. The accumulator 534 in a Sub-mode 2a is sufficiently depleted to receive energy from the system 510 (e.g., the actual accumulator pressure, Pacc, <a high set-point accumulator pressure, Phigh). The Sub-mode 2a configures the pump/motor 502 as a pump, configures the pump/motor 500 as a motor, sets the mode valve 567 to fluidly connect with the boom cylinder 402c, opens the NFC valve 545, engages the clutch 540, and positions the direction flow control valve 525 to neutral. The system 510 may remain in the Sub-mode 2a until the operator inputs a command that no longer lowers the boom 402 or rotationally accelerates the upper structure 412, the system load is no longer "on-target", and/or the accumulator 534 sufficiently charges such that it can no longer receive power.

Upon the accumulator 534 approaching sufficient charge, such that it can no longer receive power, the system controller 542 automatically configures the system 510 to a Sub-mode 2t. The Sub-mode 2t configures the pump/motor 502 as a pump initially. The pump/motor 500 remains a motor. The mode valve 567 remains fluidly connected with the boom cylinder 402c. The NFC valve 545 remains open. The clutch 540 remains engaged. And, the direction flow control valve 525 remains at neutral. The system 510 may remain in the Sub-mode 2t until the operator inputs a command that no longer lowers the boom 402 or rotationally accelerates the upper structure 412, the system load is changed from "on-target", and/or the accumulator 534 sufficiently charges such that it can no longer receive power. The Sub-mode 2t smoothly transitions the system 510 from the Sub-mode 2a to the Sub-mode 2b and thus changes (e.g., continuously changes) the displacement of the pump/motor 502. The displacement of the pump/motor 502 may be set to match the accumulator 534, and, when the accumulator 534 is fully charged, the displacement of the pump/motor 502 is set to 0. The displacement of the pump/motor 500 may continuously be adjusted to supply the required torque and speed to the output/input shaft 536 while the accumulator 534 is charging.

Upon the accumulator 534 charging such that it no longer can receive power, the system controller 542 automatically configures the system 510 to a Sub-mode 2b. The Sub-mode 2b keeps the pump/motor 502 configured at 0 displacement, keeps the pump/motor 500 configured as a motor, keeps the mode valve 567 set to fluidly connected with the boom cylinder 402c, keeps the NFC valve 545 open, keeps the clutch 540 engaged, and keeps the direction flow control valve 525 positioned at neutral. The system 510 may remain in the Sub-mode 2b until the operator inputs a command that no longer lowers the boom 402 or rotationally accelerates the upper structure 412 or the system load changes from "on-target".

The system 510 may further be configured in a Mode 3 (i.e., M3). The Mode 3 includes the boom 402 being lowered-overrunning and the upper structure 412 being rotationally decelerated while the system load is on target. The accumulator 534 in a Sub-mode 3a is sufficiently depleted (i.e., discharged, below maximum capacity, etc.) to receive energy from the system 510. In particular, the accumulator 534 in the Sub-mode 3a is sufficiently depleted (i.e., Pacc<Phigh) to receive energy from the hydraulic cylinder 402c via the transformer 26c and/or the transformer 26c which receives shaft power from the swing drive directly via the output/input shaft 536. The Sub-mode 3a configures the pump/motor 502 as a pump, configures the pump/motor 500 as a motor, sets the mode valve 567 to fluidly connect with the boom cylinder 402c, opens the NFC valve 545, engages the clutch 540, and positions the direction flow control valve 525 to neutral. The system 510 may remain in the Sub-mode 3a until the operator inputs a command that no longer lowers the boom 402 or rotationally decelerates the upper structure 412, the system load is no longer "on-target", and/or the accumulator 534 sufficiently charges such that it can no longer receive power.

Upon the accumulator 534 approaching sufficient charge, such that it can no longer receive power, the system controller 542 automatically configures the system 510 to a Sub-mode 3t. The Sub-mode 3t configures the pump/motor 502 as a pump initially. The pump/motor 500 remains a motor. The mode valve 567 remains fluidly connected with the boom cylinder 402c. The NFC valve 545 remains open. The clutch 540 remains engaged. And, the direction flow control valve 525 remains at neutral. The system 510 may remain in the Sub-mode 3t until the operator inputs a command that no longer lowers the boom 402 or rotationally decelerates the upper structure 412, the system load is changed from "on-target", and/or the accumulator 534 sufficiently charges such that it can no longer receive power. The Sub-mode 3t smoothly transitions the system 510 from the Sub-mode 3a to the Sub-mode 3b and thus changes (e.g., continuously changes) the displacement of the pump/motor 502. The displacement of the pump/motor 502 may be set to match the accumulator 534, and, when the accumulator 534 is fully charged, the displacement of the pump/motor 502 is set to "e", where "e" is some non-zero value sufficient to provide energy absorption from the hydraulic cylinder 402c and/or the swing drive. As the pressure Pacc of the accumulator 534 is at or near a relief pressure Prelief, the value of "e" may be small and yet provide sufficient braking torque. As the accumulator 534 is fully charged, hydraulic fluid flow instead passes through the relief valve 535 and on to the tank 518. The displacement of the pump/motor 502 and/or the displacement of the pump/motor 500 may continuously be adjusted to absorb the required torque and speed of the output/input shaft 536 and/or the hydraulic energy from the hydraulic cylinder 402c while the accumulator 534 is charging and/or hydraulic fluid flow passes through the relief valve 535.

Upon the accumulator 534 charging such that it no longer can receive power, the system controller 542 automatically configures the system 510 to a Sub-mode 3b. The Sub-mode 3b keeps the pump/motor 502 configured at "e" displacement, keeps the pump/motor 500 configured as a motor, keeps the mode valve 567 set to fluidly connect with the boom cylinder 402c, keeps the NFC valve 545 open, keeps the clutch 540 engaged, and keeps the direction flow control valve 525 positioned at neutral. The system 510 may remain in the Sub-mode 3b until the operator inputs a command that no longer lowers the boom 402 or rotationally decelerates the upper structure 412 or the system load changes from "on-target".

Conventional hydraulic linear and rotary actuators (e.g., hydraulic cylinders and hydraulic motors) used on work machines are typically controlled using hydraulic valves in a throttling manner. This process results in significant energy being wasted as heat is generated from high pressure hydraulic fluid being metered. The hydro-mechanical transformer 26c, when incorporated on the hydraulic excavator 400 achieves boom and swing energy regeneration and engine load leveling. According to the principles of the present disclosure, a supervisory system control strategy for recovering the inertial energy of the boom 402 and/or the swing of the upper structure 412 is performed by the system controller 542 for the purpose of reducing the fuel consumption while maintaining the hydraulic machine operation manner (i.e., the work machine operating characteristics). The inertial energy of the boom 402 and/or the upper structure 412 is captured and recovered through the hydro-mechanical transformer 26c and the accumulator 534.

In typical conventional excavators, the engine directly powers the motion of all actuators (e.g., boom, arm, bucket cylinders, and the swing motor). The engine power consumption typically has a trend similar to the graph at FIG. 29. High power output from the engine is required when the actuator serves high pressure and/or high flow tasks (e.g., passive boom up). This high energy used in the raising of the boom will eventually be dissipated as heat when the boom falls in an over-running manner. Similar energy waste happens when the swing motor is accelerated and then braked hydraulically.

A similar engine power consumption trend for the hydro-mechanical transformer system 510 is shown at FIG. 30. According to the principles of the present disclosure, the hydro-mechanical transformer 26c and the accumulator 534 provide the energy storage and release capability to reduce the average power supplied from the engine (i.e., the prime mover 514). When the system 510 is used to level the engine load, the system 510 employs an "average power" as a decision point to determine whether to supply energy with the transformer 26c or to store energy in the accumulator 534. As the vehicle 400 is being operated, this "average power" point adjusts as the power changes and the system 510 adapts to meet the operator's needs. For example, if the system power requirement is higher than the average engine power, the stored energy from the accumulator 534 will replace the pump 512 that is connected to the engine to serve (i.e., supply pressurized hydraulic fluid to) the actuator (e.g., the hydraulic cylinder 402c via the transformer 26c and/or the transformer 26c which actuates the swing drive directly). If the system power requirement is lower than the average engine power, the pump 512 connected to the engine begins supplying energy to the transformer 26c and the energy is stored in the accumulator 534. Load leveling decisions are also impacted by accumulator charge and the operator commands.

In the energy regeneration modes, the system 510 ports fluid from the cap end of the boom cylinder 402c, in the overrunning load cases, to the transformer 26c and stores it in the accumulator 534. The system 510 can directly drive the swing drive with the accumulator pressure Pacc by supplying the transformer 26c with the hydraulic fluid and activating the clutch 540 connected to the lower structure-upper structure rotational drive. Energy can be stored as the swing drive (i.e., the lower structure-upper structure rotational drive) is braking by pumping hydraulic fluid back into the accumulator 534 with the transformer 26c. In extreme cases, when accumulator pressure Pacc is too low, the main engine pump 512 can supply the actuators until the accumulator 534 has enough pressure. The goal is to reduce the average engine power consumption and thereby achieve fuel savings.

Manipulating the displacements of the two pump/motors 500 and/or 502 provides the infinite transformation ratios and the energy flow direction (e.g., whether storing energy into the accumulator 534, or release energy from the accumulator 534). The mode valve 567 determines whether the transformer 26c is connected with the main pump 512 output or directly connected to the boom cap chamber of the boom cylinder 402c. The clutch 540 is inserted between the transformer 26c and the swing service (i.e., the swing drive). A proportional pump control valve or NFC valve 545 is inserted to allow active control of the main pump 512 displacement to achieve engine load leveling. The boom pilot valve can be set to neutral to by-pass the command from the operator via the joystick. In summary, six control efforts can be manipulated: the displacements of the two pump/motors 500, 502, the mode valve 567, the NFC valve 545, the clutch 540, and the boom valve 525. A brake 533 can further be manipulated.

Depending on the motions of the boom 402, the swing drive, and the engine output power, various system states are defined, including those mentioned above. Specific control actions are determined for each of the modes. The control action serves two goals. One goal is to guarantee the power requirement from the services. The other goal is to optimize the energy recovering efficiency. It is thus feasible to conduct power management via dynamic programming and/or other trajectory optimization techniques.

According to the principles of the present disclosure, the system 510 is able to automatically transition between the various sub-modes within a given mode. As mentioned above, certain of the modes include the accumulator 534 that may be operational—indicated by "a", may be transitioning—indicated by "t", or may be non-operational in one direction—indicated by "b". Sub-mode transition conditions are defined to achieve smooth transients when transitioning among the sub-modes.

Among other operations, the system controller 542 seeks to first satisfy control inputs from the operator to control the excavator 400. The system controller 542 further seeks to utilize energy stored in the accumulator 534 and seeks to return the accumulator 534 to operational, indicated by sub-modes including an "a" herein, upon the energy being spent from the accumulator 534. The system controller 542 further seeks to capture energy and store the energy in the accumulator 534. Sub-mode labels may include [a], [b], and [t] that indicate that the accumulator 534 is operational, non-operational, or transitioning, respectively.

According to the principles of the present disclosure, additional modes may be defined for bypassing certain features included in the above modes and/or sub-modes. Such additional modes may be used, for example, when slight movements are required and/or for movements that have insignificant energy capturing or reuse potential.

According to the principles of the present disclosure, the system 510 is able to transition between the various modes, including the bypass modes. Mode transition conditions are defined to achieve smooth transients when transitioning among the modes.

Turning now to FIGS. 34-39, example flow charts illustrating a method and/or methods of implementing control of a hybrid work machine, according to the principles of the present disclosure, are given. The modes illustrated at FIGS. 34-39 and described below may overlap, may co-exist with, etc. the modes and the sub-modes mentioned above, in certain embodiments.

Figure 34:
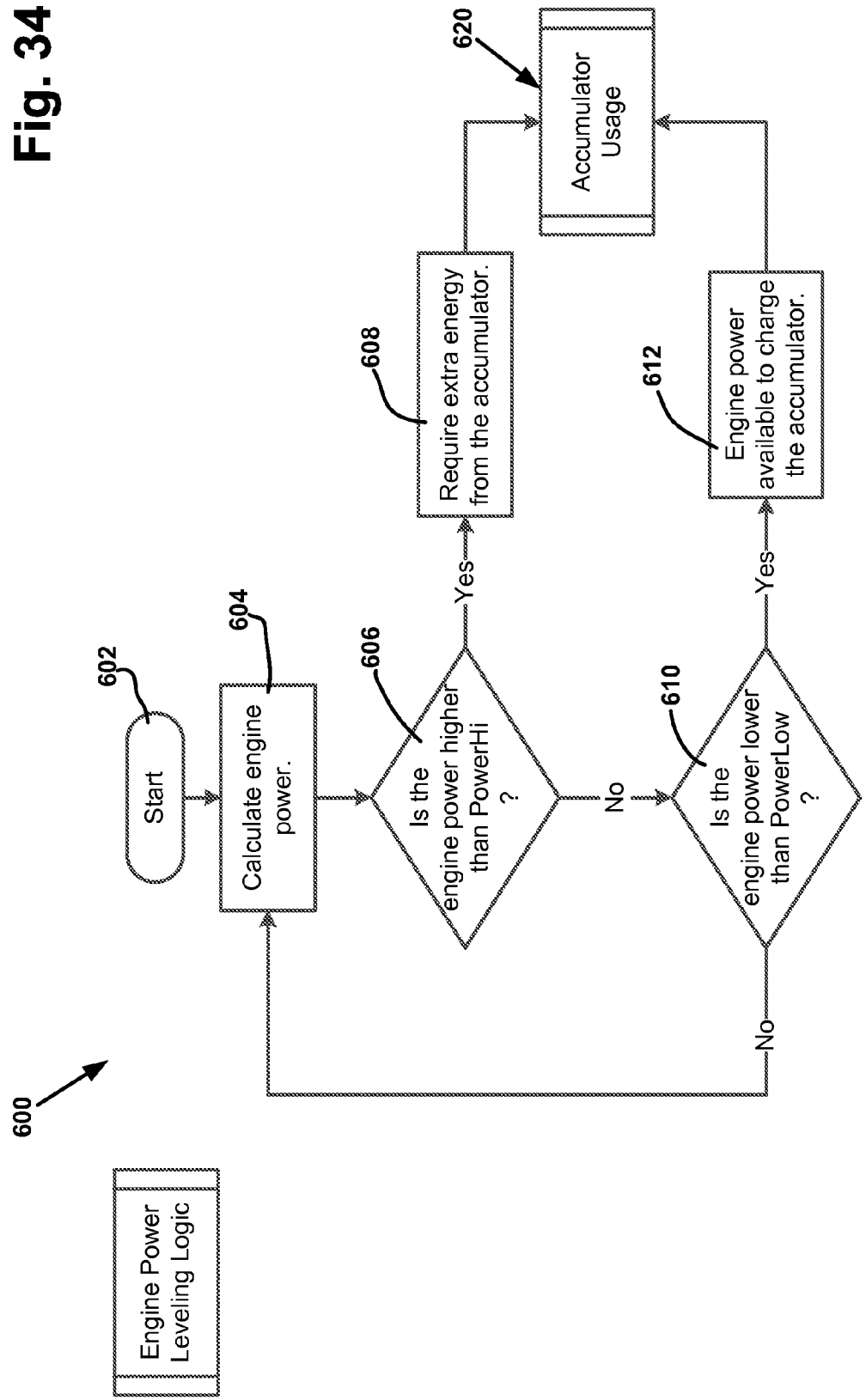
FIGS. 34-39 are example logic flowcharts for operating example control systems that may be used to control certain hydraulic systems in accordance with the principles of the present disclosure.

FIG. 34 illustrates engine power leveling logic 600 (e.g., for the prime mover 514) according to the principles of the present disclosure. The engine power leveling logic routine 600 calculates engine power (e.g., of the prime mover 514) and evaluates the engine power to determine if it is above a "PowerHi" value, between the "PowerHi" value and a "PowerLow" value, or lower than the "PowerLow" value. If the engine power is higher than "PowerHi", then the engine power leveling logic 600 seeks to request additional energy (i.e., power) from the accumulator (e.g., the accumulator 34, the accumulator 234, the accumulator 534, etc.). If the engine power is lower than "PowerLow", then the engine power leveling logic 600 seeks to charge the accumulator (e.g., the accumulator 534), if needed. By executing the engine power leveling logic 600 in a control system (e.g., the controller 42, 542, etc.), the peeks and/or the valleys in a typical work cycle may be leveled, as mentioned above. In particular, the example engine power leveling logic flow chart 600 begins at a starting point 602. Upon starting, control advances to a calculate engine power routine 604 where engine power (e.g., actual engine power) is calculated. Upon calculating the engine power, the control advances to a decision point 606. At the decision point 606, the engine power calculated at step 604 is tested to determine if the engine power is higher than "PowerHi". If this result is "yes", the control advances to routine 608 that sets a flag to require (i.e., request) extra energy (i.e., power) from the accumulator (e.g., the accumulator 534). Upon the completion and/or implementation of step 608, control advances to an accumulator usage routine 620. The accumulator usage routine 620 is further illustrated at FIG. 35. If decision point 606 results in "no", the control advances to decision point 610. At the decision point 610, the engine power calculated at step 604 is compared with the value "PowerLow". If the result of step 610 is "yes", the control advances to routine 612. The routine 612 sets a flag indicating that engine power is available to charge the accumulator (e.g., the accumulator 534). Upon step 612 being completed and/or implemented, control advances to the accumulator usage routine 620. If the decision point 610 results in "no", the control advances to step 604.

Figure 35:
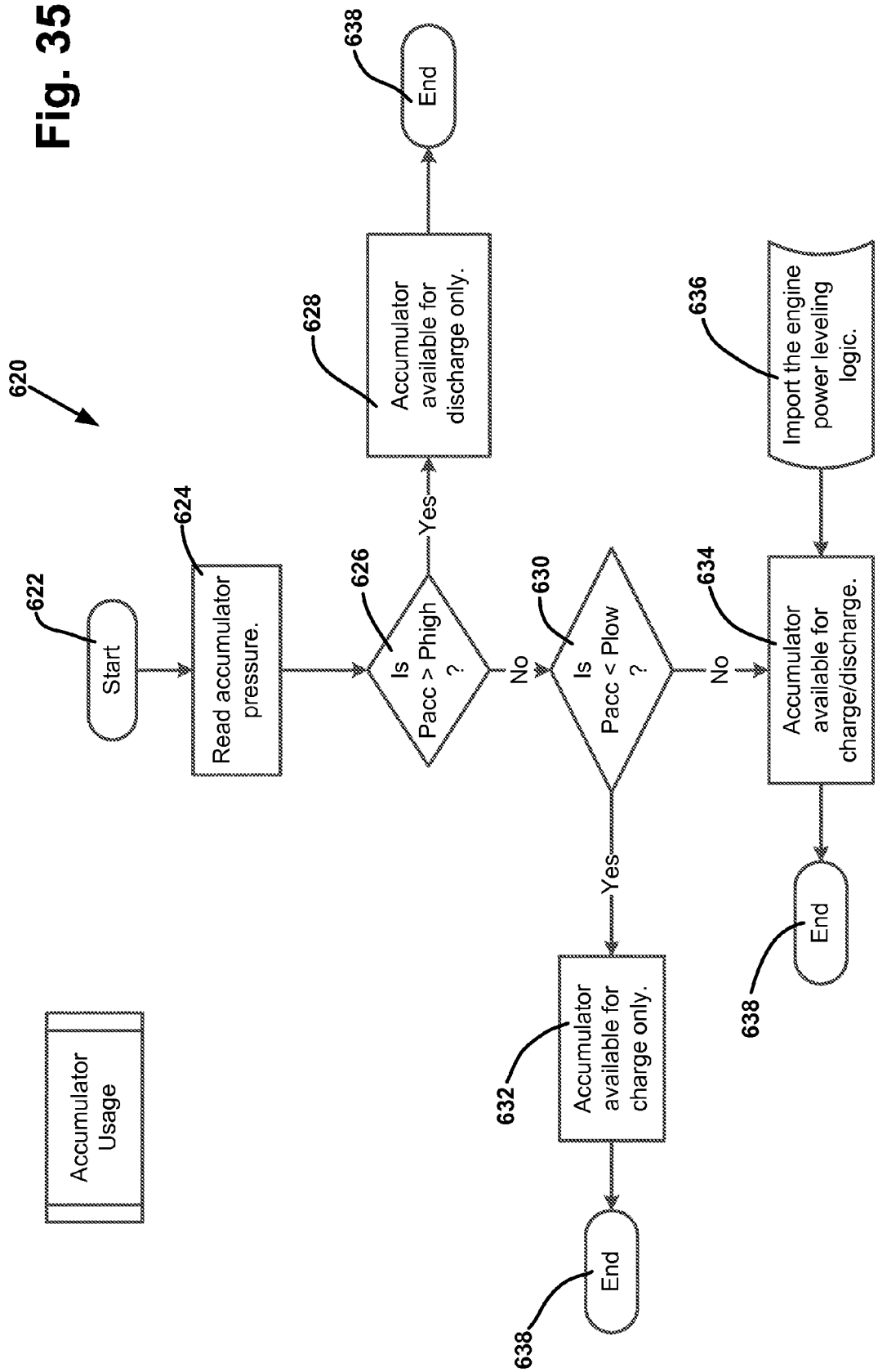

FIG. 35 illustrates the accumulator usage routine 620. The accumulator usage routine 620 tests accumulator pressure Pacc in the accumulator (e.g., the accumulator 534) to see if the accumulator pressure Pacc is greater than a value "Phigh", is between the value "Phigh" and a value "Plow", or is below the value "Plow". By determining the state of the accumulator by measuring and classifying the accumulator pressure Pacc, usage of the accumulator can be properly determined and/or planned. In particular, the accumulator usage logic 620 starts at a starting point 622. Upon starting, the control advances to routine 624 where the accumulator pressure Pacc is read. Upon reading the accumulator pressure Pacc, the control advances to a decision point 626. At the decision point 626, the accumulator pressure Pacc is tested against the value "Phigh". If the result of the decision point 626 is "yes", the control advances to routine 628 where a flag is set indicating that the accumulator (e.g., the accumulator 534) is available for discharge only. Upon the routine 628 being completed and/or being implemented, the control advances to an end point 638. Upon the decision point 626 resulting in "no", the control advances to a decision point 630 where the accumulator pressure Pacc is tested against the value "P low". If the result of the decision point 630 is "yes", the control advances to a routine 632 where a flag is set that the accumulator (e.g., the accumulator 534) is available for charge only. Upon the routine 632 being completed and/or being implemented, the control advances to the end point 638. Upon the decision point 630 resulting in "no", the control advances to a routine 634. At the routine 634, a flag is set indicating that the accumulator (e.g., the accumulator 534) is available for charge and/or for discharge. The routine 634 is feed by a routine 636 that imports the engine power leveling logic 600 and/or results of the engine power leveling logic 600 into the routine 634. Upon the routine 634 being completed and/or being implemented, the control advances to the endpoint 638.

Upon the endpoint 638 being reached, in certain example embodiments, the accumulator usage routine 620 waits until a trigger signal is given and thereby restarts the accumulator usage routine 620 at the start point 622. In certain example embodiments, the trigger point may be generated every 1 millisecond. In other embodiments, other regular and/or irregular trigger point intervals may be used. The accumulator usage routine 620 generally indicates whether the accumulator (e.g., the accumulator 534) is full and unable to acquire additional energy, is empty and unable to deliver any energy, or is between full and empty and therefore is both able to accept energy and/or deliver energy.

Figure 36:
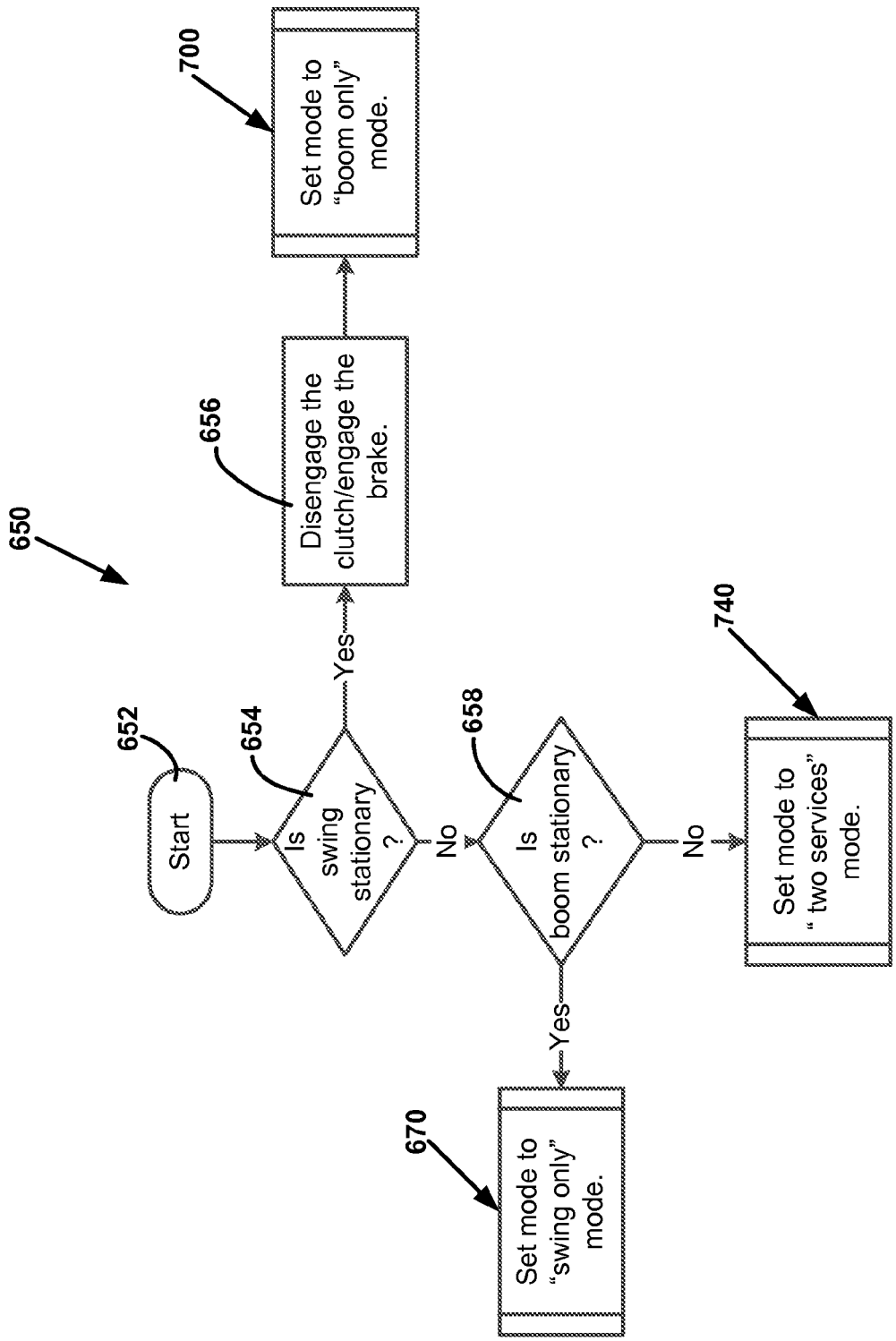
Figure 37:
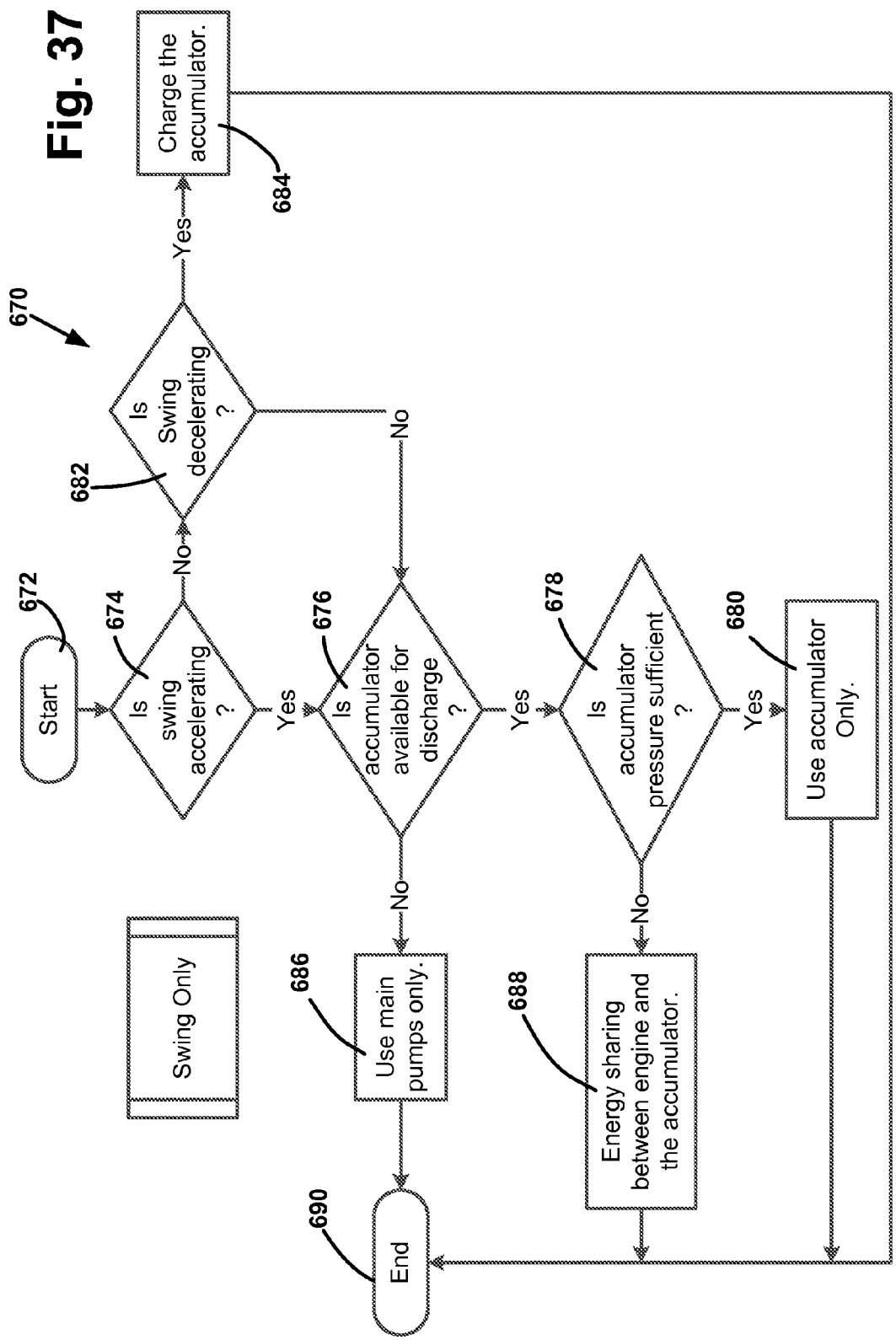
Figure 38:
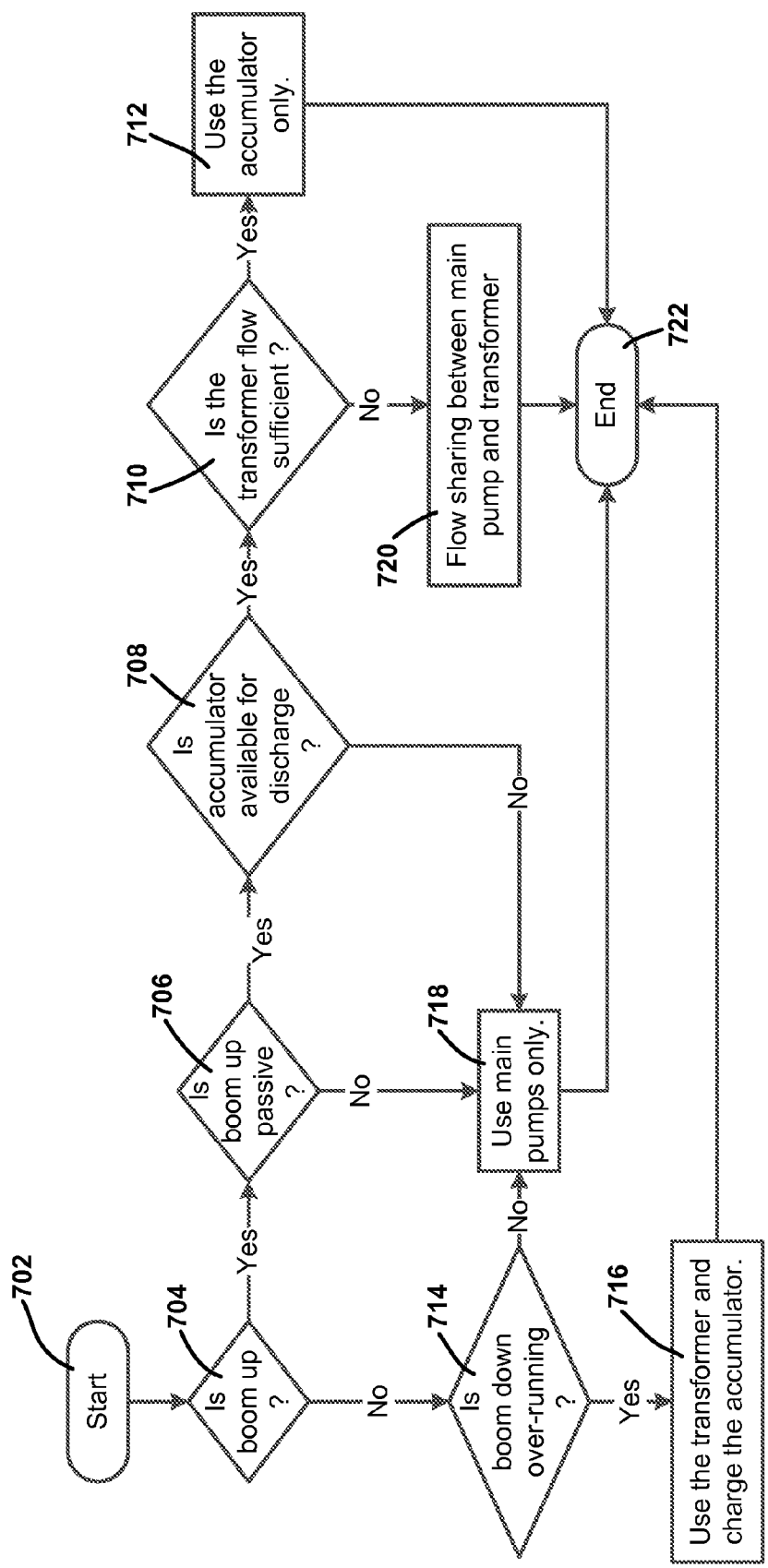
Figure 39:
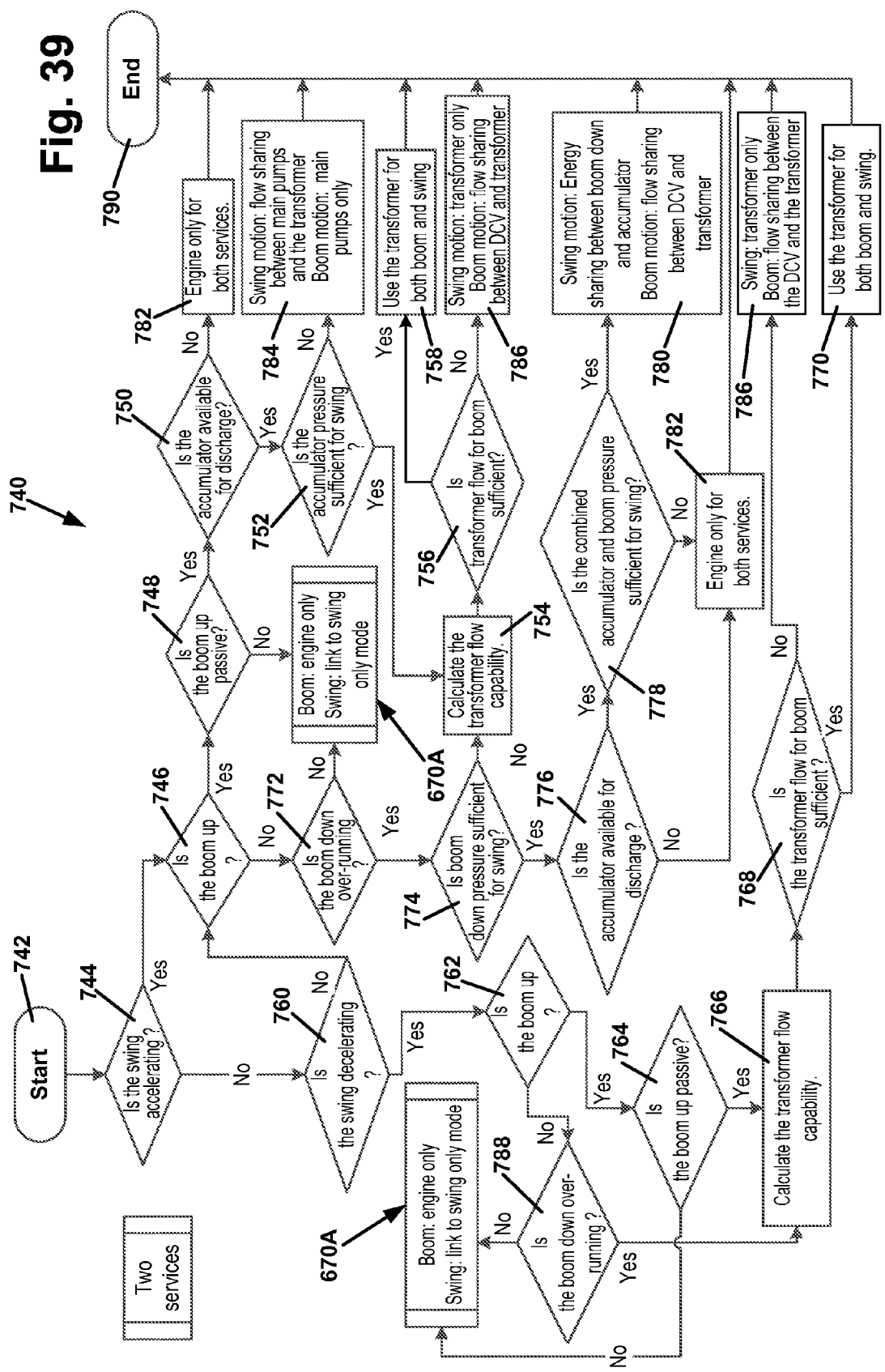

FIG. 36 illustrates a routine 650 that selects an operating mode for a work machine (e.g., the hybrid excavator 400, illustrated at FIGS. 24 and 25). The routine 650 starts at a starting point 652. From the starting point 652, control advances to a decision point 654. At the decision point 654, it is determined whether a first actuator (e.g., a swing actuator and/or a swing drive shaft 537) is stationary. If the decision point 654 results in "yes", the control advances to a routine 656 where a clutch (e.g., the clutch 40, the clutch 240, the clutch 540, etc.) is disengaged (e.g., disengaging the swing drive shaft 537 from the output/input shaft 536) and a brake 533 is engaged. Upon the routine 656 being complete, the control advances to a routine 700 (i.e., a boom only mode). The boom only mode 700 is illustrated at FIG. 38 and may control the boom 402. Upon the decision point 654 resulting in "no", the control advances to a decision point 658 where it is determined if a second actuator (e.g., the boom actuator 402c) is stationary. If the result of the decision point 658 is "yes", the control advances to a routine 670 (i.e., a swing only mode). The swing only mode 670 is illustrated at FIG. 37 and may control the swing (e.g., accelerate and decelerate pivotal movement of the upper structure 412 about the pivot axis 408). If the decision point 658 results in "no", a routine 740 (i.e., a "two services" mode) is executed. The two services mode 740 is illustrated at FIG. 39.

The routine 650 therefore determines whether the swing (e.g., pivotal movement of the upper structure 412 about the pivot axis 408) is stationary, the boom (e.g., the boom 402) is stationary, or neither the swing nor the boom is stationary. By determining whether the swing and/or the boom are stationary, a boom only mode, a swing only mode, or a two services mode may be correspondingly selected.

FIG. 37 illustrates the swing only routine 670. The swing only routine 670 is simplified in that it has been predetermined that the boom axis (i.e., the boom actuator 402c) is substantially stationary. The swing only routine 670 determines whether a main pump or main pumps (e.g., the pump 12, the pump 212, the pump 512, etc.) are used, an accumulator or accumulators (e.g., the accumulator 34, the accumulator 234, the accumulator 534, etc.) are used, or the main pump (e.g., the pump 512) and the accumulator are both used and shared to provide the swing actuator (e.g., the swing drive shaft 537) of the excavator power. The swing only routine 670 further detects if the swing actuator is decelerating and thereby provides opportunity to regeneratively charge the accumulator. The swing only routine 670 is simplified in that it operates under a predetermined condition of the boom actuator being substantially stationary.

The swing only routine 670 starts at a starting point 672. Upon starting at point 672, control advances to a decision point 674. At the decision point 674, a determination is made as to whether the swing actuator is accelerating. As used in the example herein, accelerating indicates that the rotational velocity of the swing axis 408 is increasing in absolute value. Upon the decision point 674 resulting in "yes", the control advances to a decision point 676 where it is determined whether the accumulator (e.g., the accumulator 534), is available for discharge. By discharging the accumulator, energy from the accumulator may be used to move the swing axis 408 of the excavator 400. Upon the decision point 676 being "yes", the control advances to a decision point 678. At the decision point 678, it is determined if the accumulator (e.g., the accumulator 534) has sufficient pressure to run the swing actuator (e.g., the swing drive shaft 537). Upon the decision point 678 resulting in "yes", the control advances to a routine 680 where the accumulator is used to actuate the swing actuator. Upon the routine 680 being completed and/or being implemented, the control advances to an endpoint 690. Upon the decision point 674 resulting in "no", the control advances to a decision point 682. At the decision point 682, it is determined whether the swing axis 408 of the excavator 400 is decelerating. As used in the example herein, decelerating indicates that the rotational velocity of the swing axis 408 is being reduced in absolute value. Upon the decision point 682 resulting in "yes", the control advances to a routine 684. At the routine 684, the accumulator (e.g., the accumulator 534) is charged, if appropriate. By charging the accumulator at step 684, energy is captured from the swing and delivered and stored in the accumulator. In particular, inertial energy of the excavator 400 is converted to potential energy within the accumulator (e.g., the accumulator 534). Upon the routine 684 being completed and/or being implemented, the control advances to the endpoint 690. Upon the decision point 682 indicating "no", the control advances to the decision point 676. Upon the decision point 676 indicating "no", the control advances to a routine 686 where a flag is set to use the main pump (e.g., the pump 512) only to drive the swing axis of the excavator. The main pumps or main pump is powered by the engine/prime mover of the excavator. Upon the routine 686 being complete and/or being implemented, the control advances to the endpoint 690. Upon the decision point 678 being "no", the control advances to a routine 688 where a flag is set that energy sharing between the engine (e.g., the prime mover 514) and the accumulator shall be used to actuate the swing actuator. As described above, a transformer (e.g., the transformer 26c) may be used to balance the pressure between the main pump driven by the engine and pressure from the accumulator. The pressure may be balance by setting and/or controlling one or both swash plates of the pump/motors 500, 502. Upon the routine 688 being complete and/or being implemented, the control advances to the endpoint 690. As mentioned above with respect to FIG. 35, upon the endpoint 690 being reached, the swing only routine 670 may wait until a signal restarts the routine 670 at the start point 672.

FIG. 38 illustrates the boom only routine 700. The boom only routine 700 is simplified in that it has been predetermined that the swing axis (i.e., the swing actuator) is substantially stationary. The boom only routine 700 starts at a starting point 702. Upon starting at the start point 702, control advances to a decision point 704. At the decision point 704 it is determined whether the boom (e.g., the boom 402) is being actuated to go up (e.g., moved against gravity). Upon the decision point 704 resulting in "yes", the control advances to a decision point 706 where it is determined if the boom up request results in a passive boom up request. As used in the example embodiment herein, "passive" indicates that energy is expended to effect the action. If the result of the decision point 706 is "yes", the control advances to a decision point 708. At the decision point 708, it is determined if the accumulator (e.g., the accumulator 534) is available for discharge. If the result of the decision point 708 is "yes", the control advances to a decision point 710. At the decision point 710, it is determined if the transformer flow and/or pressure is sufficient to power the boom actuator (e.g., the boom actuator 402c). Upon the decision point 710 resulting in "yes", the control advances to a routine 712 where the accumulator (e.g., the accumulator 534) is used alone to power the boom actuator. Upon the routine 712 being completed and/or implemented, the control advances to an endpoint 722. Upon the decision point 704 resulting in "no", the control advances to a decision point 714. At the decision point 714, it is determined whether a boom down motion is overrunning or not. As used in the example embodiment herein, overrunning indicates that energy recovery may be possible. In particular, inertial and/or gravitational loads may be regenerated, reused, and/or stored as useful energy. If the decision point 714 results in "yes", the control advances to a routine 716 where the transformer is used to charge the accumulator, if appropriate. Upon the routine 716 being completed and/or implemented, the control advances to the endpoint 722. Upon the decision point 706 being "no", the control advances to a routine 718. At the routine 718, a flag is set indicating that the main pump should be used alone to power the boom actuator. Upon the decision point 708 resulting in "no", the control advances to the routine 718. Upon the decision point 710 indicating "no", the control advances to a routine 720 where a flag is set that the boom actuator should be powered by flow sharing between the main pump, driven by the engine, and pressure and flow delivered by the accumulator via the transformer. Upon the routine 720 being completed and/or implemented, the control advances to the end point 722. Upon the decision point 714 being "no", the control advances to the routine 718. Upon the routine 718 being completed and/or implemented, the control advances to the endpoint 722.

FIG. 39 illustrates the two services mode 740. The two services mode 740 is implemented when both the swing axis, described in detail above, and the boom axis, described in detail above, are moving simultaneously. The two services mode 740 starts at a starting point 742. Upon starting at the starting point 742, control advances to a decision point 744 where it is determined whether the swing actuator (e.g., the swing drive shaft 537) is accelerating. If the result of the decision point 744 is "yes", the control advances to a decision point 746. At the decision point 746, it is determined whether the boom (e.g., the boom 402) is being requested to go up. Upon the decision point 746 resulting in "yes", the control advances to a decision point 748. At the decision point 748, it is determined if the boom up movement is passive. Upon the decision point 748 resulting in "yes", the control advances to a decision point 750. At the decision point 750, it is determined whether the accumulator (e.g., the accumulator 534) is available for discharge. If the result of the decision point 750 is "yes", the control advances to a decision point 752. At the decision point 752, it is determined whether the accumulator pressure is sufficient for swing actuator movement. Upon the decision point 752 resulting in "yes", the control advances to a routine 754. At the routine 754, the transformer flow capacity capability is determined. Evaluation of the accumulator may be part of calculating the transformer's flow capability. Upon the routine 754 being executed, the control advances to a decision point 756. At the decision point 756, it is determined if the transformer flow is sufficient for boom actuation. If the decision point 756 results in "yes", the control advances to a routine 758 (see FIG. 31). At the routine 758, a flag is set to use the transformer (e.g., the transformer 26c) for both boom and swing actuation.

Upon the decision point 744 resulting in "no", the control advances to a decision point 760. At the decision point 760, it is determined whether the swing is decelerating. If the result of the decision point 760 is "yes", the control advances to a decision point 762 where it is determined if the boom is being commanded up. Upon the decision point 762 resulting in "yes", the control advances to a decision point 764 where it is determined whether the boom up movement is passive. Upon the decision point 764 resulting in "yes", the control advances to a routine 766. At the routine 766, the transformer flow capability is calculated. The calculation of the transformer flow capability may include an evaluation of the accumulator pressure. Upon routine 766 being executed, the control advances to a decision point 768. At the decision point 768, it is determined whether or not the transformer flow is sufficient to drive the boom actuator. Upon the decision point 768 resulting in "yes", the control advances to a routine 770 (see FIG. 31). At the routine 770, a flag is set indicating that the transformer should be used for both boom and swing movement.

Upon the decision point 746 resulting in "no", the control is transferred to a decision point 772. At the decision point 772, it is determined whether overrunning boom down motion is occurring. Upon the decision point 772 indicating "yes", the control is transferred to a decision point 774. At the decision point 774, it is determined whether the boom is producing sufficient pressure and/or flow to drive the swing actuator. Upon the decision point 774 resulting in "yes", the control is transferred to a decision point 776. At the decision point 776, it is determined if the accumulator is available for discharge. If the decision point 776 results in "yes", the control is transferred to a decision point 778. At the decision point 778, it is determined if the combined accumulator and boom pressure are sufficient to drive the swing actuator. If the result of decision point 778 is "yes", the control is transferred to a routine 780 (see FIG. 42). At the routine 780, a flag is set indicating that swing motion shall be produced by energy sharing between boom down flow and accumulator flow. A flag is also set indicating that the boom motion shall be produced by flow sharing between the directional control valve (??) and the transformer (e.g., the transformer 26c). Upon the routine 780 being executed, the control is transferred to the endpoint 790.

Upon the decision point 750 resulting in "no", the control is transferred to a routine 782 (see FIG. 33). At the routine 782, a flag is set indicating that the engine (e.g., the main pump 512 driven by the engine 514) shall be used to drive both the swing actuator (e.g., the transformer 26c driving the swing drive shaft 537) and the boom actuator (e.g., the boom actuator 402c). Upon the routine 782 being executed, the control is transferred to the endpoint 790. Upon the decision point 752 resulting in "no", the control is transferred to a routine 784 (see FIG. 40). At the routine 784, a flag is set indicating that the swing motion shall be produced by flow sharing between the main pump, driven by the engine, and the transformer, driven by the accumulator (e.g., the accumulator 534). A flag is also set indicating that the boom motion shall be powered by the main pump, driven by the engine. Upon the routine 784 being executed, the control is transferred to the endpoint 790. Upon the routine 756 resulting in "no", the control is transferred to a routine 786 (see FIG. 32). The routine 786 sets a flag that indicates that the swing motion shall be produced by the transformer alone. The routine 786 also sets a flag that indicates that the boom motion shall be produced by flow sharing between the directional control valve and the transformer. Upon the routine 786 being executed, the control is advanced to the endpoint 790. Upon the decision point 776 resulting in "no", the control is transferred to the routine 782. Upon the routine 782 being executed, the control is transferred to the endpoint 790. Upon the decision point 778 resulting in "no", the control is transferred to the routine 782. Upon the routine 782 being executed, control is transferred to the endpoint 790. Upon the decision point 748 resulting in "no", the control is transferred to a routine 670A.

At the routine 670A, the boom actuator is driven by the main pump, powered by the engine alone. In addition, the routine 670A transfers logic controlling the swing actuator to the logic of the swing only mode 670, as illustrated at FIG. 37. Upon the decision point 772 resulting in "no", the control is transferred to the routine 670A. Upon the decision point 768 resulting in "no", the control is transferred to the routine 786. Upon the routine 786 being executed, the control is transferred to the endpoint 790. Upon the decision point 762 resulting in "no", the control is transferred to the decision point 788. At decision point 788, it is determined whether the boom down motion is overrunning. Upon the decision point 788 resulting in "yes", the control is transferred to the routine 766. Upon the routine 788 being "no", the control is transferred to the routine 670A. Upon the decision point 764 resulting in "no", the control is transferred to the routine 670A.

Figure 40:
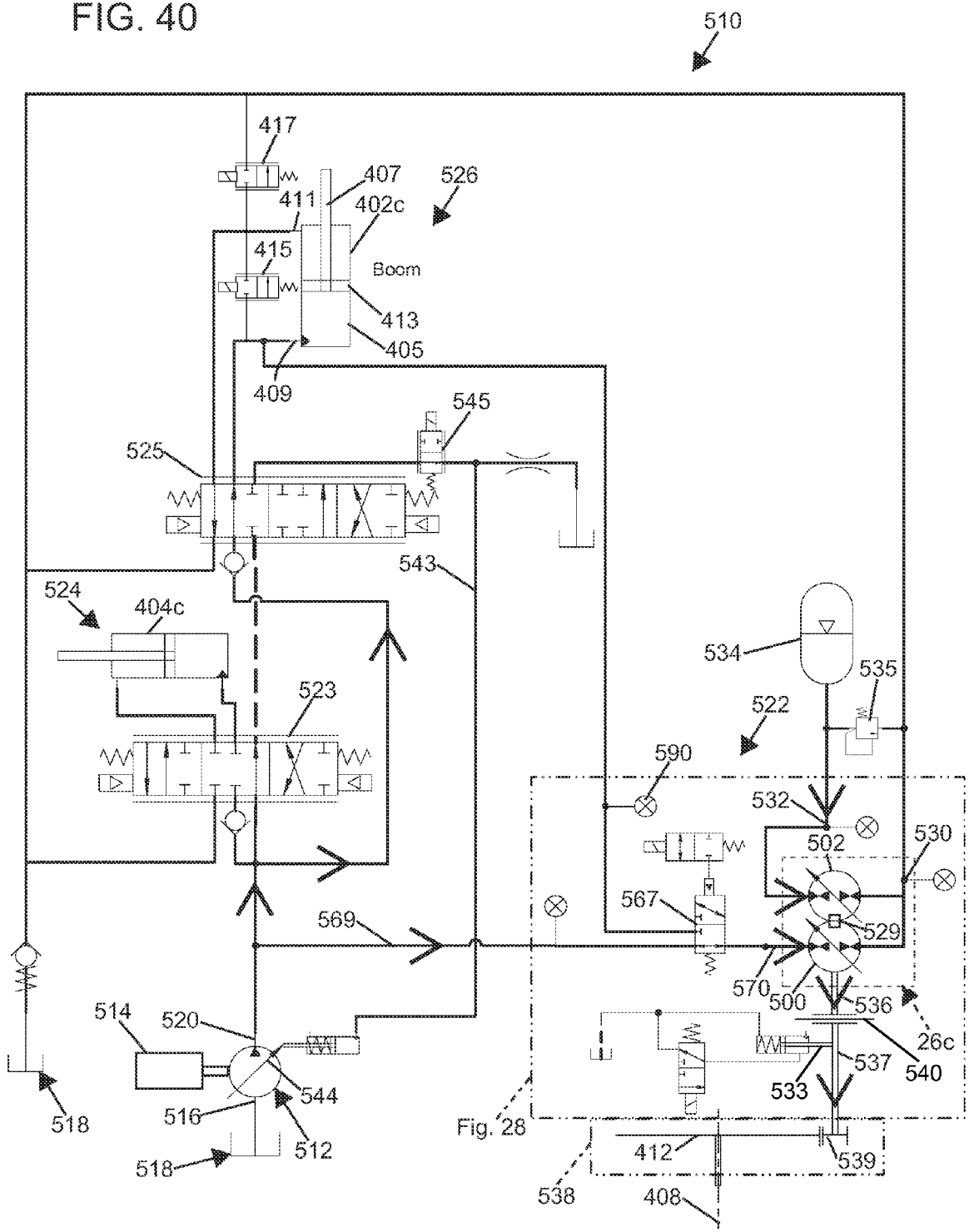
FIG. 40 is the schematic diagram of FIG. 31 with the fourth hydraulic system configured in a mode to raise the boom and accelerate the swing drive with flow from a main pump raising the boom and with flow from the main pump and flow from the accumulator accelerating the swing drive.
Figure 41:
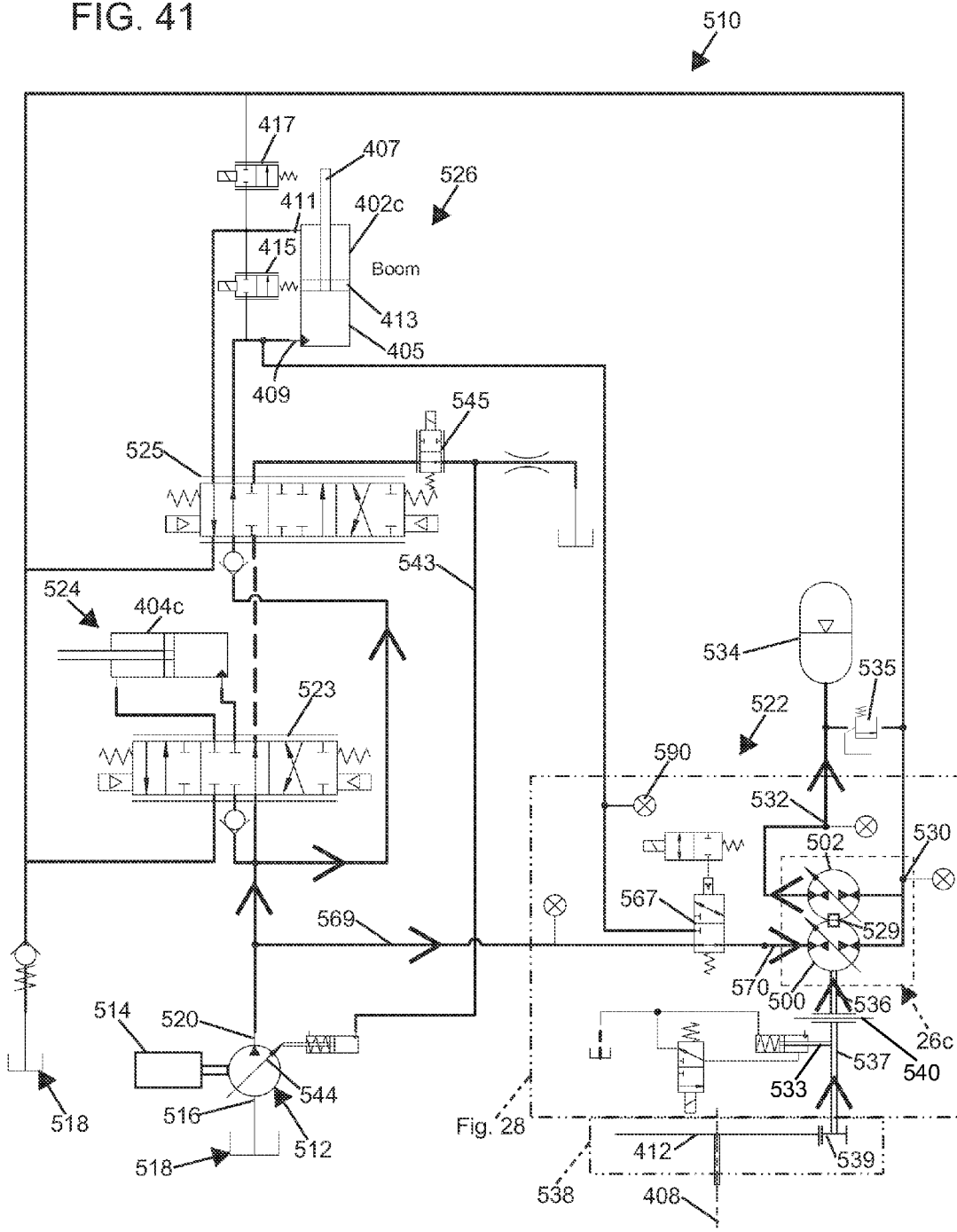
FIG. 41 is the schematic diagram of FIG. 31 with the fourth hydraulic system configured in a mode to raise the boom and decelerate the swing drive with flow from the main pump raising the boom and with the accumulator being charged by the main pump and by the deceleration of the swing drive.

Turning now to FIGS. 40-43, additional configurations of the system 510 are illustrated. These additional configurations are example configurations. Still other configurations of the system 510 are possible. In particular, FIG. 40 illustrates a configuration in which engine energy from the engine 514 powers the boom cylinder 402c, and in which engine energy from the engine 514 and accumulator energy from the accumulator 534 power the swing drive shaft 537 (via the transformer 26c). FIG. 41 illustrates a configuration in which engine energy from the engine 514 powers the boom cylinder 402c, and in which engine energy from the engine 514 and swing deceleration energy charge the accumulator 534. FIG. 42 may illustrate a configuration in which the main pump 512 supplies the boom cylinder 402c with flow, and the boom 402 is travelling down in an overrunning condition. Alternatively, flow may be supplied to the boom cylinder 402c via the proportional valve 417. FIG. 42 may further illustrate boom energy being transferred to the accumulator and/or the swing via the transformer 26c. The energy from the boom 402 can thus be used to charge the accumulator 534 and/or aid acceleration of the swing drive shaft 537. The energy from the boom 402 can further be dissipated at the relief valve 535, if needed. FIG. 43 may illustrate a configuration in which engine energy from the engine 514 powers the boom cylinder 402c, and in which engine energy from the engine 514 charges the accumulator 534 via the transformer 26c.

The present application is related to U.S. Provisional Patent Application Ser. Nos. 61/523,099, entitled System and Method for Recovering Energy and Leveling Hydraulic System Loads and filed on Aug. 12, 2011; 61/523,110, entitled Method and Apparatus for Recovering Inertial Energy and filed on Aug. 12, 2011; and 61/523,524 entitled Method and Apparatus for Recovering Inertial Energy and filed on Aug. 15, 2011, and the disclosures of which are hereby incorporated by reference in their entireties. The present application is also related to U.S. patent application Ser. No. 13/571,517, entitled System and Method for Recovering Energy and Leveling Hydraulic System Loads and filed on Aug. 10, 2012, and Ser. No. 13/572,115, entitled Method and Apparatus for Recovering Inertial Energy and filed on Aug. 10, 2012, and the disclosures of which are hereby incorporated by reference in their entireties.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A method of delivering power in a hybrid work machine, the method comprising:
   determining engine power of an engine;
   determining accumulator pressure of an accumulator;
   determining a first target power flow to/from a first work machine component;
   determining a second target power flow to/from a second work machine component;
   setting an operating mode to a first mode if the second target power flow is substantially zero;
   setting the operating mode to a second mode if the first target power flow is substantially zero;
   setting the operating mode to a third mode if the first and second target power flows are both substantially non-zero;
   flow sharing a first power flow from a main pump mechanically connected to the engine and from a transformer fluidly connected to the accumulator when the accumulator pressure is below a first threshold value and the operating mode is set to the first mode and the accumulator is available for discharge;
   supplying the first power flow from the transformer when the accumulator pressure is above the first threshold value and the operating mode is set to the first mode;
   supplying the first power flow from the main pump when the operating mode is set to the first mode and the accumulator is unavailable for discharge;
   flow sharing a second power flow from the main pump and from the transformer when the accumulator pressure is below a second threshold value and the operating mode is set to the second mode and the accumulator is available for discharge;
   supplying the second power flow from the transformer when the accumulator pressure is above the second threshold value and the operating mode is set to the second mode; and
   supplying the second power flow from the main pump when the operating mode is set to the second mode and the accumulator is unavailable for discharge.

2. The method of claim 1, further comprising flow sharing the first power flow from the main pump and from the transformer when the accumulator pressure is below a third threshold value and the operating mode is set to the third mode thereby powering the first work machine component.

3. The method of claim 2, wherein the second work machine component is powered by the main pump that is mechanically connected to the engine.

4. The method of claim 1, wherein the hybrid work machine is an excavator, the first work machine component is a swing actuator, and the second work machine component is a boom actuator.

5. The method of claim 1, further comprising supplying the first power flow to the transformer from the first work machine component and thereby charging the accumulator when the accumulator is available for charging and the first work machine component is receiving mechanical power.

6. The method of claim 5, wherein the first power flow is directly supplied to the transformer by a shaft.

7. The method of claim 1, further comprising supplying the second power flow to the transformer from the second work machine component and thereby charging the accumulator when the accumulator is available for charging and the second work machine component is receiving mechanical power.

8. The method of claim 7, wherein the second power flow is fluidly supplied to the transformer by a fluid line.

9. The method of claim 1, further comprising supplying a third power flow to/from the first work machine component from/to the second work machine component via the transformer when the operating mode is set to the third mode.

10. The method of claim 1, further comprising flow sharing a third power flow to the first work machine component from the second work machine component and the accumulator when the operating mode is set to the third mode.

11. The method of claim 1, further comprising flow sharing a third power flow to the first work machine component from the engine and the accumulator when the operating mode is set to the third mode.

12. The method of claim 1, further comprising flow sharing a third power flow to the second work machine component from the main pump and the accumulator when the operating mode is set to the third mode.

13. The method of claim 1, further comprising flow sharing a third power flow to the accumulator from the second work machine component and the main pump thereby charging the accumulator when the accumulator is available for charging and the second work machine component is receiving mechanical power.

14. A method of delivering power in a hybrid work machine, the method comprising:
   determining engine power of an engine;
   determining accumulator pressure of an accumulator;
   determining a target power flow to/from a work machine component;
   flow sharing a power flow to the work machine component from a main pump mechanically connected to the engine and from a transformer fluidly connected to the accumulator when the accumulator pressure is below a threshold value, the accumulator is available for discharge, and the target power flow is to the work machine component;
   supplying the power flow to the work machine component from the transformer when the accumulator pressure is above the threshold value and the target power flow is to the work machine component; and
   supplying the power flow to the work machine component from the main pump when the accumulator is unavailable for discharge and the target power flow is to the work machine component.

15. The method of claim 14, wherein the hybrid work machine is an excavator and wherein the work machine component is a swing actuator or a boom actuator.

16. The method of claim 14, wherein the transformer and the work machine component are mechanically connected by a power transfer shaft.

17. The method of claim 14, further comprising supplying the power flow to the transformer from the work machine component and thereby charging the accumulator when the accumulator is available for charging and the target power flow is from the work machine component.

18. The method of claim 17, wherein the power flow is directly supplied to the transformer from the work machine component by a power transfer shaft when the accumulator is available for charging and the target power flow is from the work machine component.

19. The method of claim 17, wherein the power flow is fluidly supplied to the transformer by a fluid line when the accumulator is available for charging and the target power flow is from the work machine component.

20. The method of claim 14, wherein the threshold value is a variable threshold value.

21. The method of claim 20, wherein the threshold value is determined prior to determining if the accumulator is available for discharge.

22. A method of delivering power in a hybrid excavator, the method comprising:
 determining engine power of an engine;
 determining accumulator pressure of an accumulator;
 determining a swing target power flow to/from a swing actuator;
 determining a boom target power flow to/from a boom actuator;
 determining a transformer flow capacity of a transformer;
 flow sharing a first power flow from the boom actuator and from the accumulator to the swing actuator when the boom actuator is over-running and moving down, the accumulator is available for discharge, and the boom target power flow is above a threshold value from the boom actuator; and
 flow sharing a second power flow from the swing actuator and from the accumulator to the boom actuator when the swing actuator is decelerating, the accumulator is available for discharge, and the swing target power flow is above a threshold value from the swing actuator.

23. A method of delivering power in a hybrid work machine, the method comprising:
 determining accumulator pressure of an accumulator;
 determining a target power flow to/from a work machine component;
 flow sharing a power flow to the work machine component from a first power source and from a second power source when the second power source has available energy below a threshold value, and the target power flow is to the work machine component;
 supplying the power flow to the work machine component from the second power source when the second power source has the available energy above the threshold value and the target power flow is to the work machine component; and
 supplying the power flow to the work machine component from the first power source when the second power source has no available energy and the target power flow is to the work machine component.

24. The method of claim 23, further comprising determining engine power of an engine, wherein the first power source is a main pump mechanically connected to the engine and wherein the second power source is a transformer fluidly connected to the accumulator at least when the accumulator has the available energy.

25. The method of claim 23, further comprising determining engine power of an engine, wherein the work machine component is a first work machine component, wherein the first power source is a main pump mechanically connected to the engine, and wherein the second power source is a transformer fluidly connected to a second work machine component at least when the second work machine component has the available energy.

26. The method of claim 23, further comprising determining a target power flow to/from a second work machine component; wherein the work machine component is a first work machine component, wherein the first power source is the second work machine component, and wherein the second power source is a transformer fluidly connected to the accumulator at least when the accumulator has the available energy.

27. A method of delivering power in a hybrid work machine, the method comprising:
 determining engine power of an engine;
 determining accumulator pressure of an accumulator;
 determining a target power flow to/from a work machine component;
 flow sharing a power flow to the accumulator from a main pump mechanically connected to the engine and from a transformer mechanically connected to the work machine component when the accumulator pressure is below a threshold value, when the accumulator is available for charging, and when the target power flow is from the work machine component;
 supplying the power flow to the accumulator from the transformer mechanically connected to the work machine component when the accumulator pressure is above the threshold value, when the accumulator is available for charging, and when the target power flow is from the work machine component; and
 supplying the power flow to the accumulator from the transformer fluidly connected to the main pump when the work machine component has no available energy.

* * * * *